(12) United States Patent
Nishibayashi et al.

(10) Patent No.: US 7,650,559 B2
(45) Date of Patent: Jan. 19, 2010

(54) COMMUNICATION APPARATUS, COMMUNICATION SYSTEM, COMMUNICATION METHOD, AND COMMUNICATION CONTROL PROGRAM

(75) Inventors: Yasuyuki Nishibayashi, Kawasaki (JP); Masahiro Takagi, Tokyo (JP); Tomoko Adachi, Urayasu (JP); Tetsu Nakajima, Yokohama (JP); Yoriko Utsunomiya, Tokyo (JP); Tomoya Tandai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 706 days.

(21) Appl. No.: 11/087,763

(22) Filed: Mar. 24, 2005

(65) Prior Publication Data

US 2005/0220145 A1  Oct. 6, 2005

(30) Foreign Application Priority Data

Apr. 2, 2004  (JP)  ............................. 2004-110446
Jun. 17, 2004 (JP)  ............................. 2004-180226

(51) Int. Cl.
G08C 25/02  (2006.01)
H04L 1/18  (2006.01)
H03M 13/00  (2006.01)

(52) U.S. Cl. ...................................... 714/776; 714/748
(58) Field of Classification Search ................. 714/748, 714/776

See application file for complete search history.

(56) References Cited

U.S. PATENT DOCUMENTS

| | | | | |
|---|---|---|---|---|
| 5,200,864 A * | 4/1993 | Dunn et al. | .................... | 360/48 |
| 5,274,772 A * | 12/1993 | Dunn et al. | .................... | 710/11 |
| 5,329,531 A | 7/1994 | Diepstraten et al. | | |
| 5,335,328 A * | 8/1994 | Dunn et al. | .................... | 710/33 |
| 5,384,669 A * | 1/1995 | Dunn et al. | .................... | 360/48 |
| 5,414,570 A * | 5/1995 | Fry et al. | ....................... | 360/48 |
| 5,530,806 A * | 6/1996 | Condon et al. | ................. | 714/49 |
| 5,636,140 A * | 6/1997 | Lee et al. | ..................... | 370/469 |
| 5,684,791 A * | 11/1997 | Raychaudhuri et al. | .. | 370/310.2 |
| 6,577,609 B2 | 6/2003 | Sharony | | |
| 6,650,869 B2 * | 11/2003 | Kelly et al. | ................. | 455/13.2 |
| 6,934,299 B2 * | 8/2005 | Kaatz | ......................... | 370/459 |

(Continued)

FOREIGN PATENT DOCUMENTS

JP 03-101334 4/1991

(Continued)

OTHER PUBLICATIONS

IEEE Std 802.11-1999, Information Technology- telecommunications And Information exchange Between Systems-Local And Metropolitan Area Networks-specific Requirements-part 11: Wireless Lan Medium Access Control (MAC) And Physical Layer (PHY) Specifications.*

(Continued)

Primary Examiner—Joseph D Torres
(74) Attorney, Agent, or Firm—Oblon, Spivak, McClelland, Maier & Neustadt, L.L.P.

(57) ABSTRACT

A communication apparatus includes a physical frame generating device configured to generate a single physical frame which includes a plurality of media access control frames having different destinations and in which frames, of the media access control frames, which have the same destination are consecutively arranged, and a transmitting device configured to transmit the physical frame generated by the physical frame generating device.

1 Claim, 54 Drawing Sheets

U.S. PATENT DOCUMENTS

| | | | |
|---|---|---|---|
| 7,016,651 B1 * | 3/2006 | Narasimhan | 455/67.11 |
| 7,039,068 B1 * | 5/2006 | Halasz | 370/473 |
| 7,054,296 B1 * | 5/2006 | Sorrells et al. | 370/338 |
| 7,106,803 B1 * | 9/2006 | Hsu | 375/279 |
| 7,110,380 B2 * | 9/2006 | Shvodian | 370/336 |
| 7,120,852 B2 * | 10/2006 | Terry et al. | 714/776 |
| 7,123,627 B2 * | 10/2006 | Kowalski | 370/468 |
| 7,164,663 B2 * | 1/2007 | Frank et al. | 370/328 |
| 7,224,704 B2 * | 5/2007 | Lu et al. | 370/476 |
| 7,324,605 B2 * | 1/2008 | Maltsev et al. | 375/299 |
| 7,342,940 B2 * | 3/2008 | Park | 370/470 |
| 7,349,436 B2 * | 3/2008 | Maltsev et al. | 370/471 |
| 7,447,232 B2 * | 11/2008 | Stephens et al. | 370/471 |
| 7,489,688 B2 * | 2/2009 | Giesberts et al. | 370/392 |
| 7,496,076 B2 * | 2/2009 | Takagi et al. | 370/338 |
| 7,570,656 B2 * | 8/2009 | Raphaeli et al. | 370/445 |
| 7,586,948 B2 * | 9/2009 | Hiddink et al. | 370/473 |
| 7,590,118 B2 * | 9/2009 | Giesberts et al. | 370/392 |
| 7,600,039 B2 * | 10/2009 | Tang et al. | 709/238 |
| 2005/0111462 A1 * | 5/2005 | Walton et al. | 370/395.4 |
| 2005/0152358 A1 * | 7/2005 | Giesberts et al. | 370/389 |
| 2005/0152359 A1 * | 7/2005 | Giesberts et al. | 370/389 |
| 2006/0034174 A1 * | 2/2006 | Nishibayashi et al. | 370/235 |
| 2008/0165713 A1 * | 7/2008 | Nishibayashi et al. | 370/310 |
| 2008/0181251 A1 * | 7/2008 | Nishibayashi et al. | 370/445 |

FOREIGN PATENT DOCUMENTS

| | | |
|---|---|---|
| JP | 5-48610 | 2/1993 |
| JP | 2003-115859 | 4/2003 |
| JP | 2003-179610 | 6/2003 |
| JP | 2005-57373 | 3/2005 |

OTHER PUBLICATIONS

IEEE Std 802.11a-1999, Supplement to IEEE standard for information technology telecommunications and information exchange between systems—local and metropolitan area networks—specific requirements. Part 11: wireless LAN Medium Access Control (MAC) and Physical Layer (PHY) specifications: high-speed physical layer in the 5 GHz band.*

IEEE 802.11b-1999, Supplement To IEEE Standard For Information Technology- Telecommunications And Information Exchange Between Systems- Local And Metropolitan Area Networks- Specific Requirements- Part 11: Wireless LAN Medium Access Control (MAC) And Physical Layer (PHY) Specifications: Higher-speed Physical Layer Extension In The 2.4 GHz Band.*

IEEE 802.15.3 IEEE Standard for Information technology—Telecommunications and information exchange between systems—Local and metropolitan area networks—specific requirements Part 15.3: Wireless Medium Access Control (MAC) and Physical Layer (PHY) Specifications for High Rate Wireless Personal Area Networks (WPANs).*

U.S. Appl. No. 11/029,544.
U.S. Appl. No. 12/049,031, filed Mar. 14, 2008, Nishibayashi, et al.
U.S. Appl. No. 12/054,945, filed Mar. 25, 2008, Nishibayashi, et al.
U.S. Appl. No. 11/110,936, filed Apr. 21, 2005, Nishibayashi et al.
U.S. Appl. No. 11/135,358, filed May 24, 2005, Nakajima, et al.
U.S. Appl. No. 11/137,588, May 26, 2005, Nishibayashi, et al.
U.S. Appl. No. 11/200,103, filed Aug. 10, 2005, Nishibayashi et al.
U.S. Appl. No. 11/201,258, filed Aug. 11, 2005, Nishibayashi et al.
U.S. Appl. No. 11/525,994, filed Sep. 25, 2006, Nishibayashi, et al.

* cited by examiner

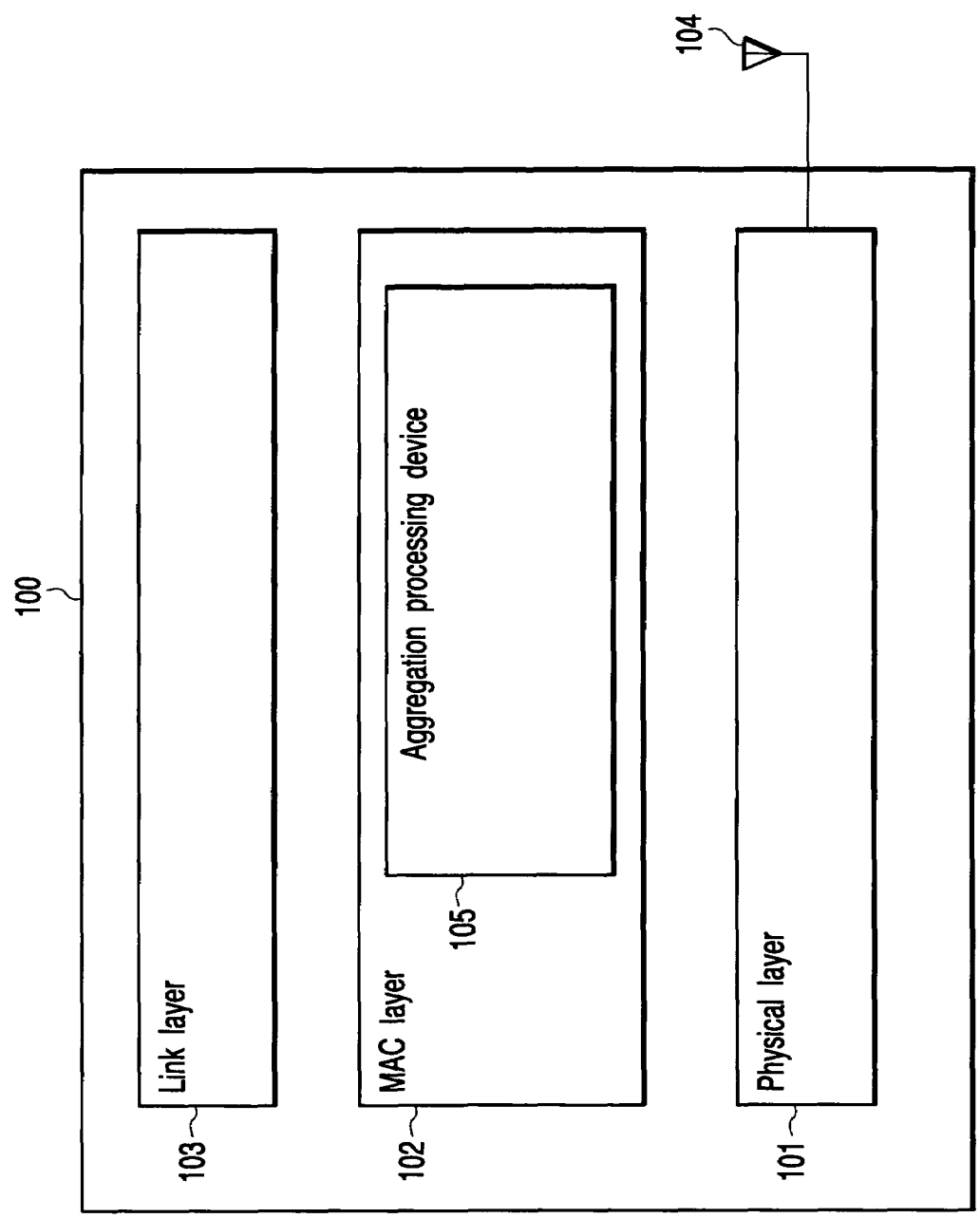

※ Example of frame sequence to be executed when there is no error over the wireless medium

FIG. 9A

When frames addressed to plural destinations are simply aggregated

40

| DEST1 | DEST3 | DEST2 | DEST1 | DEST3 | DEST2 | DEST1 | DEST3 |

90

※ When destinations are randomly aggregated and transmitted and packet error occurs as a result of FCS calculation, it is impossible to determine, on receiving side, how many MAC frames exist for each destination and what reception status they are set. Partial responses (Partial Acks) cannot therefore be successfully returned.

FIG. 9B

When no Multi Address Bitmap is used

91

| DEST1 | DEST1 | DEST2 | DEST2 | DEST3 | DEST3 |

42

※ Without information representing delimit for each destination, DEST3 cannot determine from which its destination starts, and hence cannot successfully return partial response (Partial Ack)

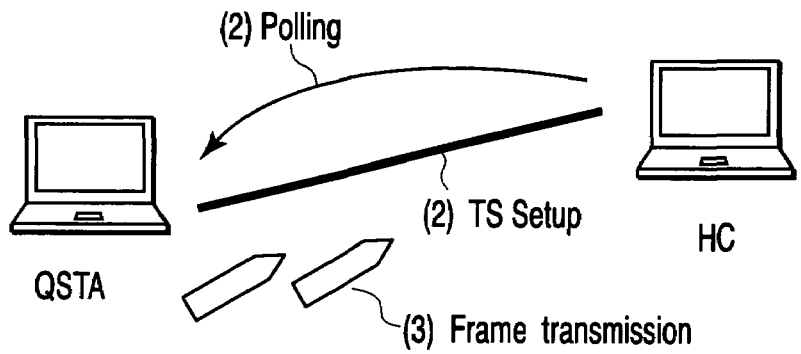
F I G. 1 4
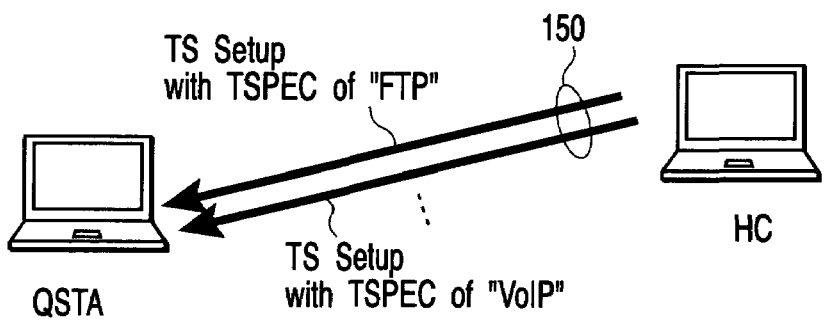
F I G. 1 5
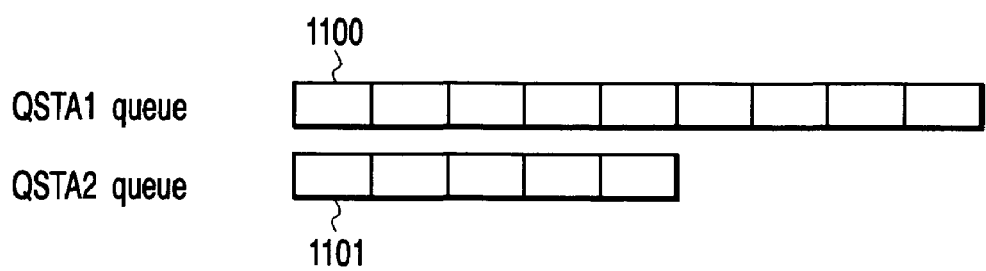
F I G. 1 6

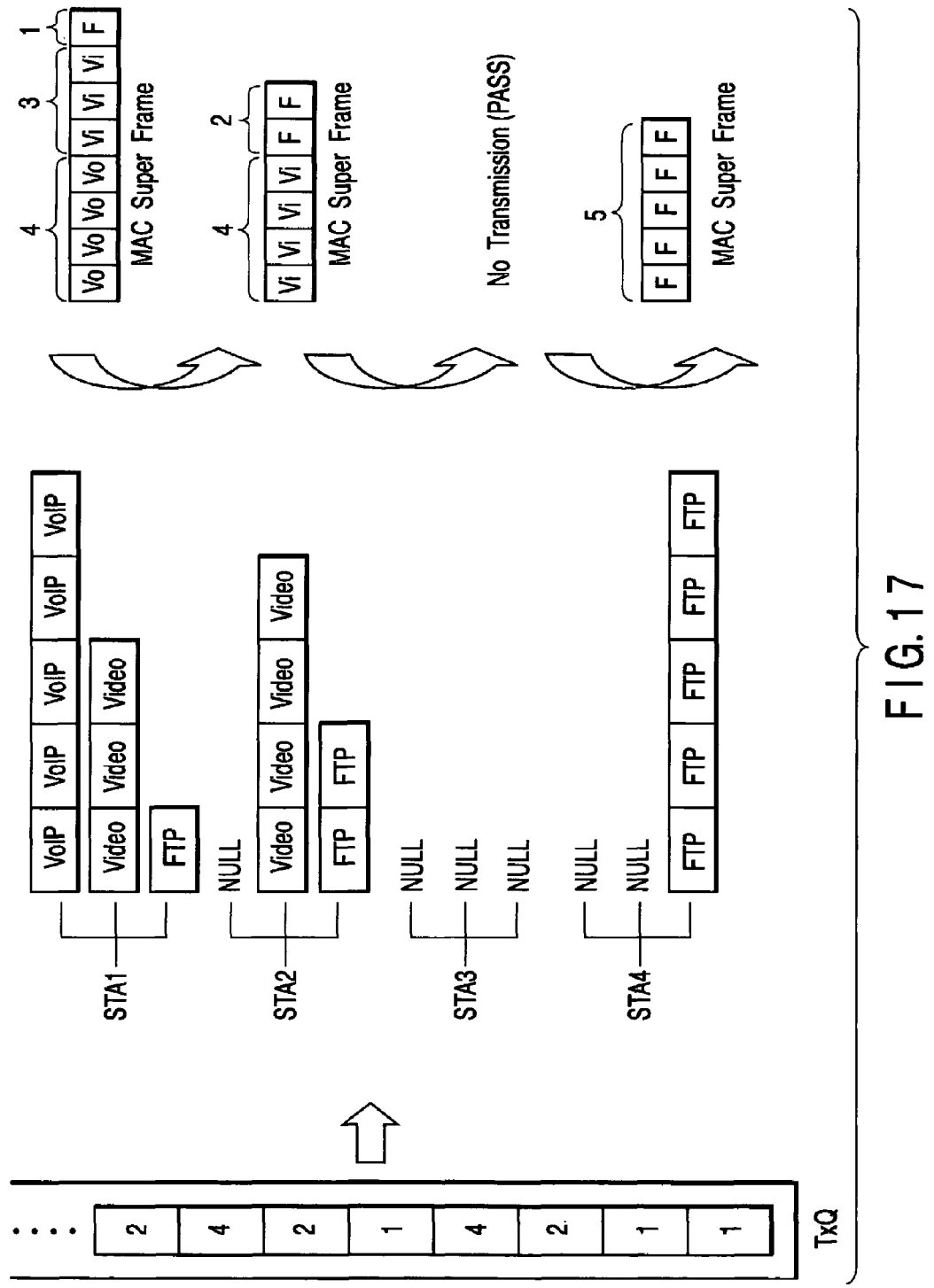
F I G. 17

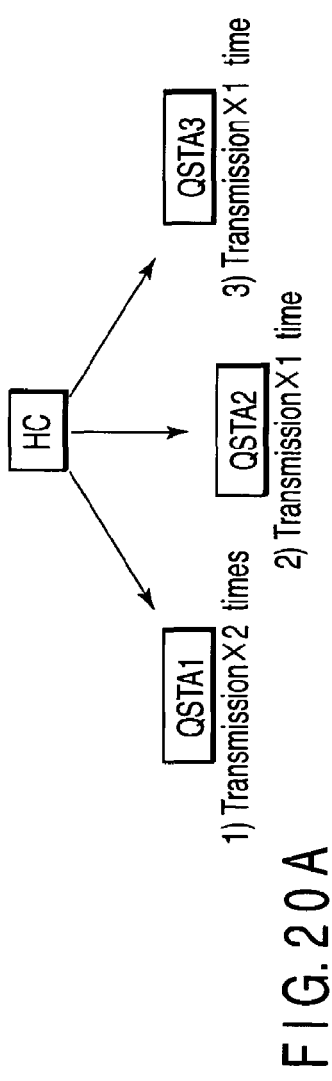
F I G. 20 A
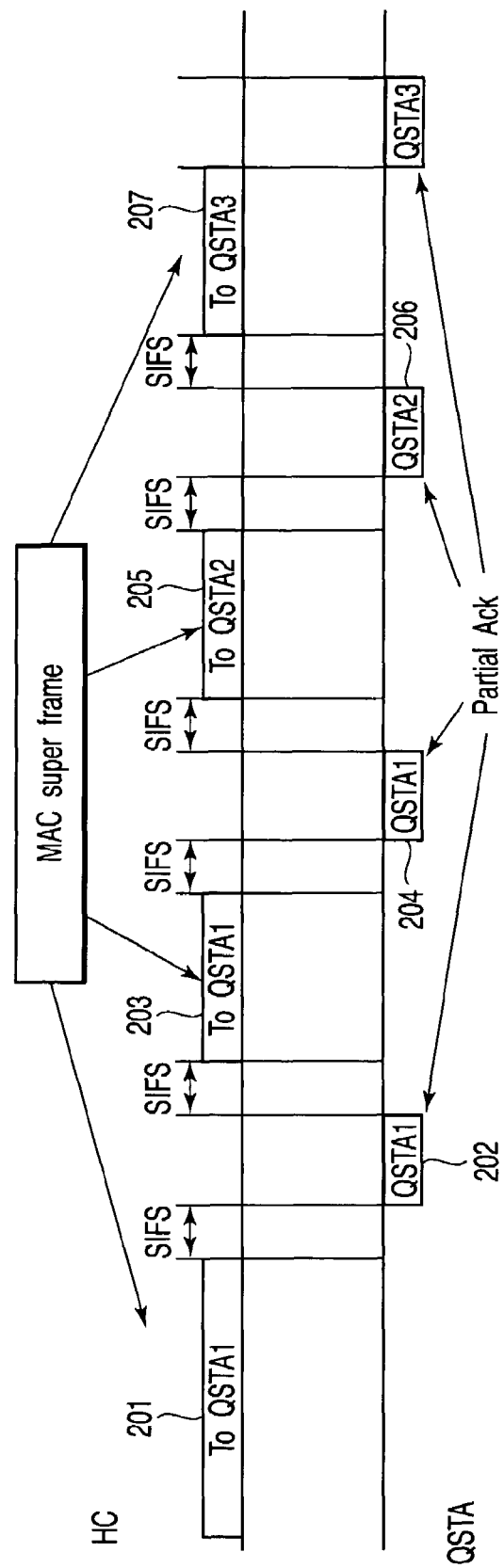
F I G. 20 B

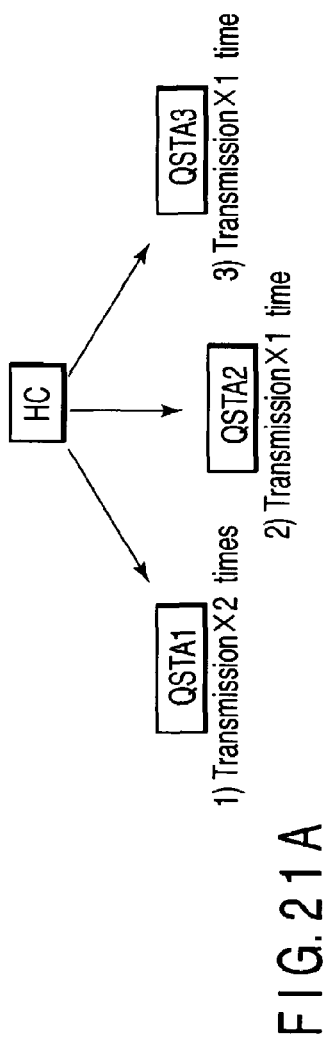
F I G. 21 A
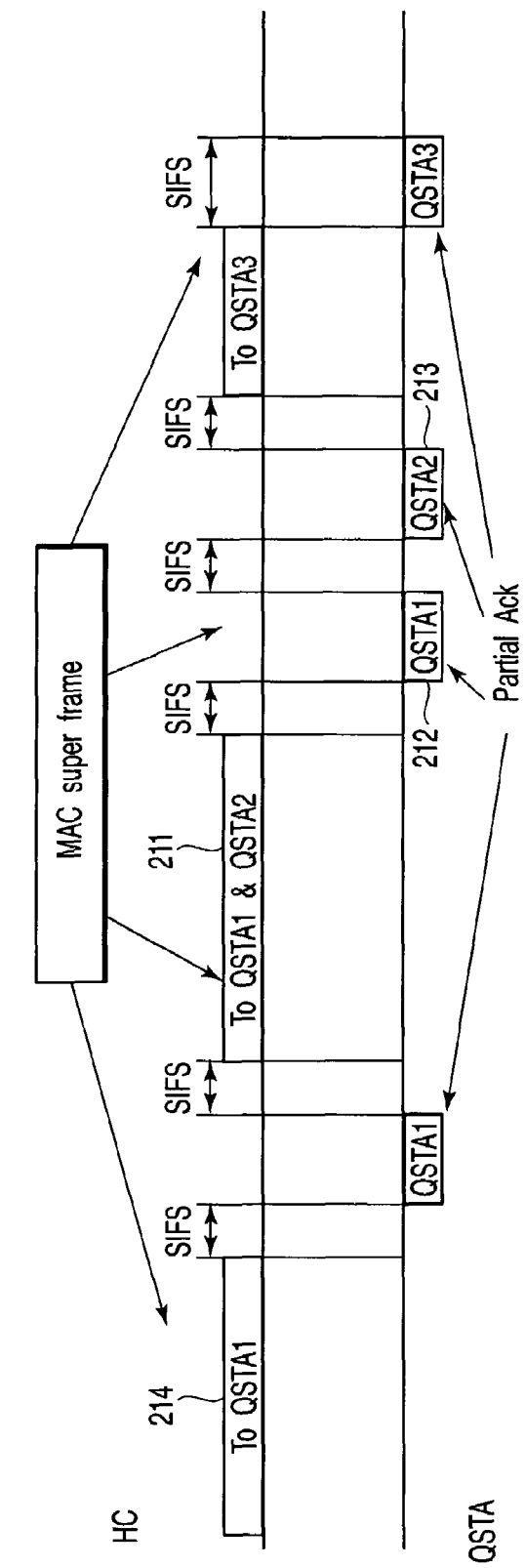
F I G. 21 B
※ Example of transmission sequence to be executed when there is no error over the wireless medium Example of transmission sequence to plural destinations ※ Example of frame sequence to be used when there is no error over the wireless medium

FIG. 43

Example of aggregate in retransmission

| PSDU | |
|---|---|
| MPDU separation 1 (with CRC) | MPDU 1 |
| MPDU separation 2 (with CRC) | MPDU size of successfully transmitted portion is 0 |
| MPDU separation 3 (with CRC) | MPDU 3 |
| MPDU separation 4 (with CRC) | MPDU size of successfully transmitted portion is 0 |
| MPDU separation 5 (with CRC) | MPDU 5 |
| MPDU separation 6 (with CRC) | MPDU size of successfully transmitted portion is 0 |
| MPDU separation 7 (with CRC) | MPDU 7 |
| MPDU separation 8 (with CRC) | MPDU 8 |

※ MPDU length field in MPDU separation which request no retransmission and has been successfully received is also designated 0

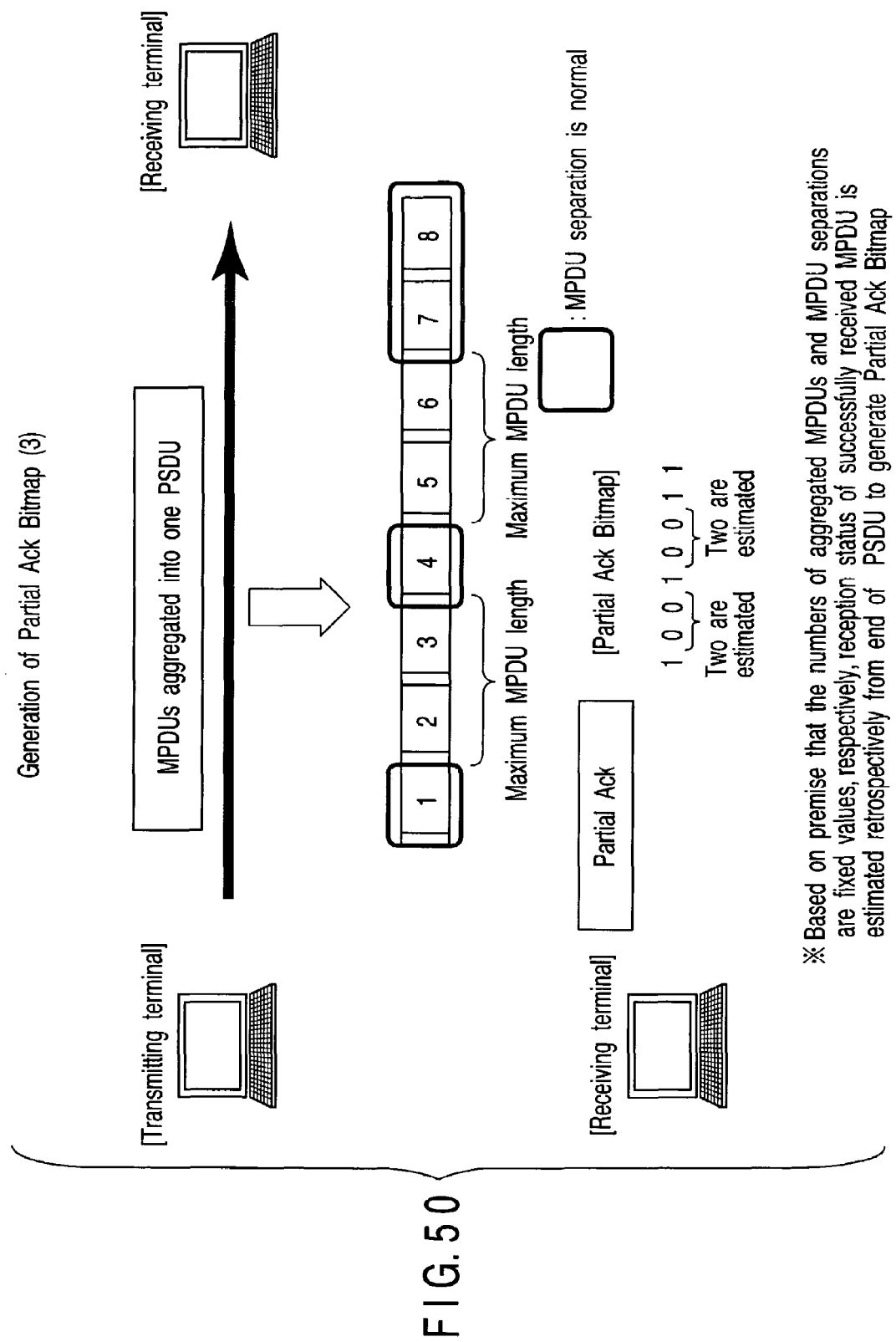
F I G. 50

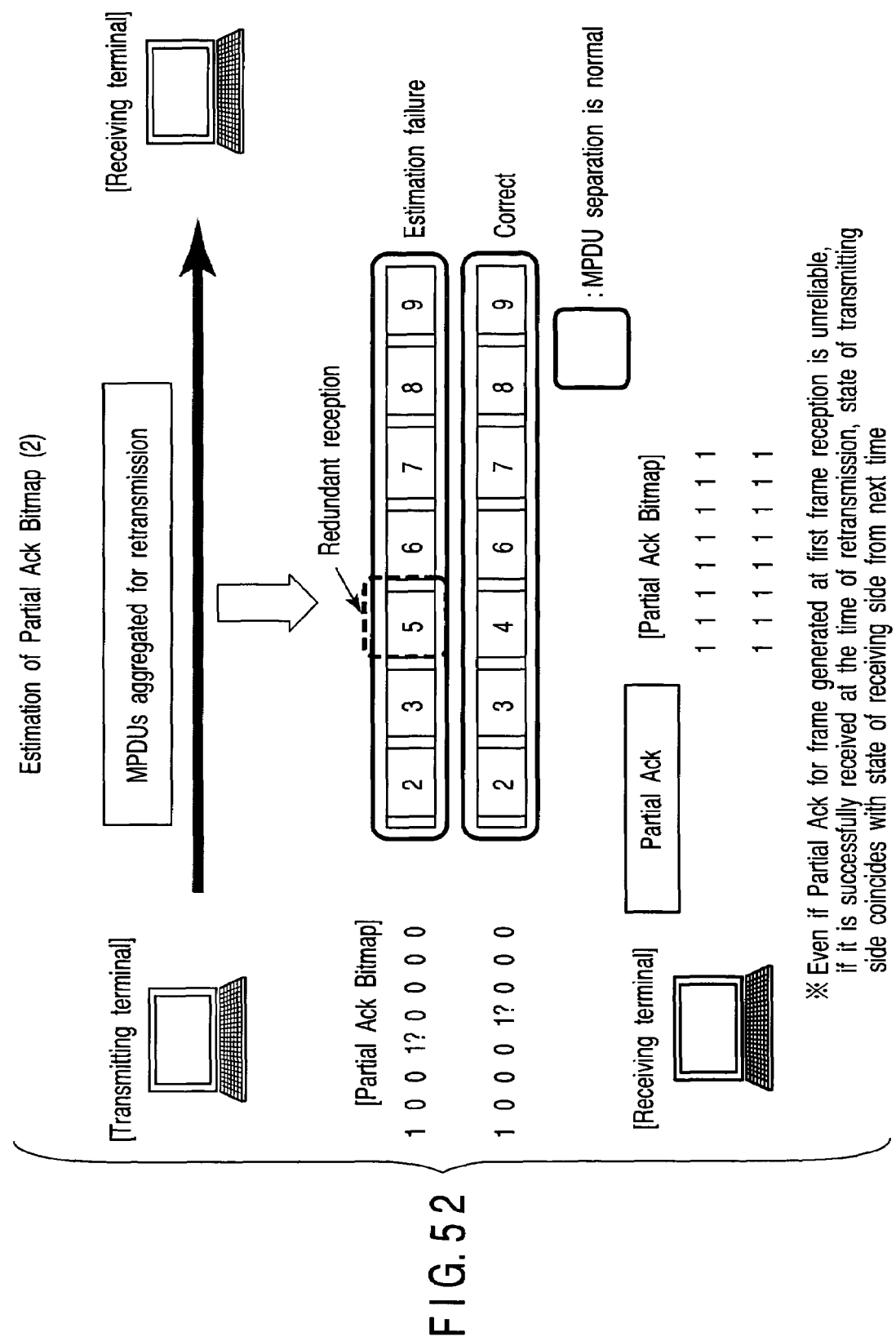
F I G. 52

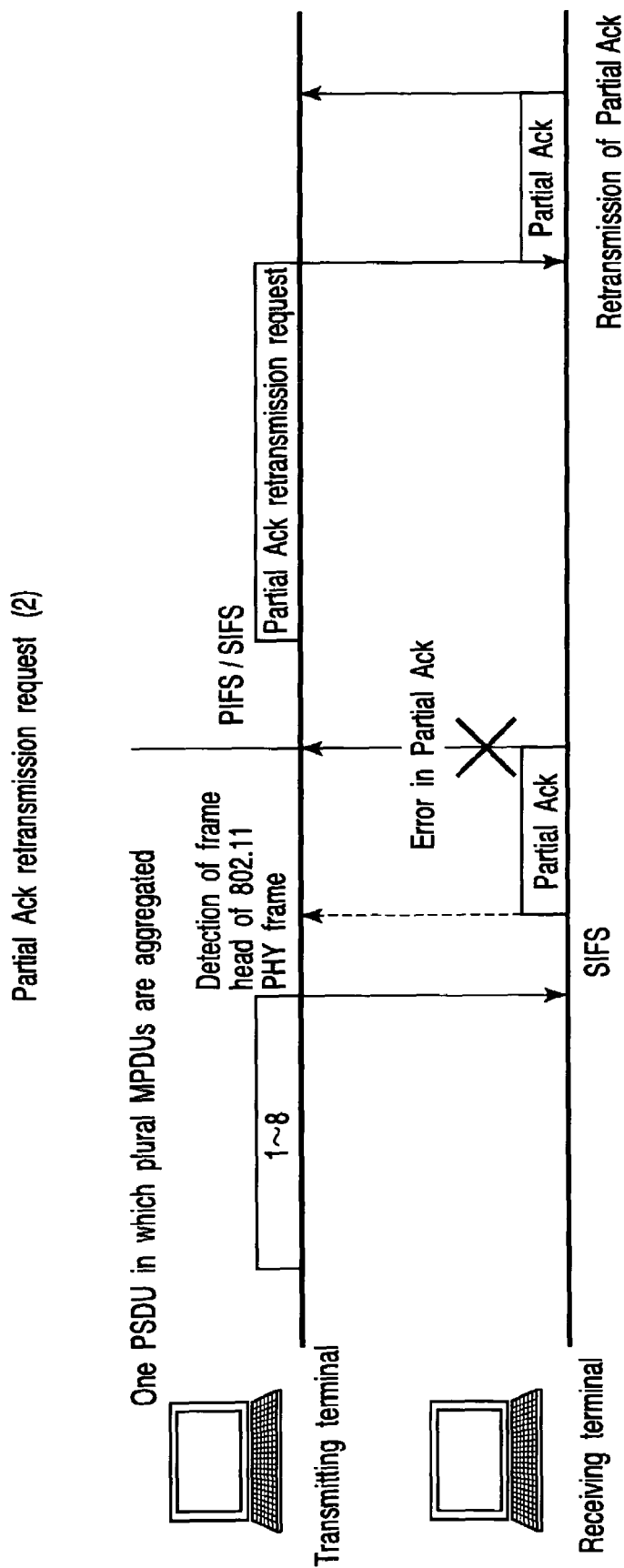
F I G. 5 5

COMMUNICATION APPARATUS, COMMUNICATION SYSTEM, COMMUNICATION METHOD, AND COMMUNICATION CONTROL PROGRAM

CROSS-REFERENCE TO RELATED APPLICATIONS

This application is based upon and claims the benefit of priority from prior Japanese Patent Applications No. 2004-110446, filed Apr. 2, 2004; and No. 2004-180226, filed Jun. 17, 2004, the entire contents of both of which are incorporated herein by reference.

BACKGROUND OF THE INVENTION

1. Field of the Invention

The present invention relates a communication apparatus, communication system, communication method, and communication control program which perform media access control (MAC) and, more particularly, to frame aggregation for transmitting a plurality of media access control frames (MAC frames) upon containing them in one physical frame (PHY frame).

2. Description of the Related Art

Media access control (MAC) is control for causing a plurality of communication apparatuses which perform communication while sharing the same medium to decide how to use the medium in transmitting communication data or management frame. Owing to media access control, even if two or more communication apparatuses transmit communication data (or management frame) by using the same medium at the same time, there is less chance of the occurrence of a phenomenon (collision) in which a communication apparatus on the receiving side cannot decode communication data. Media access control is also a technique for controlling access from communication apparatuses to a medium so as to minimize the chance of the occurrence of a phenomenon in which, despite the presence of communication apparatuses having transmission requests, the medium is not used by any of the communication apparatuses.

In radio communication, since it is difficult for a communication apparatus to monitor transmission data while transmitting the data, media access control which is not premised on collision detection is required. IEEE 802.11, which is a typical technical standard for wireless LANs, uses CSMA/CA (Carrier Sense Multiple Access with Collision Avoidance). According to CSMA/CA in IEEE 802.11, the MAC header has the duration value which is the time, in microseconds, required to transmit the data or management frame (also including SIFS interval). In this duration, a communication apparatus which is irrelevant to the sequence and has no transmission right waits for transmission upon determining a virtual busy state of the wireless medium. This prevents the occurrence of collision. The CSMA/CA is designed to reduce the collision probability. IEEE 802.11 defines that the state of a medium is determined on the basis of such a combination of virtual carrier sense on a MAC layer and physical carrier sense on a physical layer (PHY layer), and media access control is performed on the basis of the determination.

IEEE 802.11 using CSMA/CA has increased the communication speed mainly by changing the physical layer protocol. With regard to the 2.4 GHz band, there have been changes from IEEE 802.11 (established in 1997, 2 Mbps) to IEEE 802.11b (established in 1999, 11 Mbps), and further to IEEE 802.11g (established in 2003, 54 Mbps). With regard to the 5 GHz band, only IEEE 802.11a (established in 1999, 54 Mbps) exists as a standard. In order to develop standard specifications directed to further increase communication speeds in both the 2.4 GHz band and the 5 GHz band, IEEE 802.11 TGn (Task Group n) has already been established.

Even if an attempt to increase the communication speed in terms of physical layer succeeds, the effective throughput of communication cannot be improved. That is, when an increase in the communication speed of the physical layer is realized, the format of a PHY frame (PHY header and PHY preamble) ceases to be effective any more. An increase in overhead due to this may hinder an increase in throughput. In a PHY frame, a temporal parameter associated with CSMA/CA is permanently attached to a MAC frame. In addition, a PHY frame header is required for each MAC frame.

As a method of solving the problem of overhead and increasing throughput, a block response (Block acknowledgement) mechanism introduced in recently drafted IEEE 802.11e/draft 5.0 (enhancement of QoS in IEEE 802.11) is available. The block response mechanism can consecutively transmit a plurality of MAC frames without any random backoff (with SIFS interval), and hence can reduce the backoff amount to some degree. However, the overhead of a physical layer header and preamble cannot be effectively reduced. In addition, according to aggregation introduced in initially drafted IEEE 802.11e, both the backoff amount and the physical layer header can be reduced. However, since the length of a physical layer frame containing MAC frames cannot be increased beyond about 4 kbytes under the conventional limitation on the physical layer, an improvement in efficiency is greatly limited. Even if the length of a PHY layer frame can be increased, another problem arises, i.e., a reduction in error tolerance.

BRIEF SUMMARY OF THE INVENTION

It is therefore required to solve the problem of overhead accompanying the transmission of a plurality of frames upon an improvement in the efficiency of a frame format and increase the effective throughput of communication.

Accordingly, the present invention is directed to provide a communication apparatus, communication system, communication method, and communication control program which can improve throughput by aggregating multiple MAC frames addressed to different destinations.

A communication apparatus according to an aspect of the present invention includes a physical frame generating device configured to generate a physical frame which is a single physical frame which includes multiple MAC frames various destinations, and these MAC frames which have the same destination are consecutively arranged. And the present invention also includes a transmitting device configured to transmit the physical frame generated by the physical frame generating device.

BRIEF DESCRIPTION OF THE SEVERAL VIEWS OF THE DRAWING

FIG. 1 is a block diagram showing the arrangement of a communication apparatus according to embodiments of the present invention;

FIGS. 9A and 9B are views for explaining problems which arise when destinations are randomly aggregated and when no Multi Address Bitmap is used;

FIG. 14 is a schematic view showing a communication procedure for the execution of QoS;

FIG. 15 is a view showing a downlink traffic according to the second embodiment of the present invention;

FIG. 16 is a view showing downlink traffic destination queues for the respective QSTAs;

FIG. 17 is a view for explaining frame transmission by round robin;

FIGS. 20A and 20B are views showing a case wherein different destinations are not aggregated;

FIGS. 21A and 21B are views showing a case wherein frame aggregation of a plurality of destinations is executed together with QoS according to the second embodiment of the present invention;

FIG. 43 is a view showing an example of aggregation at the time of retransmission;

FIG. 50 is a view showing aggregation transmission and Partial Ack;

FIG. 52 is a view for explaining the estimation of a Partial Ack Bitmap;

FIG. 55 is a view for explaining a Partial Ack retransmission request according to the eighth embodiment of the present invention.

DETAILED DESCRIPTION OF THE INVENTION

Figure 2A:
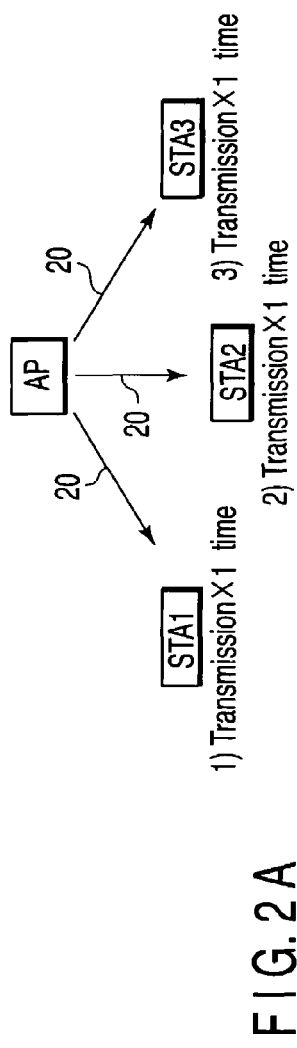
FIGS. 2A and 2B are views showing downlinks between an access point (AP) and a plurality of wireless stations (STAs) and a transmission sequence for a unicast frame in the downlinks.

The embodiments of the present invention will be described below with reference to the views of the accompanying drawing.

First Embodiment

FIG. 1 is a block diagram showing the arrangement of a communication apparatus according to an embodiment of the present invention. A communication apparatus 100 is an apparatus configured to communicate with another communication apparatus through a radio link, and includes processing units 101, 102, and 103 respectively corresponding to a physical layer (PHY layer), MAC layer, and link layer. These processing units are implemented as analog or digital electronic circuits in accordance with implementation requirements. Alternatively, the processing units are implemented as firmware or the like to be executed by a CPU incorporated in an LSI. An antenna 104 is connected to the processing unit 101 corresponding to the physical layer. The MAC layer 102 includes an aggregation processing device 105 according to the present invention.

The aggregation processing device 105 generates a PHY (physical) frame containing a plurality of media access control (MAC) frames (MPDUs). MPDU is an abbreviation for an MAC Protocol Data Unit. PSDU is an abbreviation for a Physical Layer Convergence Protocol service data unit.

A generated physical frame is processed by the processing unit 101 corresponding to the physical layer (PHY layer) and transmitted from the antenna 104. In this specification, such a communication scheme will be referred to as "frame aggregation". Frame aggregation is suitable for the next-generation high-throughput wireless LAN communication (IEEE 802.11n standard) which is currently being developed. In the embodiment of the present invention, the aggregation processing device 105 performs frame aggregation of a plurality of MAC frames addressed to different destinations. More specifically, the first embodiment of the present invention is directed to a radio communication system which improves the channel utilization efficiency in downlink transmission from an AP by aggregating a plurality of MAC frames addressed to different destinations into one physical frame.

Figure 2B:
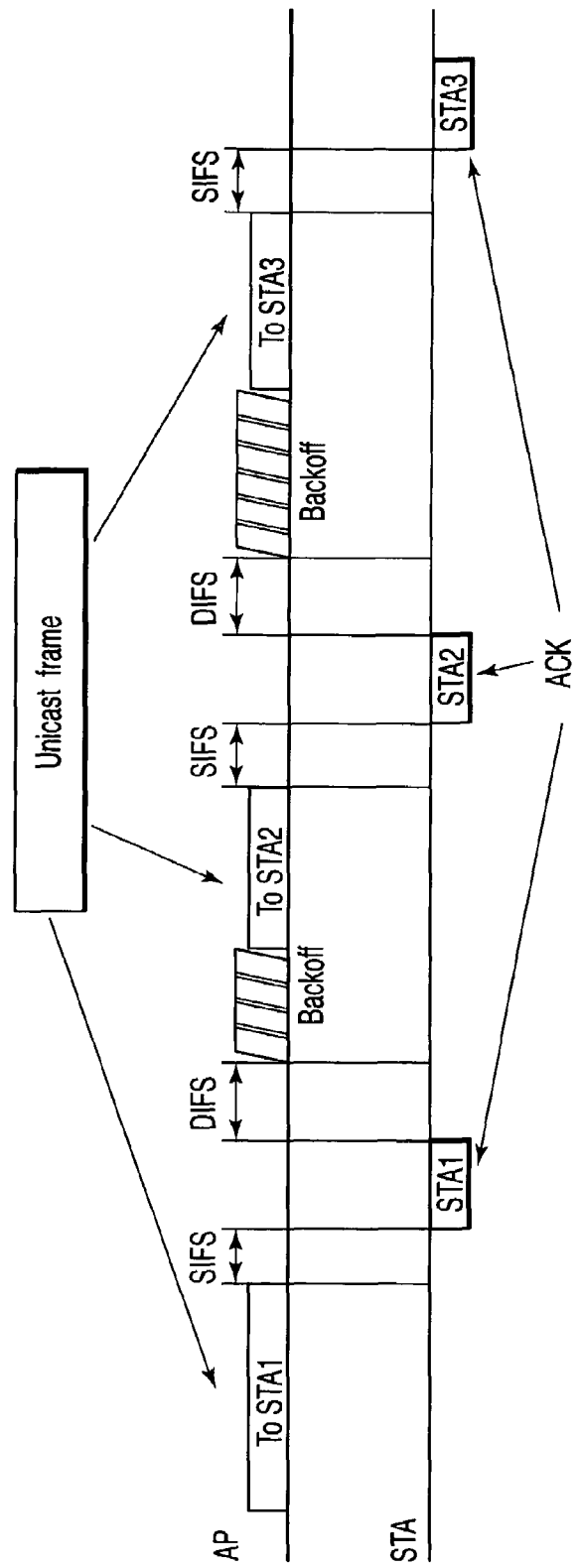

FIGS. 2A and 2B are views respectively showing the downlinks between an access point (AP) and a plurality of wireless stations (STAs) and a transmission sequence for a unicast frame in the downlinks. In downlinks 20, frames are transmitted from an AP to STAs 1, 2, and 3. In contrast to this, transmission of frames from STAs 1, 2, and 3 to the AP is called uplink transmission. In the example shown in FIG. 2A, frame aggregation is applied to access by DCF (Distributed Coordination Function). In this case, data transmission and a frame sequence for ACK (acknowledgement) reception are executed in accordance with DCF. Note that the embodiments of the present invention are not limited to DCF, and can also be applied to access by PCF (Point Coordination Function) and access based on consideration of IEEE 802.11e QoS. A case wherein consideration is given to QoS will be described in the second and subsequent embodiments.

Consider a case wherein a unicast frame is transmitted from an AP to a plurality of STAs. As is obvious from FIG. 2B, no frame can be sent to the next destination unless an ACK is received and a carrier sense period (a DIFS period in this case) and backoff period elapse. When a frame is to be transmitted to many destinations, the channel idle period increases, which decreases transmission efficiency.

On the MAC layer of a wireless LAN, transmitting one MAC frame to one destination terminal is generally called "unicast". Transmitting one MAC frame to a plurality of destinations as reception targets is called "multicast". In contrast, in the description of the embodiments of the present invention, transmitting a plurality of MAC frames to a plurality of destinations as reception targets upon aggregating the frames into one physical frame will be called "simulcast".

Figure 3A:
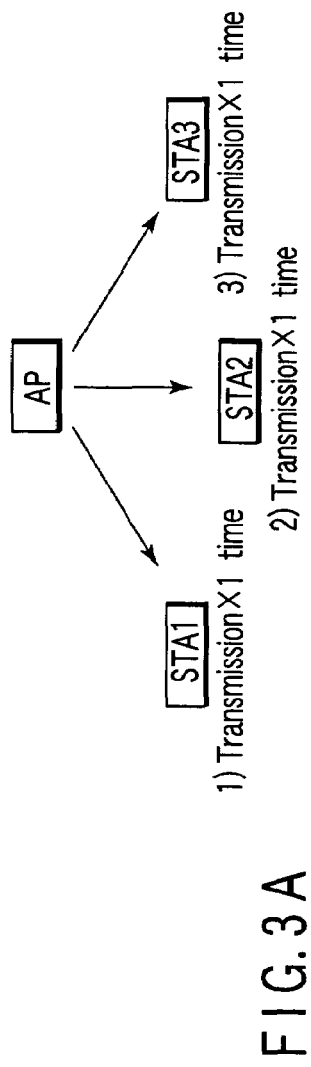
FIGS. 3A and 3B are views for explaining collision between Partial Ack frames.
Figure 3B:
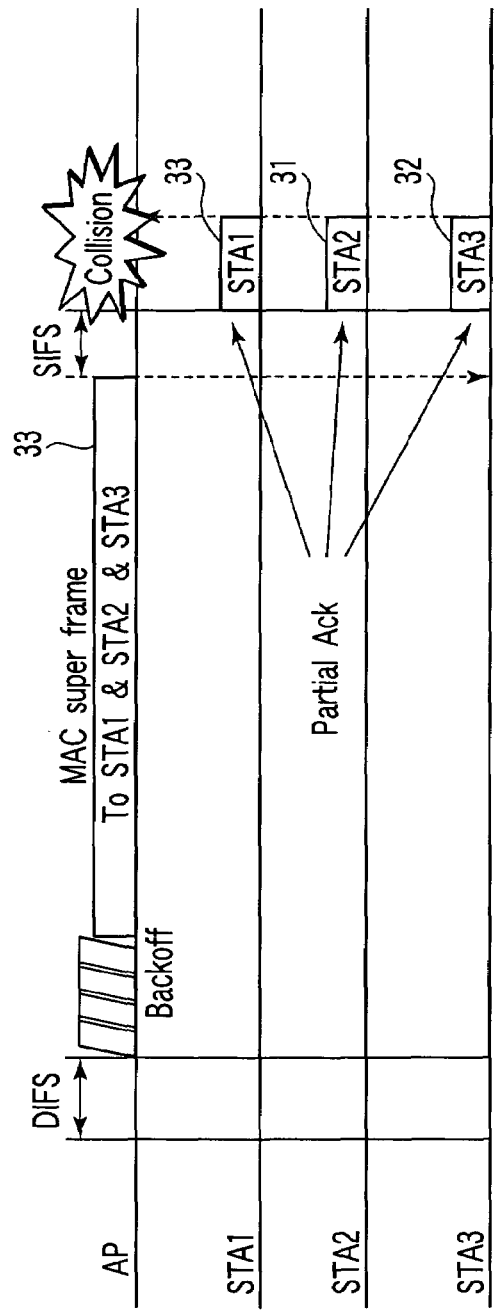

Consider a case wherein MAC frames addressed to a plurality of destinations are simply aggregated into one physical frame and the physical frame is simulcasted from an AP to each STA. In this case, as shown in FIG. 3, a problem arises such that Partial Ack frames 30, 31, and 32 from the respective receiving terminals for a simulcast MAC super frame 33 collide with each other to result in communication failure. According to the IEEE 802.11 standard, upon receiving a unicast frame, an STA immediately returns an ACK frame after the lapse of an SIFS period without checking the state of wireless medium. It is therefore inevitable that ACK frames from a plurality of STAs will collide with each other, as shown in FIG. 3B.

A communication system according to the first embodiment of the present invention is designed to simulcast a MAC super frame containing a plurality of MAC frames with different destinations from an AP to STAs and make each STA control the transmission timing in transmitting an ACK frame to the AP so as to avoid collision with ACK frames from the other STAs.

Figure 4:
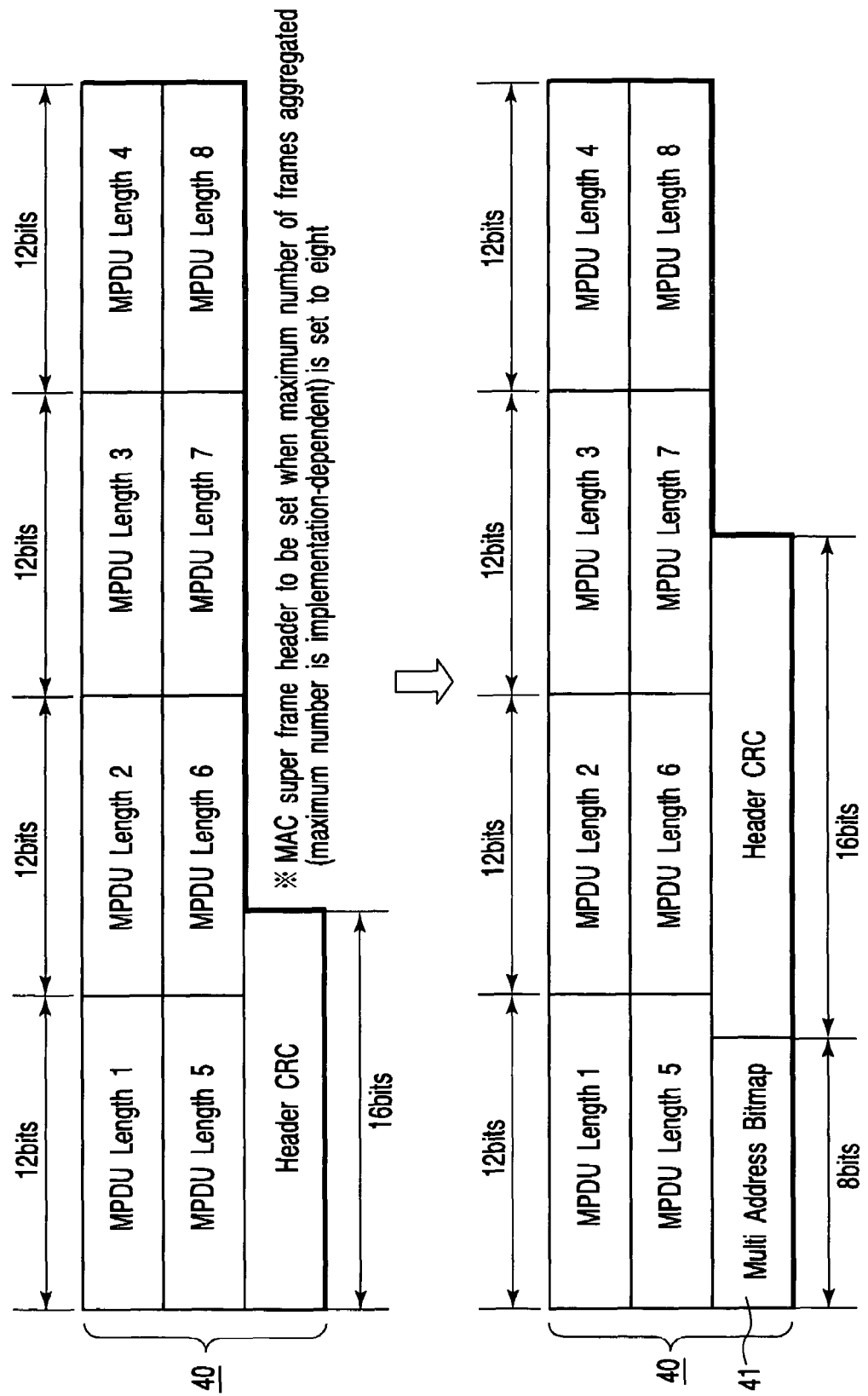
FIG. 4 is a view showing an example of the format of a MAC super frame header according to the embodiments of the present invention.
Figure 5:
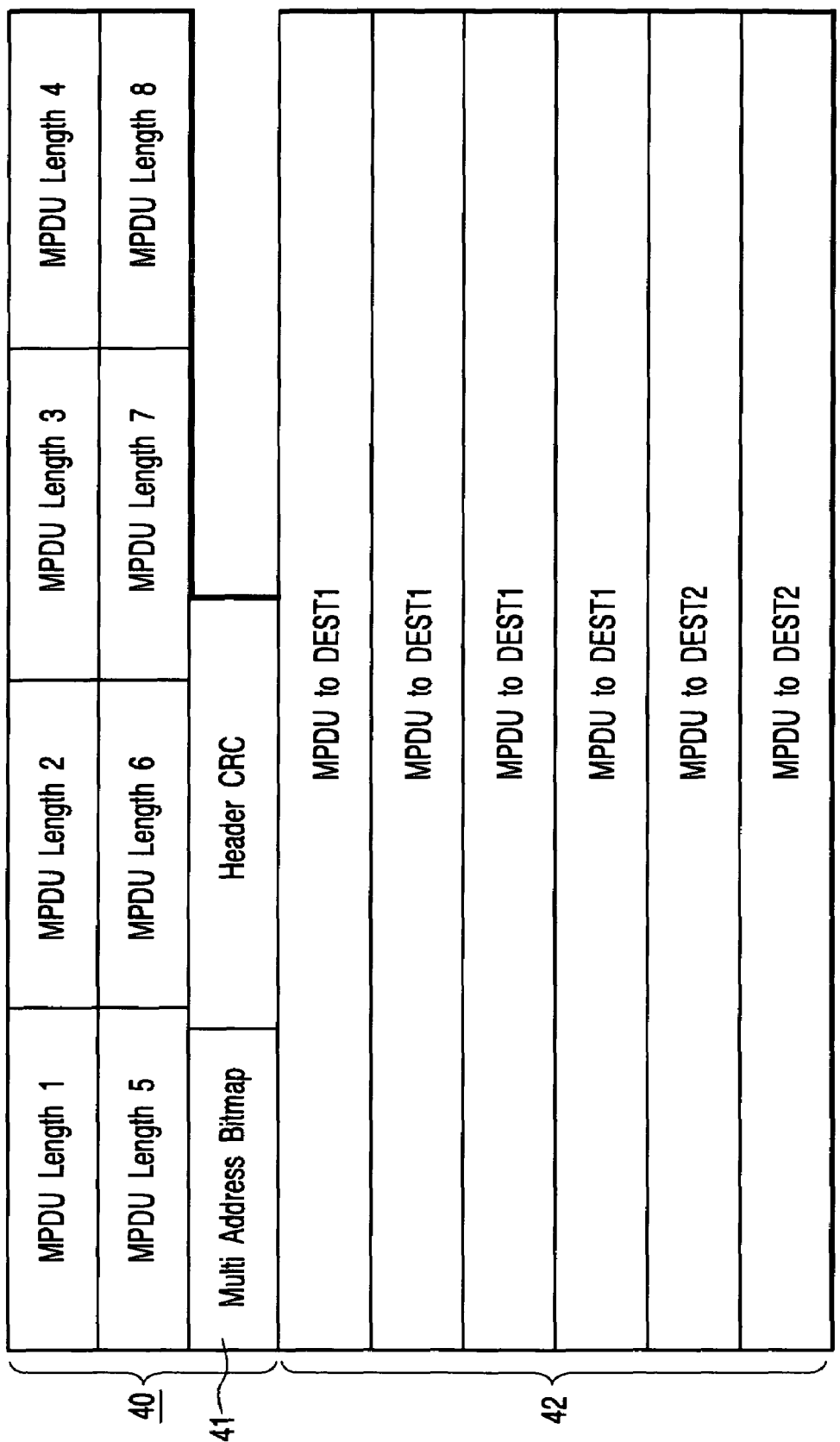
FIG. 5 is a view showing an example of the format of an overall MAC super frame according to the embodiments of the present invention.

The transmitting side (the AP in this case) will be described first. As shown in FIG. 4, the AP adds information 41 indicating the presence of a plurality of addresses (destinations) to a MAC super frame header 40. The information 41 will be referred to as a "Multi Address Bitmap" hereinafter. FIG. 5 shows an example of the format of an overall MAC super frame extended in this manner. The Multi Address Bitmap 41 in FIG. 4 is designated to have a size of eight bits as bitmap information corresponding to a case wherein the maximum number of frames aggregated is set to 8. However, this information size may be arbitrarily determined in accordance with the maximum number (implementation-dependent) of MAC frames aggregated.

A Multi Address Bitmap associated with the embodiment of the present invention will be described next. A Multi Address Bitmap is information indicating the presence of a plurality of destinations. This information is comprised of bits respectively corresponding to the aggregated MAC frames and indicates delimiters for a plurality of destinations. That is, a Multi Address Bitmap is also information associated with the positions of MAC frames in the MAC super frame, which have different destinations that change as compared with preceding MAC frames.

Figure 6:
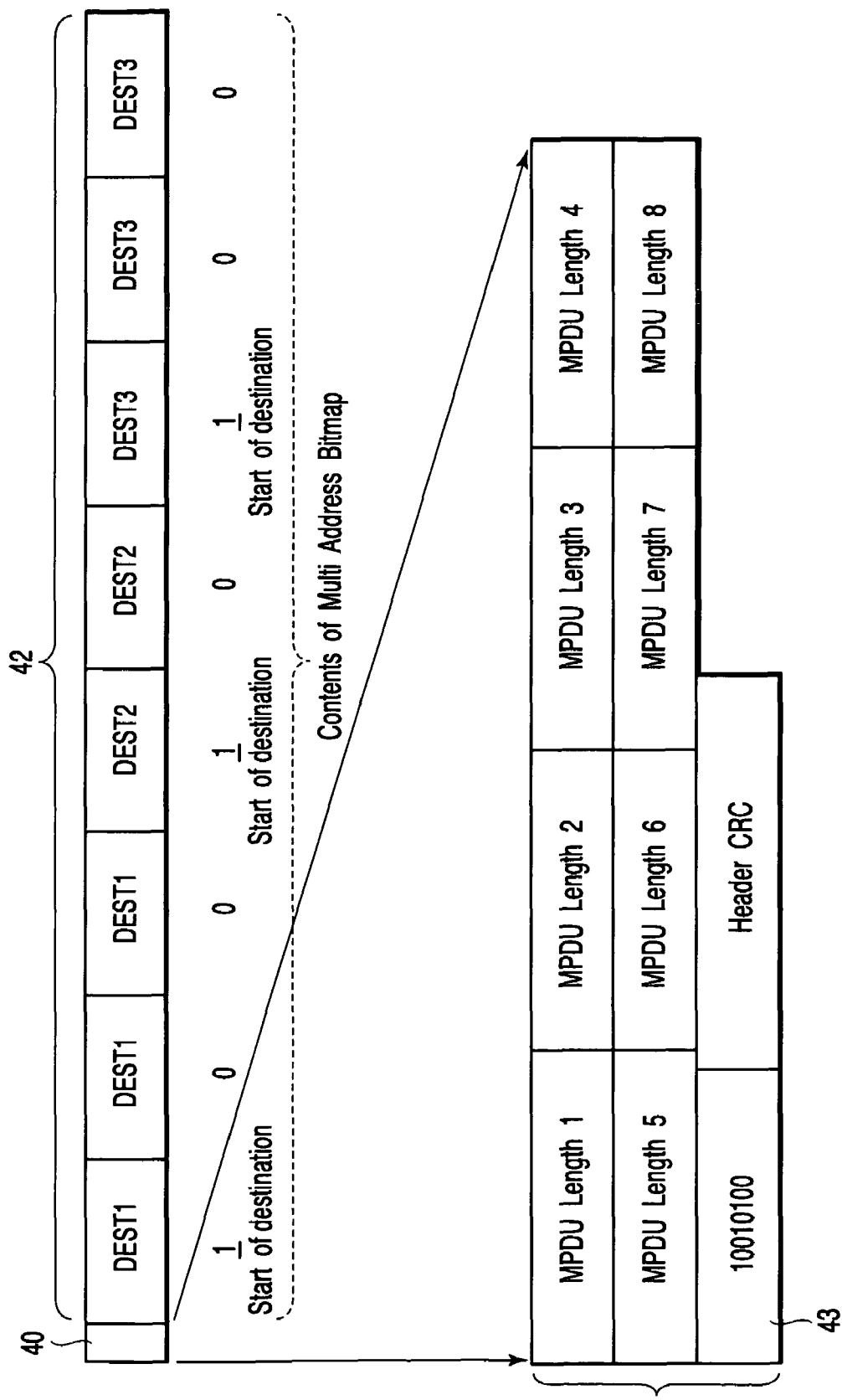
FIG. 6 is a view showing a Multi Address Bitmap representing the start position of each destination according to the embodiments of the present invention.

As shown in FIG. 6, when a bit corresponded to at the start of a given destination is set, the corresponding bit position can indicate a destination delimiter. In a Multi Address Bitmap 43 shown in FIG. 6, a bit "1" is set at the start of each destination. So, the Multi Address Bitmap is expressed as "10010100". However, "0" may be used instead of "1". In negative logic case, the Multi Address Bitmap shown in FIG. 6 is expressed as "01101011".

Figure 7:
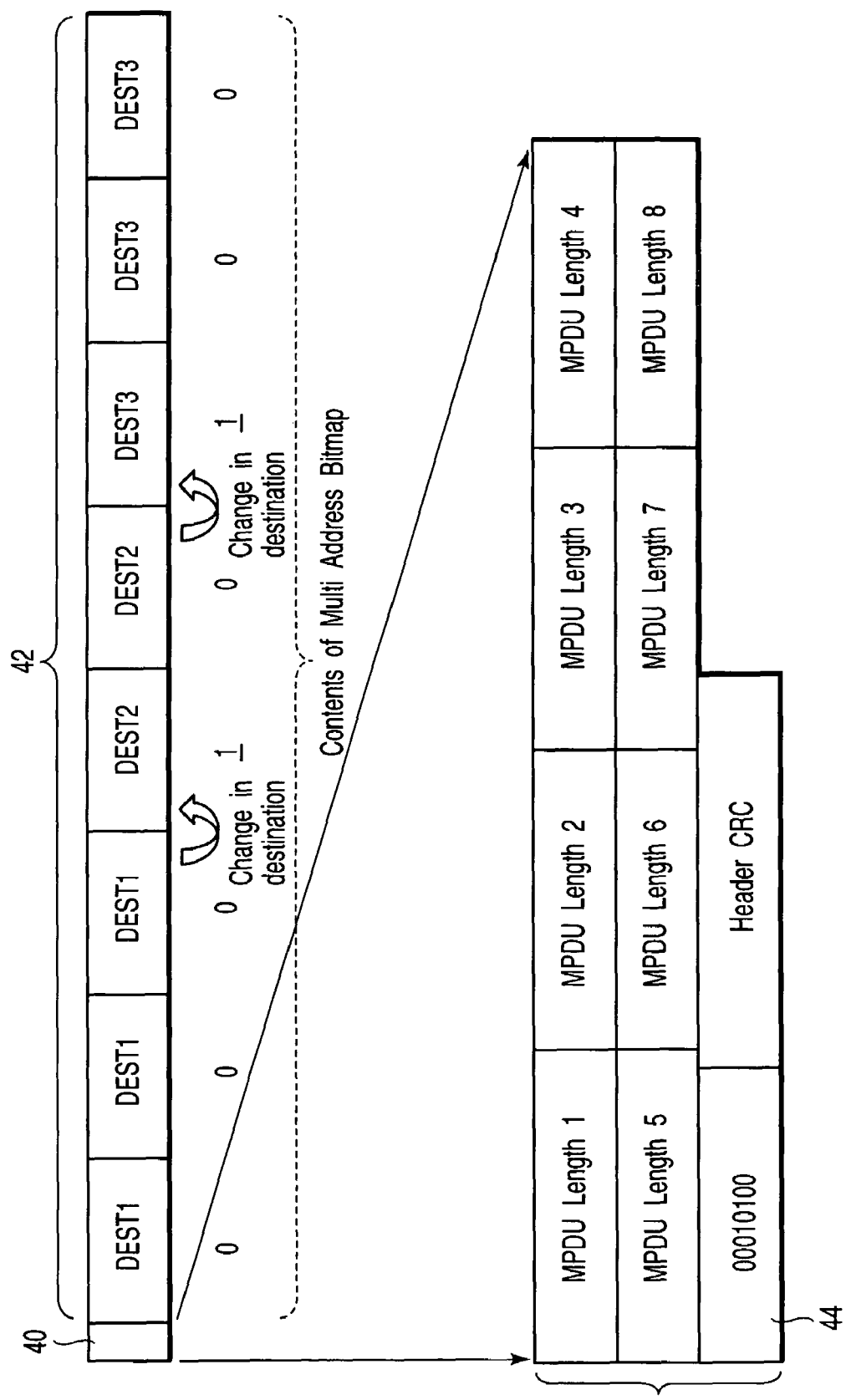
FIG. 7 is a view showing a Multi Address Bitmap representing changes in destination according to the embodiments of the present invention.

A Multi Address Bitmap can also be used to indicate a change in destination. In this case, as shown in FIG. 7, when a given destination changes to another destination, the corresponding bit is set. In a Multi Address Bitmap 44 shown in FIG. 7, a bit "1" is set corresponding to each change point. However, as in the above case, "0" may be used instead of "1".

A transmitting terminal (AP) designed to generate a MAC super frame having a plurality of destinations needs to delimit MAC frames for the respective destinations and aggregate them. In this case, "to delimit MAC frames for the respective destinations" includes consecutively arranging frames having the same destination in the MAC super frame.

Figure 8:
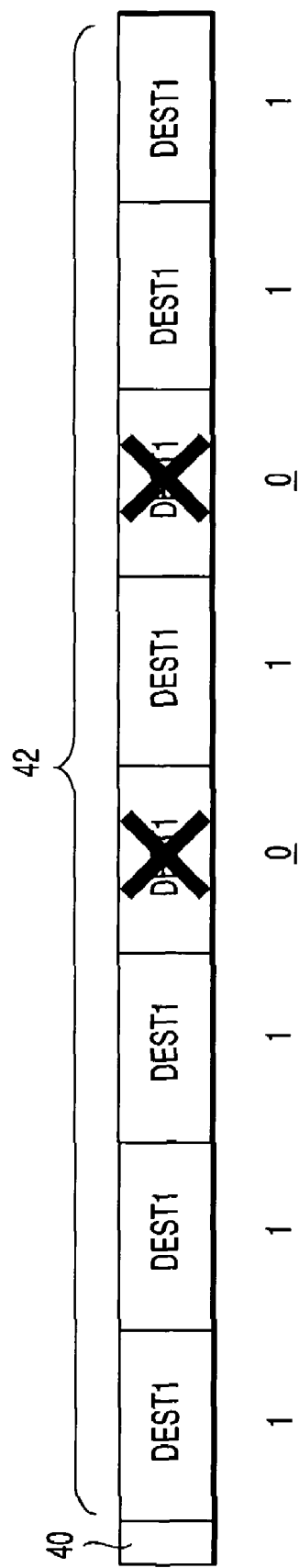
FIG. 8 is a view showing an example of bitmap information in a Partial Ack.

According to the frame aggregation scheme, on the receiving side for a MAC super frame, if there is no error in the MAC super frame header, each of the aggregated MAC frames is extracted, and FCS (Frame Check Sequence) calculation is performed for each extracted MAC frame to detect its reception status. The reception status result detected by this operation is returned to the transmitting side by Partial Ack. FIG. 8 shows an example of the bitmap information of Partial Acks. In a MAC super frame body 42 in FIG. 8, each portion marked with a cross indicates that a packet error has occurred in the corresponding MAC frame aggregated in the MAC super frame. FIG. 8 shows a case wherein when a Partial Ack is to be returned to the MAC super frame transmitting terminal, "1" indicates normal reception, and "0" is written in each wrong MAC frame portion to indicate that the corresponding frame was not properly received.

Assume that the destinations of MPDUs 90 are randomly aggregated, as shown in FIG. 9A. In this case, the receiving terminal side cannot determine how many frames exist with respect to each destination and how they have been received, and hence cannot properly return Partial Ack responses to the transmitting side.

Assume that a Multi Address Bitmap 40 is added to the MAC super frame in the state shown in FIG. 9A. Even in this case, if the Multi Address Bitmap 40 is used to inform changes in destination (bitmap is expressed as 01111111), the receiving terminal cannot determine how many MAC frames exist for each destination. In this situation, the terminal which has received the MAC super frame determines from the information of the Multi Address Bitmap 40 that there are eight destinations. In reality, however, only three destinations are present.

Assume that frames are delimited on a destination basis and aggregated, as shown in FIG. 9B. Even in this case, if a header 91 does not contain information indicating the delimiters (i.e., a Multi Address Bitmap), when all the frames addressed to DEST2 are wrong, the receiving side cannot determine any specific position at which the first frame addressed to DEST3 appears, and hence cannot properly inform the transmitting side of the bitmap information of Partial Ack responses.

In order to solve these problems, when a transmitting terminal is to aggregate frames addressed to different destinations into one physical frame, the terminal needs to delimit the frames on a destination basis and write the corresponding delimitation information in a MAC super frame header.

Upon aggregating MAC frames addressed to a plurality of destinations into one physical frame for the respective destinations and writing the information of the plurality of destinations in the header of the MAC super frame, the transmitter simulcasts the MAC super frame to destination terminals.

The receiving side will be described next. As described above, in the communication system according to the first embodiment of the present invention, when an AP simulcasts a MAC super frame containing a plurality of destinations to STAs, each STA transmits an ACK frame to the AP while controlling the transmission timing so as to avoid collision with ACK frames from other STAs.

More specifically, each STA specifies and extracts MAC frames addressed to itself from the received physical frame on the basis of the Multi Address Bitmap, and transmits a response frame (Partial Ack) for the MAC frames extracted in accordance with a time interval corresponding to the order of delimitation of destinations.

Figure 10:
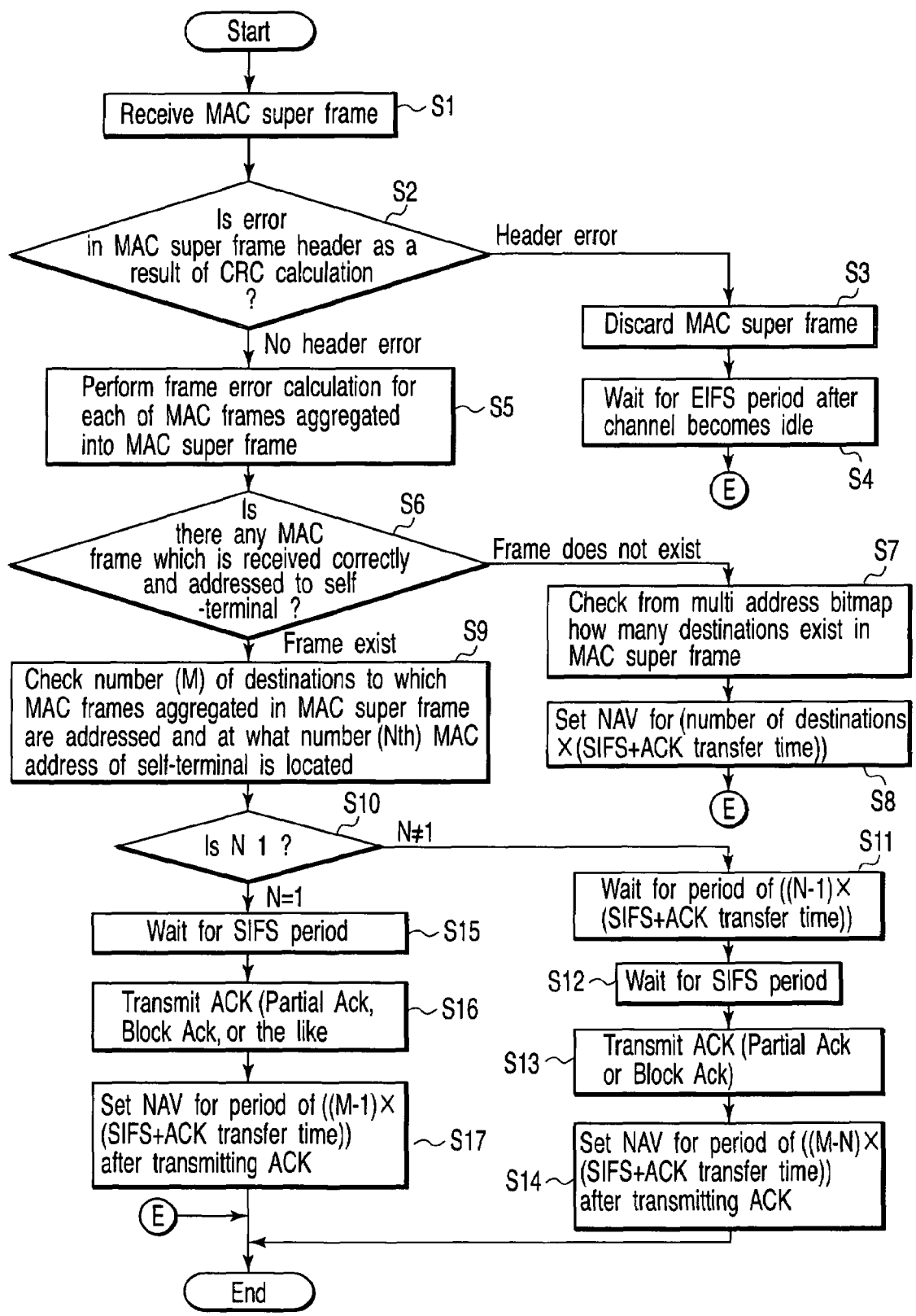
FIG. 10 is a flowchart showing the operation of a receiving terminal according to the embodiments of the present invention.

FIG. 10 is a flowchart showing the operation of a receiving terminal. Upon receiving a MAC super frame having a plurality of destinations (step S1), the receiving terminal performs CRC (Cyclic Redundancy Check) calculation for the header of the MAC super frame (step S2). If this error calculation result indicates an error, the MAC super frame is discarded (step S3). After the wireless medium becomes idle, the receiving terminal performs carrier sense for an EIFS (Extended Inter Frame Space) period (step S4).

If no error is detected in the header, the receiving terminal executes an error check (FCS calculation) for each MAC frame (step S5). The receiving terminal then checks the number (M) of destinations of the MAC frames aggregated in the MAC super frame and at what number (Nth) the MAC address of the self-terminal exists as a destination (step S9).

Figure 11A:
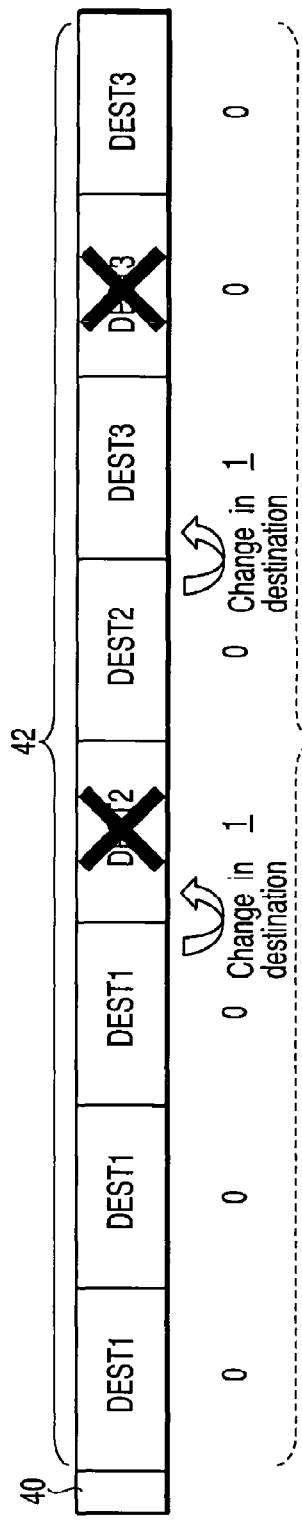
FIGS. 11A and 11B are views showing how Partial Acks are transmitted at different time intervals according to the embodiments of the present invention.
Figure 11B:
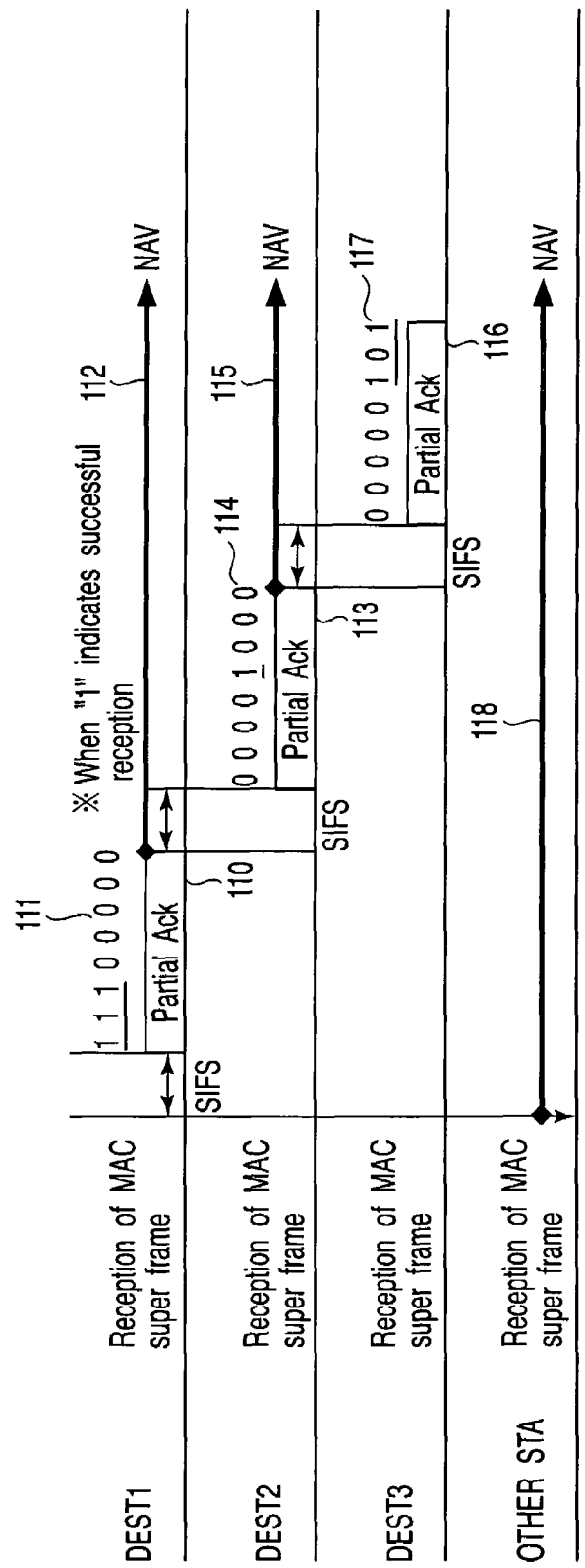

Assume that the MAC frames addressed to the receiving terminal corresponding to DEST1 are aggregated first (N=1), as shown in FIG. 11. In this case, after the lapse of an SIFS period (step S15), the receiving terminal transmits a Partial Ack frame 110 (or Block Ack frame defined in IEEE 802.11e Block acknowledgement procedure) in the same sequence as that in normal frame aggregation (step S16). Note that reference numeral 111 denotes a corresponding Partial Ack Bitmap. Thereafter, while the remaining terminals (DEST2 and DEST3 in the case shown in FIG. 11) return Partial Acks with time lags, the receiving terminal DEST1 sets a NAV 112 to stop transmitting a data frame and the like (step S17). Note that the period of the NAV 112 is determined by (number of remaining terminals×(SIFS+ACK transfer time)). In the embodiment of the present invention, it is assumed that the transfer rates of ACKs from the respective STAs are the same and information of transfer rate is shared in BSS (Basic Service Set). If, however, the ACK transfer rates from the respective STAs differ from each other, ACK transfer times are calculated in accordance with the differences.

DEST2 aggregated at the second position transmits a Partial Ack 113 representing a Partial Ack Bitmap 114 (step S13) after DEST1 transmits the Partial Ack 110 (step S11) and an SIFS period elapses (step S12). After DEST2 transmits the Partial Ack 113, the terminal sets a NAV 115 while the remaining terminals are transmitting Partial Acks (step S14). DEST3 waits until the terminals corresponding to the destinations aggregated before itself returns the Partial Acks 110 and 113. When an SIFS period elapses afterward, DEST3 transmits a Partial Ack 116 (a Partial Ack Bitmap is denoted by reference numeral 114). This wait time is determined by the number of destinations aggregated before the terminal× (SIFS+ACK transfer time). Note that if the self-terminal corresponds to the last destination (DEST3 in this case) of those of the frames aggregated in the MAC super frame, the NAV period becomes 0, i.e., no NAV period is set.

If no MAC frame addressed to the terminal is present in the MAC super frame, a NAV 118 is set during (the number of destinations aggregated×(SIFS+ACK transfer time)) (steps S7 and S8). The number of destination aggregated is obtained from the information of the Multi Address Bitmap (step S7). That is, if a bit indicating information representing the start of each destination is to be set, the number of bits corresponds to the number of destinations aggregated. Since a Multi Address Bitmap is added to the header of a MAC super frame, even if each MAC header is wrong, the position information of the MAC frame and the number of destinations can be determined as long as the MAC super frame header is not wrong.

Figure 12A:
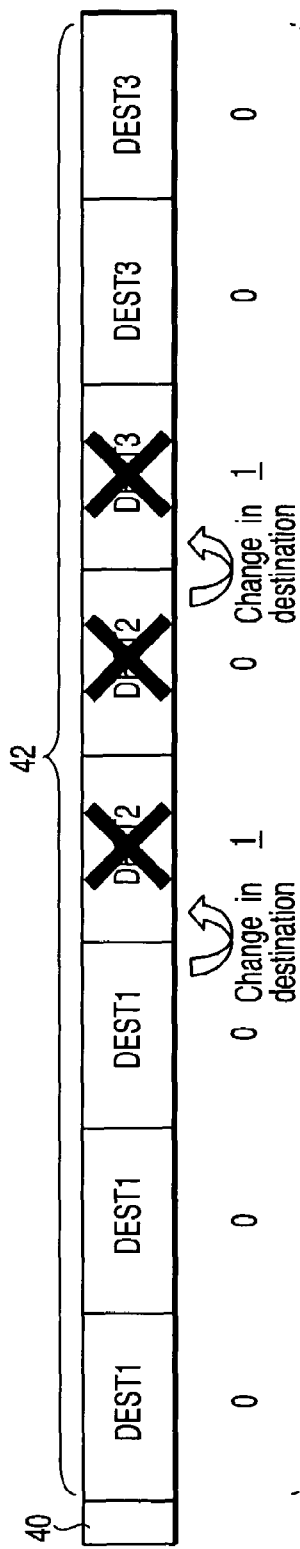
FIGS. 12A and 12B are views showing how Partial Acks are transmitted at different time intervals and views for explaining a case wherein reception errors have occurred in all MAC frames addressed to a given destination according to the embodiments of the present invention.
Figure 12B:
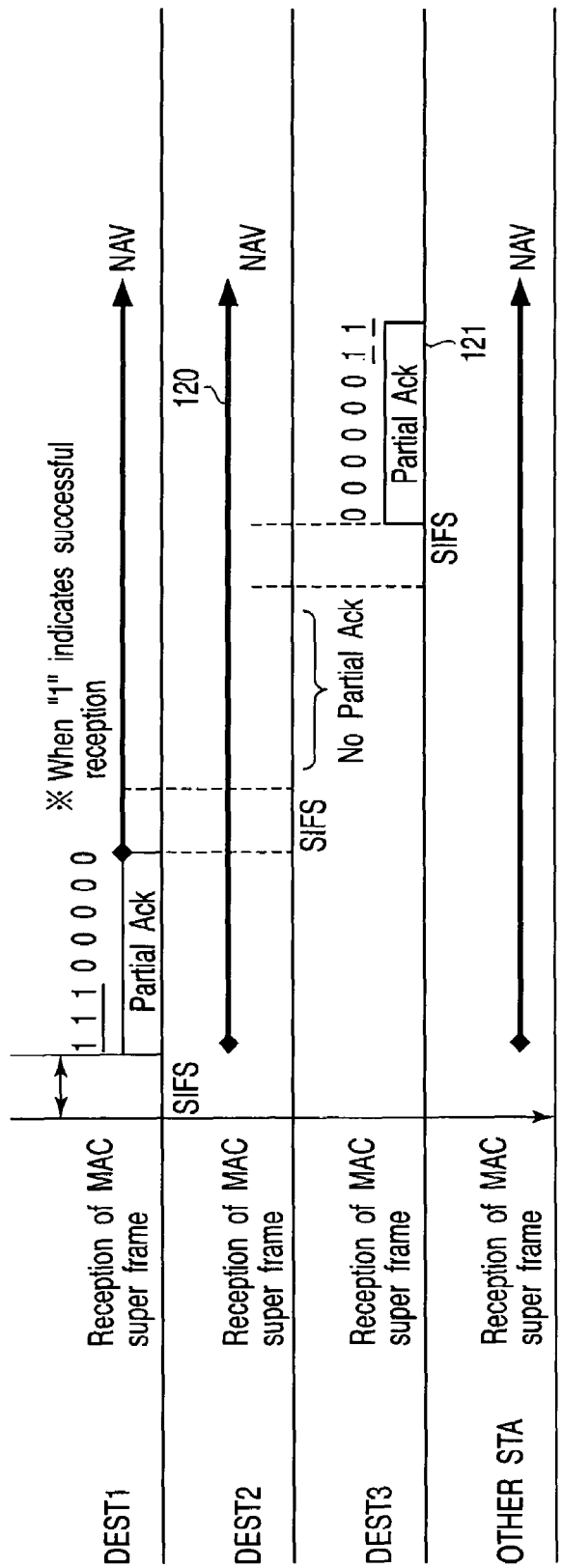

As shown in FIG. 12A, if both the frames addressed to DEST2 are wrong, DEST2 cannot determine whether or not there is a frame addressed to the receiving terminal. For this reason, DEST2 sets a NAV 120 for a period of (number of destinations aggregated×(SIFS+ACK transfer time)) (steps S7 and S8). Note that the terminal corresponding to DEST3 can determine, on the basis of the information of the Multi Address Bitmap, at which the first MAC frame addressed to the self-terminal appears and how their reception statuses are set, and hence can inform the transmitting side of a Partial Ack 121 at the proper timing shown in FIG. 12B.

If there are no frames addressed to the terminal which has received the MAC super frame, the terminal may extract the number of destinations from Multi Address Bitmap information and calculate a NAV period in the same manner as described above. Alternatively, in generating a MAC super frame, the transmitting terminal may write a value of (number of destinations aggregated×(SIFS+ACK transfer time)) in the duration field of each MAC frame. In this case, if there are no frames addressed to the itself, the MAC super frame receiving terminal may set a NAV for the period designated by the duration field.

Figure 13A:
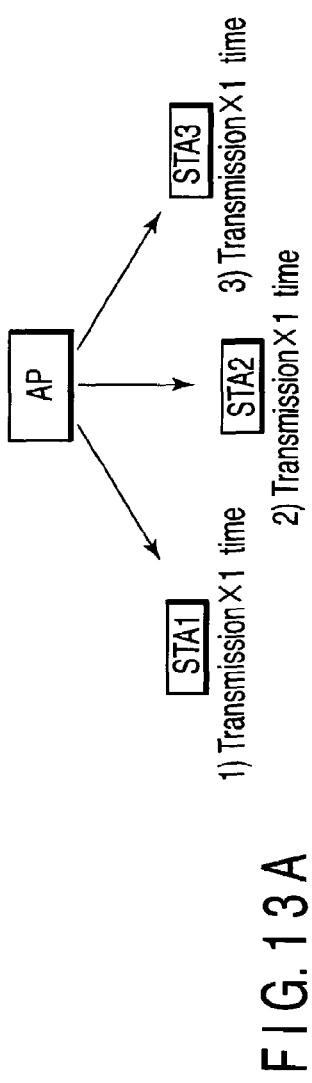
FIGS. 13A and 13B are views showing a frame sequence according to the first embodiment of the present invention.
Figure 13B:
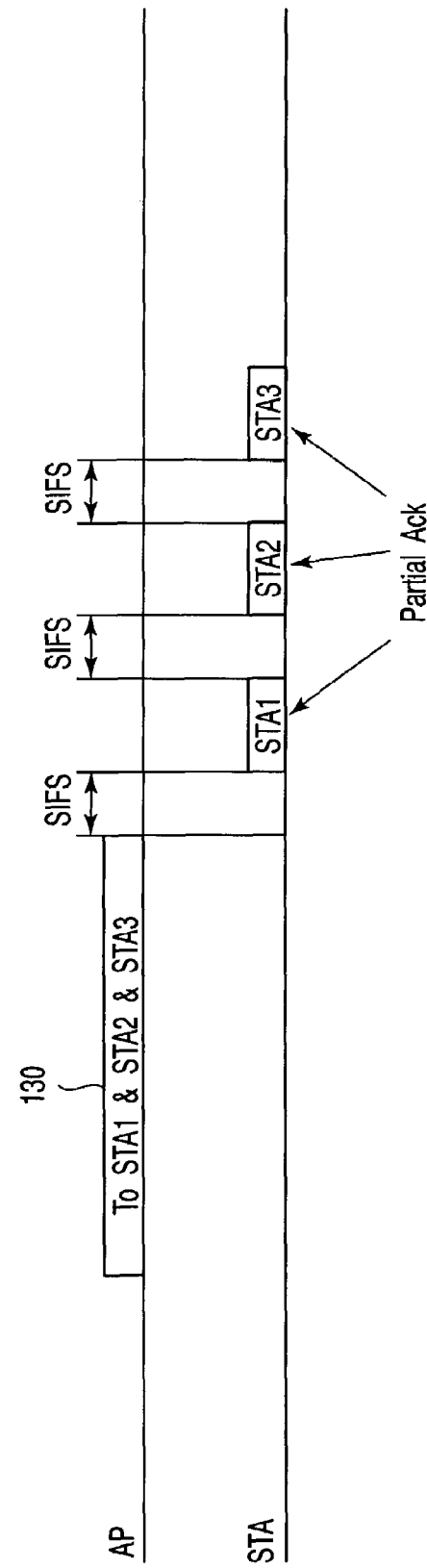

According to the first embodiment of the present invention, the effective MAC throughput can be improved by aggregating communication frames addressed to different destinations. FIG. 13 shows how the embodiment of the present invention is applied to the frame sequence shown in FIG. 2. More specifically, as is obvious from FIG. 13, the IFS (Inter Frame Space) and random backoff time required for each destination can be reduced by transmitting a MAC super frame 130 containing MPDUs addressed to a plurality of destinations (three in the case shown in FIG. 13). Partial Acks for the MAC super frame 130 are transmitted from the STAs to the AP with time lags, and hence collision does not occur. Increasing the number of destinations to be aggregated can further reduce the overhead. In addition, if the present invention is applied to frames corresponding to "No Acknowledgement" Ack Policy defined in IEEE 802.11e standard, since there is no need to wait for the reception of acknowledgement frames, the transmission efficiency can be further improved.

Therefore, the IFS and random backoff periods required for each destination can be reduced, and the wireless medium can be effectively used. This makes it possible to improve the transmission efficiency.

Second Embodiment

In IEEE 802.11e standard, several access control techniques designed to improve quality of service (QoS) are known. For example, according to HCCA, as a QoS technique of guaranteeing parameters such as a designated bandwidth or delay limit, scheduling is performed in a polling sequence in consideration of required quality. As a QoS technique according to the second embodiment of the present invention, HCCA is assumed which guarantees quality for each traffic stream. QoS in the IEEE 802.11e standard includes DCF (Distributed Coordination Function), PCF (Point Coordination Function), EDCA (Enhanced Distributed Channel Access), and HCCA (HCF Controlled Channel Access). HCCA is an extended scheme of conventional PCF used by an IEEE 802.11 AP to perform polling control. In HCCA, a QoS-AP is called a HC (Hybrid Coordinator). The HC performs bandwidth management including the allocation of TXOPs (transmission opportunities) to QoS station.

As shown in FIG. 14, when communication is to be started, a QoS-nonAP-STA (to be referred to as a QSTA hereinafter) sets up (Uplink, Downlink, and Bidirectional) TS (Traffic Stream) with a HC. A TS is a set of MSDUs to be delivered subject to the QoS parameter values provided to the MAC in a particular TSPEC (Traffic Specification). TSPEC is the QoS characteristics of a data flow to and from QSTA. When the setup of a TS is started, a TSPEC is notified from the QSTA. The TSPEC stores information such as a TSID (Any of the identifiers usable by higher-layer entities to distinguish MSDUs to MAC entities that support QoS within the MAC data service) and "Mean Data Rate" (average data rate specified at the MAC-SAP). A plurality of TSs can be set. Each HC needs to perform scheduling so as to satisfy TS requirements. A practical algorithm for scheduling is not defined in IEEE 802.11e, and hence is implementation-dependent. The QSTA obtains a TXOP (which is allocated transmission time) by QoS CF-Poll frame from the HC, thereby transmitting a frame.

When frame aggregation is to be executed in such HCCA, since each MAC frame has its own MAC header and a TS can be uniquely specified by the TID in the header (which exists in the QoS Control field extended for IEEE 802.11e and is used to identify each traffic; TSIDs for parameterized QoS use the eighth to the 15th. And TIDs from the zero to the 7th are used for prioritized QoS). Therefore, a plurality of streams can be aggregated.

The second embodiment of the present invention is mainly directed to an improvement in the efficiency of downlink traffic 150 from an HC in FIG. 15.

As shown in FIG. 16, first of all, the HC generates destination queues 1100 and 1101 for downlink traffic for each of QSTAs for which TSs are established. Frames addressed to the respective QSTAs are packed in the destination queues 1100 and 1101, respectively. The required bandwidth for the respective QSTAs can be determined from "Mean Data Rate" value in the TSPECs. The ratios between the respective required bandwidth are then calculated, and more transmissions are performed to QSTAs requiring wider bandwidth by WRR (Weighted Round Robin).

Assume that with regard to the downlink traffics from the HC, QSTA1 requires 8 Mbps, QSTA2 requires 4 Mbps, and QSTA3 requires 4 Mbps. In this case, the HC performs transmission with weight ratios of 2:1:1. In addition, frame aggregation can be performed in consideration of the priorities of frames by generating queues for the respective priorities.

In this case, according to a scheduling method other than WRR, with regard to the downlink traffics from an HC to QSTAs, the bandwidth is divided by the number of terminals connected to the HC through TSs. As shown in FIG. 17, frames are transmitted to the destination terminals by RR (Round Robin: evenly rotating transmission opportunities). Assume that a given QSTA (the terminal of a user who pays a higher fee to a carrier) issues a request to ensure a bandwidth to an HC. In this case, if the QSTA is registered in the HC, the HC returns a response message. Subsequently, the HC performs rotated transmission to the QSTA by WRR, and may increase the chance of frame transmission to the QSTA.

Figure 18:
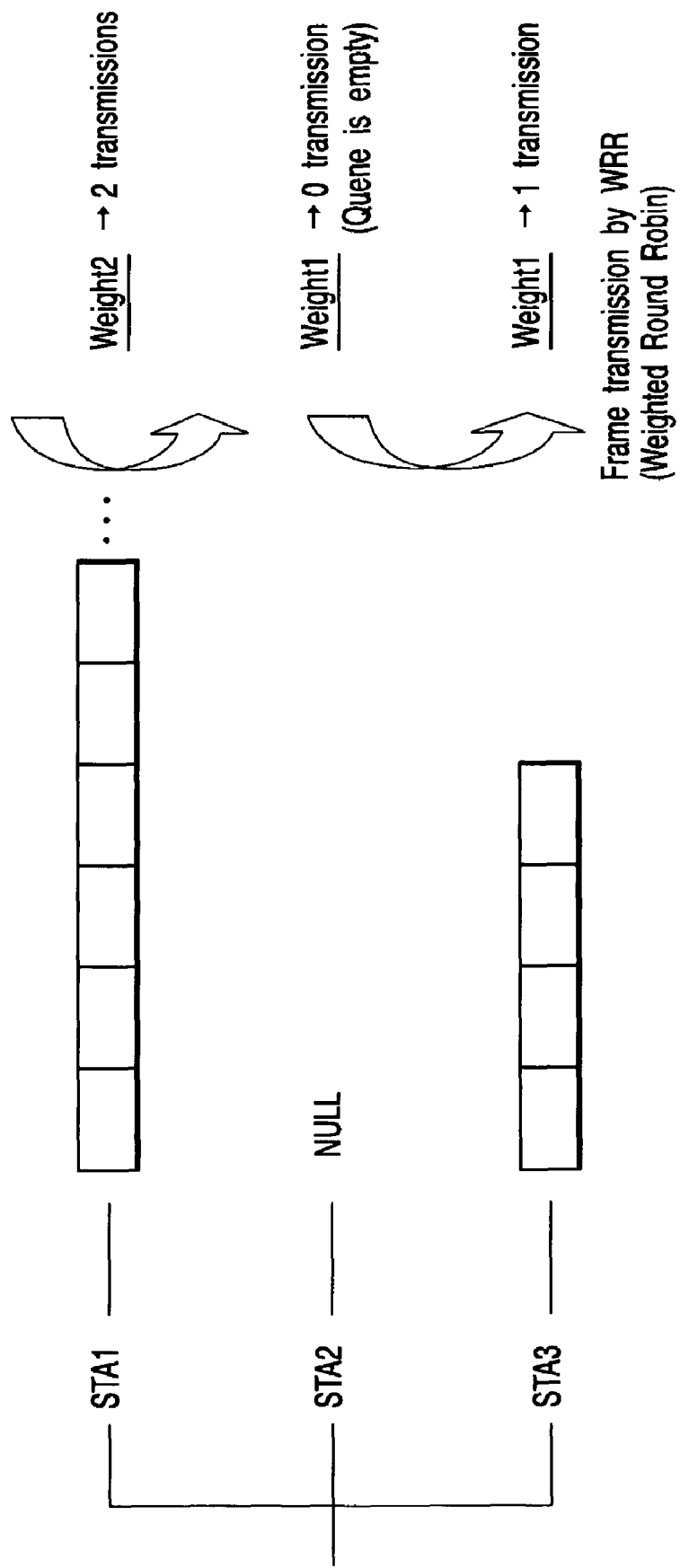
FIG. 18 is a view for explaining how weights are assigned to the number of transmissions in downlink traffics to QSTAs.

As shown in FIG. 18, the HC assigns a weight to the number of transmissions with regard to the downlink traffic to each QSTA. In this case, "transmission count of 1" indicates that in transmitting a given MAC super frame, when the frame is properly transmitted to a destination (all the bits of the Partial Ack Bitmap become 1), the transmission count becomes one. Assume that frames are aggregated, such as sequence number [1] [2] [3] [4] [5] [6] [7] [8]. In this case, the number of frames corresponding to each priority in one physical frame varies. If all the frames [1] to [8] can be properly transmitted by the first transmission, "transmission count of 1" is set. Assume that [2] requires retransmission, and a MAC super frame comprised of [2] and [9] is transmitted. In this case, if a Partial Ack can be received, "transmission count of 1" is set at this point in time. The number of transmissions is defined in this manner, and a weight is assigned to the number of transmissions to each QSTA which is calculated from a TSPEC.

It is an object of this embodiment to improve the efficiency of the downlink traffic. Therefore, downlink transmission from an HC to each QSTA will be considered separately from uplink transmission which gives each QSTA a TXOP (transmission opportunity) by QoS CF-Poll (polling). That is, the HC performs scheduling by alternately repeating "the time during which a frame is transmitted to a downlink" and "the time during which a TXOP is given to each QSTA by polling".

Before starting (consecutive) transmission to a downlink, the HC determines a TXOP period on the basis of "Delay Bound" in the TSPEC of each TS. The Delay Bound specifies the maximum amount of time, in units of microseconds, allowed to transport a MSDU belonging to the TS in this TSPEC. And it is set also in consideration of retransmission due to an error on a transmission channel. For this reason, the TXOP period initially determined by the HC becomes relatively long. However, no practical method of determining a "Delay Bound" is defined in IEEE 802.11e standard.

Figure 19:
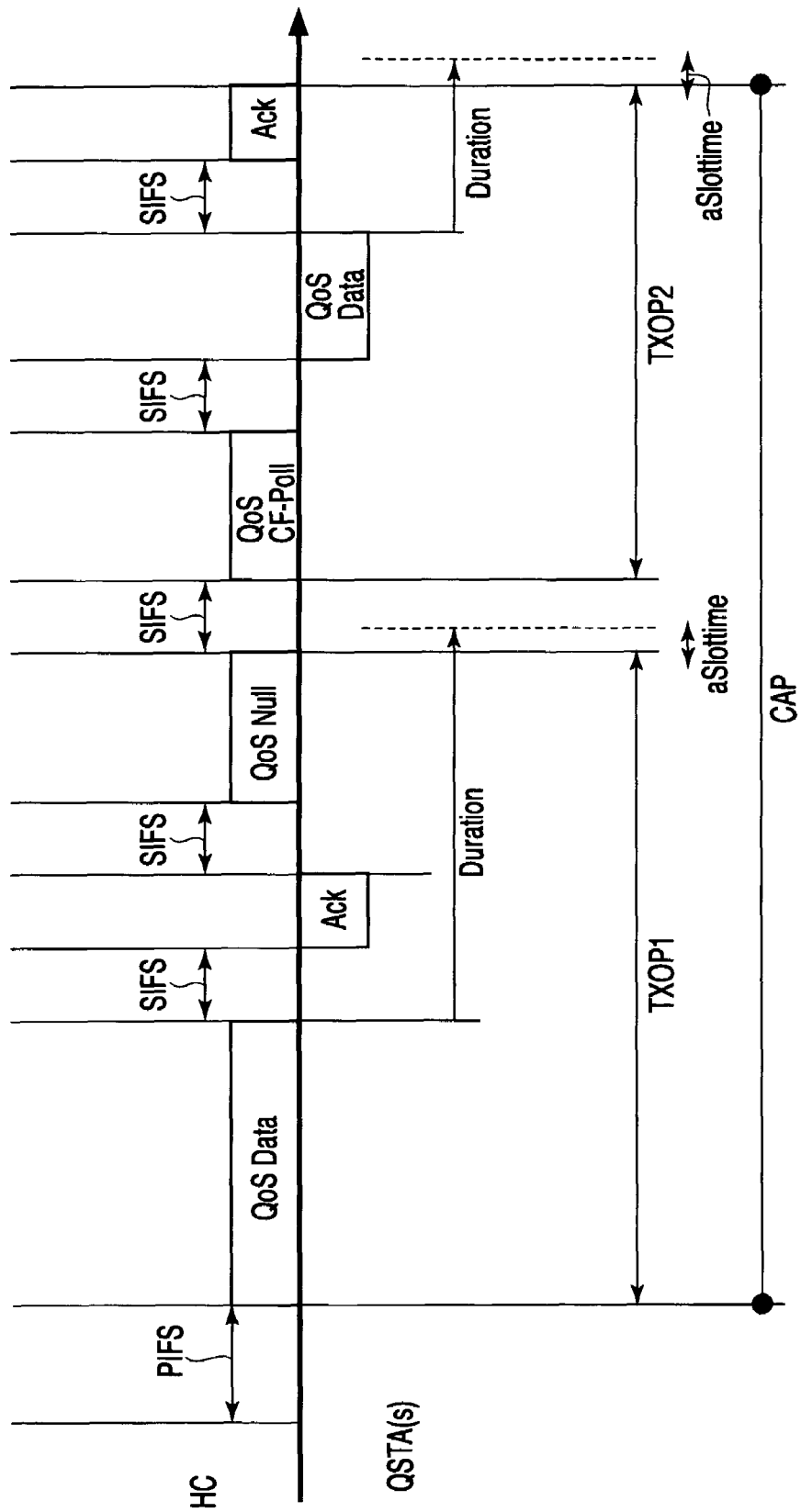
FIG. 19 is a view showing a CAP (Controlled Access Phase)

The HC transmits a QoS data frame to QSTAs. The QoS data contains a TXOP value as a duration which is required for the transmission of the downlink traffic. During this period, each QSTA sets a NAV and becomes incapable of any frame transmission. If many errors occur over the wireless medium and frame retransmission occurs many times, the TXOP designated in advance becomes insufficient. For this reason, in a CAP (Controlled Access Phase) period, as shown in FIG. 19, a (second) TXOP2 is obtained after an SIFS period. When frames are completely transmitted to all the QSTAs (by WRR), the reserved TXOP period may partly remain unconsumed. In this case, a QoS-Null frame is sent to release the NAV set by each QSTA. A CAP is a time period when the HC maintains control of the medium, after gaining medium access by sensing the channel to be idle for a PIFS duration. When a new CAP is acquired, a QoS CF-Poll is sent to a QSTA to permit it to perform uplink traffic transmission (or communication with another QSTA by direct link). A polling frame contains the TXOP value given to each QSTA as a duration. During this period, other terminals set NAVs and become incapable of frame transmission.

Consider, for example, the case shown in FIG. 20A (weights of 2, 1, and 1 need to be assigned to QSTA1, QSTA2, and QSTA3, respectively) as an actual case.

Assume that as shown in FIG. 20B, frame are aggregated into a frame 201 like "sequence number [1] [2] [3] [4] [5] [6] [7] [8] to QSTA1" and transmitted to QSTA1 in the first transmission. Assume that a Partial Ack 202 is returned in response to the MAC super frame 201 to indicate that the frame was properly transmitted, and the transmission count is set to 1. Assume also that this operation is based on the premise that a transmission right is transferred by WRR (Weighted Round Robin), and hence frames are aggregated into a frame 203, such as "[9] [10] [11] [12] to QSTA1" and transmitted to QSTA1 with a weight of 2.

If frame transmission (frame 203) to QSTA1 is completed (twice), the flow of processing shifts from Partial Ack 204 to a transmission sequence for a frame 205 to QSTA2 ("sequence number [1] [2] [3] [4] to QSTA2").

After Partial Ack 206 for the frame 205 to QSTA2, a MAC super frame 207 is transmitted to QSTA3 ("sequence number [1] [2] [3] [4] [5] [6] [7] to QSTA3") in the same manner as described above.

In this embodiment, for example, an HC combines the second MAC super frame transmitted to QSTA1 and the MAC super frame transmitted to QSTA2 into one MAC super frame 211 and transmits it, thereby allowing the respective QSTAs to receive Partial Acks 212 and 213 with time lags. That is, the HC generates a physical frame containing a MAC super frame having a plurality of destinations instead of aggregating frames with one destination (QSTA1) into one MAC super frame 214. However, this multiple receiver aggregation is based on the assumption that the sum of MAC frames is smaller than the maximum number of frames which can be aggregated into one PHY frame. This maximum number is determined between sending terminal and receiving terminal in advance.

In this embodiment as well, as in the first embodiment shown in FIG. 4, a MAC super frame header 40 is extended so as to additionally contain a Multi Address Bitmap field 41. The field 41 is a bit field representing information indicating that MPDUs having different destination addresses are contained in the aggregated MAC super frame. This bit field is used in the following manner. When any one of MPDUs aggregated for the respective destinations into a MAC super frame changes in destination, the corresponding bit is set to 1.

Assume that as in the case shown in FIG. 5, MAC frames (MPDUs) 42 addressed to two destinations are aggregated into one MAC super frame, and an MPDU addressed to DEST2 appears at the fifth frame position. In this case, the multi address bitmap 41 is expressed as "0001000". In this case, the portion where the bit value changes from 0 to 1 corresponds to the frame position where the destination changes.

In the case shown in FIG. 5, since the maximum number of MPDUs that can be aggregated is set to eight, the multi address bitmap has a size of eight bits. This size, however, can be changed in accordance with the number of frames to be aggregated. Using the Multi Address Bitmap 41 allows the receiving side to determine how many destinations exist in the MAC super frame. In the above case, since the destination changes once, the receiving side can determine that the number of destinations existing in the MAC super frame is two. If only MPDUs addressed to one destination are aggregated, the Multi Address Bitmap is expressed such as "00000000". Obviously, all the bits of the Multi Address Bitmap have the value 0.

According to the implementation of frame aggregation for the same destination, each terminal which has received a MAC super frame can determine whether or not the entire frame is addressed to itself, by merely checking the address of the first MPDU. In the present invention in which frames addressed to different destinations are aggregated, adding a Multi Address Bitmap field allows the following operation. If all the values in this field are 0 (This is the case wherein the Multi Address Bitmap is used to indicate a change in destination. If the Multi Address Bitmap is used to indicate the start of each destination and there is only one destination, the first bit is set to 1, and all the following bits become 0), the number of destinations to which the MPDUs in the MAC super frame are addressed is limited to one. In this case, therefore, checking only the address of the first MPDU makes it unnecessary to check the subsequent MPDUs.

If the value 1 is set in any one of the bit fields of the Multi Address Bitmap, directly accessing that bit position makes it possible to determine the destination of the corresponding MPDU. By using the Multi Address Bitmap field in this manner, if only a single destination exists in the MAC super frame, it suffices to check the contents of the MPDU header only once. In addition, since a bit position of a Multi Address Bitmap at which 1 is set corresponds to a portion where the destination changes, directly checking this portion makes it easier to determine whether or not the MAC super frame contains any frame addressed to the itself (if "1" is used to indicate the start of each destination).

A QSTA which has determined that there are a plurality of destinations in a MAC super frame (on the basis of the Multi Address Bitmap) determines whether or not the destinations include the address of the receiving terminal. The QSTA then determines its turn to return a Partial Ack depending on whether the address of the terminal is located at a relatively forward or backward position. Assume that a given terminal has received a MAC super frame like "[DEST1] [DEST1] [DEST1] [DEST1] [DEST2] [DEST2] [DEST2] [DEST2]". In this case, if the address of the receiving terminal is "DEST1", the terminal is required to transmit a Partial Ack after the lapse of SIFS period. A terminal whose address is "DEST2" returns a Partial Ack to the HC the SIFS period after the terminal with the address "DEST1" transmitted the Partial Ack. At this time, the QSTA with DEST1 returns the FCS (Frame Check Sequence) calculation result on the first to fourth MPDUs, and the QSTA with DEST2 returns the CRC calculation result on the fifth to eighth MPDUs.

If the MAC super frame contains no destination corresponding to the receiving terminal, the terminal sets a NAV. According to the MAC protocol defined in IEEE 802.11, when a given terminal receives a unicast data frame, the terminal basically sets a duration corresponding to [SIFS time+ACK transfer time]. In contrast to this, according to the present invention in which Partial Acks are returned from a plurality of receiving terminals with time lags, a duration corresponding to ((number of destinations aggregated−numerical value indicating the ordinal number of corresponding destination)×([SIFS time+ACK transfer time]) is set in each MAC frame. In addition, according to the embodiment of the present invention, it is assumed that the transfer rates of ACKs from the respective QSTAs are the same. If, however, the ACK transfer rates from the respective QSTAs differ from each other, ACK transfer times corresponding to the respective ACK transfer rates are calculated.

A terminal whose address coincides with any one of the addresses of MAC frames in the MAC super frame can determine, from the relative position of the aggregated destination, at which timing the terminal should return a Partial Ack. Each terminal whose address coincides with none of the addresses in the MAC super frame sets a NAV only for a period corresponding to "Duration" value.

The terminal which has transmitted the Partial Ack need not set any NAV, if it is determined from the relative address information that the terminal corresponds to the MPDU aggregated last. If, however, there is a chance that a subsequent Partial Ack will be transferred, as in the case of DEST1 and DEST2, the corresponding terminal sets a NAV until the end of the NAV period set by the HC.

Assume that all the MPDUs addressed to DEST2 are wrong as shown in FIG. 11, and the corresponding terminal is to determine at which portion the first MPDU addressed to DEST3 appears. In this case, the terminal can determine, by using the Multi Address Bitmap field, how many destinations exist in the MAC super frame and from which portions their delimiters start.

If, for example, all the MPDUs addressed to DEST2 are wrong as shown in FIG. 12, the terminal can determine, from the Multi Address Bitmap field, that three different destinations exist, and at which portion the first MPDU addressed to DEST3 appears. The terminal corresponding to DEST2 cannot determine even, whether any MPDUs addressed to the self-terminal are contained in the MAC super frame, and hence sets a NAV only for (number of destinations aggregated×(SIFS+ACK transfer time)). Upon finding an MPDU addressed to itself, the terminal corresponding to DEST3 determines, from the Multi Address Bitmap, at what destination number the itself is positioned and at which portion the first MPDU addressed to the receiving terminal appears, and returns a Partial Ack after the lapse of an appropriate period of time. As in the case shown in FIG. 12, although QSTA2 returns no Partial Ack, QSTA3 returns its Partial Ack in consideration of the Partial Ack (+SIFS) time during which QSTA2 should send a Partial Ack.

The MAC super frame transmitting terminal caches in advance information indicating to which destinations and how many MPDUs are packed and transmitted, and determines frames to be retransmitted, after receiving all Partial Acks sent from the destination terminals with time lags.

FIG. 20 shows a case wherein the HC does not aggregate frames addressed to different destinations with respect QSTAs. In contrast to this, as is obvious from FIG. 21, packing and transmitting MPDUs addressed to a plurality of destinations (two destinations in the case shown in FIG. 21) can reduce the SIFS period. Increasing the number of destinations to be aggregated makes it possible to further reduce an overhead of SIFS period(s). In addition, applying the present invention to a frame corresponding to the "No Acknowledgement" Ack Policy in IEEE 802.11e makes it unnecessary to wait for the reception of a Partial Ack. This can further improve the transmission efficiency.

Upon transmitting downlink traffic to a plurality of destinations, the HC waits for the reception of Partial Acks equal in number to the destinations, and then performs processing such as retransmission. Since the frames are delimited for the respective destinations, the HC may transmit a new MPDU upon packing it in one destination area. Therefore, the value of an ACK timer which should be set by the HC is represented by (the ordinal position of corresponding destination×(SIFS+ Partial Ack transmission time)+one slot time). However, in this case, it is assumed that the transfer rates of ACKs from respective QSTAs are the same. Otherwise, the HC must calculate ACK timer corresponding to the respective ACK transfer rates.

According to the second embodiment of the present invention described above, even if consideration is to be given to QoS, the MAC throughput can be increased by aggregation of communication frames addressed to different destinations, as in the first embodiment described above. In addition, increasing the number of destinations to be aggregated can further reduce an overhead of SIFS periods. Therefore, the IFS and random backoff period required for each destination can be reduced, and the wireless medium can be effectively used. This makes it possible to improve the transmission efficiency drastically.

More specifically, for example, when video distribution is performed by streaming through the Internet in a hot spot in a town, the present invention can improve the transmission efficiency of the downlink traffic from an AP. The hot spot can therefore accommodate more client terminals.

The above QoS technique can obtain functions and effects such as being capable of guaranteeing the quality of an application sensitive to delays and, for example, keeping jitter uniform and realizing efficient transfer (guaranteeing even a bandwidth for low-priority flows) by aggregating flows corresponding to a plurality of destinations.

In addition, assigning weights for the respective destination STAs (station of users) makes it possible to easily realize service quality classification based on an accounting system. This makes it possible to cause an AP (access point of service provider) to transmit a frame preferentially, by WRR, to the terminal of a user who pays a high fee.

Third Embodiment

The third embodiment of the present invention is directed to a communication apparatus which transmits many Block Ack control frames (BlockAckReq/BlockAck for each TS) defined in IEEE 802.11e upon containing them in one physical frame. IEEE 802.11e defines Block Acks which are transmitted at SIFS intervals in a burst manner. A communication sequence using Block Acks can be executed even in a case wherein the frame aggregation described above is not performed.

In this embodiment, a Block Ack Request frame for different destinations is simulcasted as in the first and second embodiments. In addition, as in the first and second embodiments, Block Ack frames are transmitted with time lags to avoid collision between the response frames.

Figure 22:
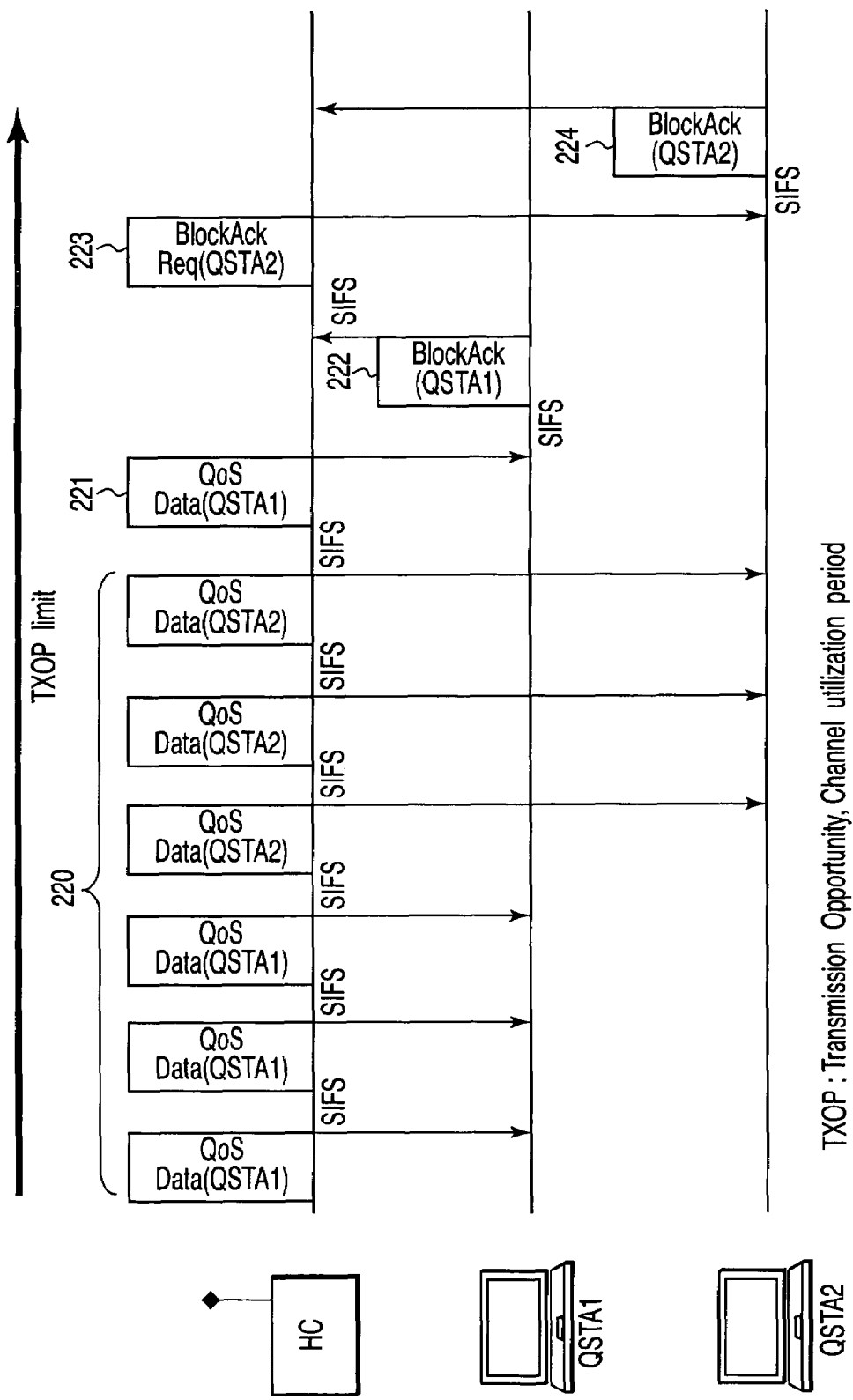
FIG. 22 is a view showing a frame sequence using the Block Ack defined in IEEE 802.11e.

FIG. 22 shows the frame sequence using Block Acknowledgement defined in IEEE 802.11e. The frame sequence shown in FIG. 22 exemplifies the case of immediate Block Ack. A Block Ack sequence includes two schemes: an immediate type in which when the transmitting side transmits a Block Ack Request, the receiving side immediately returns a response (Block Ack); and a delayed type in which when the transmitting side transmits a Block Ack Request, the receiving side returns a response (Block Ack) after a while. The embodiment of the present invention can be applied to both the cases.

As shown in FIG. 22, according to a Block Ack procedure, during a transmission period (TXOP: Transmission Opportunity) determined for each terminal, a plurality of unicast data frames 220 are consecutively transmitted at SIFS intervals. Block Ack Requests 221 and 223 are used to request the respective destination terminals to transmit Block Ack frames each having reception status bitmap information. For this purpose, the Block Ack Request frames 221 and 223 need to separately be transmitted to the respective destinations. In response to the Block Ack Request 221, QSTA1 transmits a Block Ack 222 to the HC. In response to the Block Ack Request 223, QSTA2 transmits a Block Ack 224 to the HC.

Figure 23:
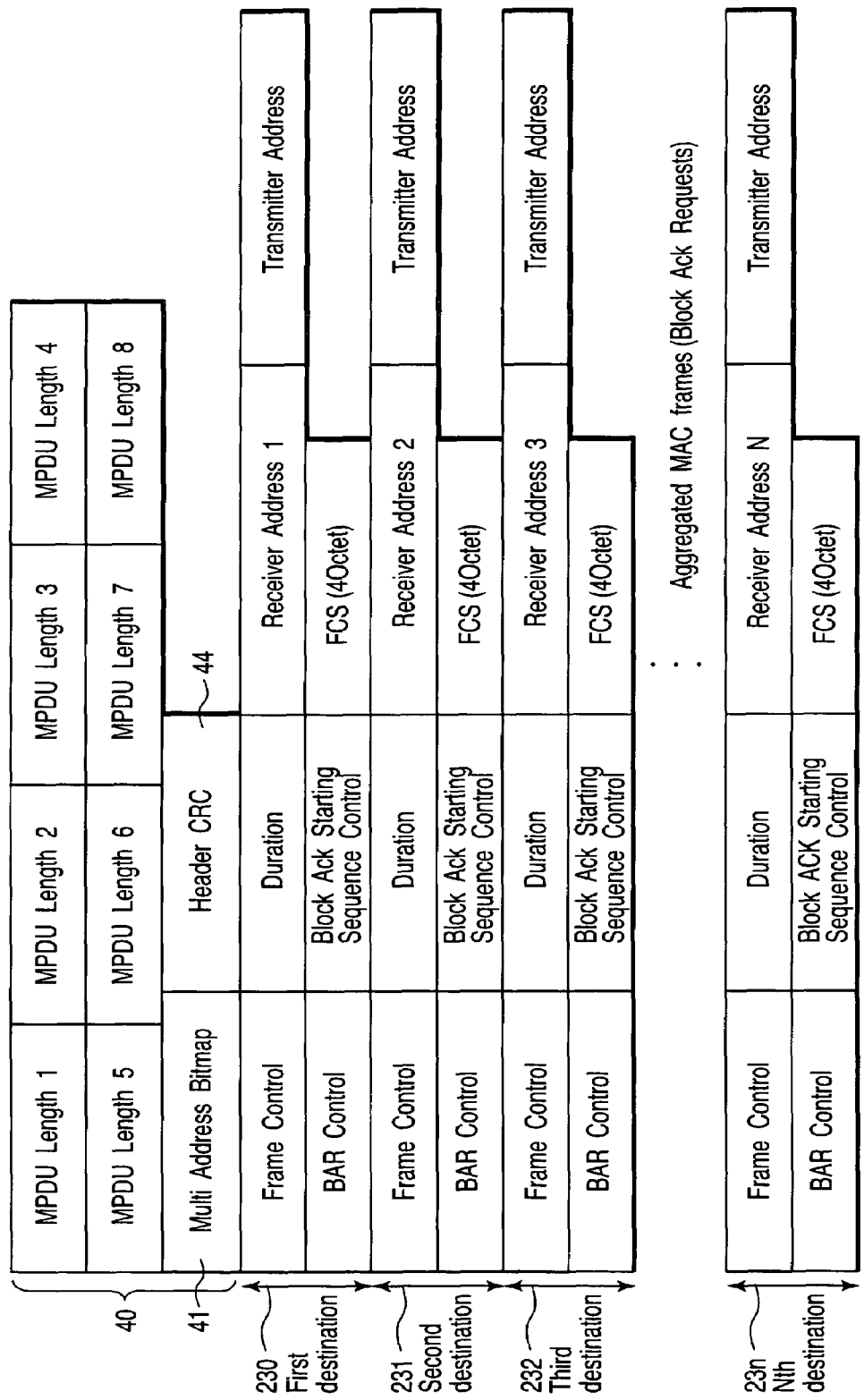
FIG. 23 is a view showing a frame format to be used in a case wherein a plurality of Block Ack Request frames are aggregated into one PHY frame according to the third embodiment of the present invention.

In the third embodiment of the present invention, as shown FIG. 23, a plurality of Block Ack Request frames 230, 231, 232, . . . , 23n are aggregated into one frame. As in the above frame aggregation for a plurality of destinations, the Block Ack Request transmitting terminal aggregates Block Ack Request frames while delimiting them for the respective destinations, and adds a MAC super frame header 40. The terminal then writes the delimitation information in a Multi Address Bitmap 41. The MAC super frame header 40 contains a header CRC 44. If a header error occurs, all Block Ack Requests addressed to a plurality of destinations are discarded. After the wireless medium becomes idle, carrier sense is set for an EIFS period. This indicates the execution of the same procedure as in the above flowchart.

Figure 24:
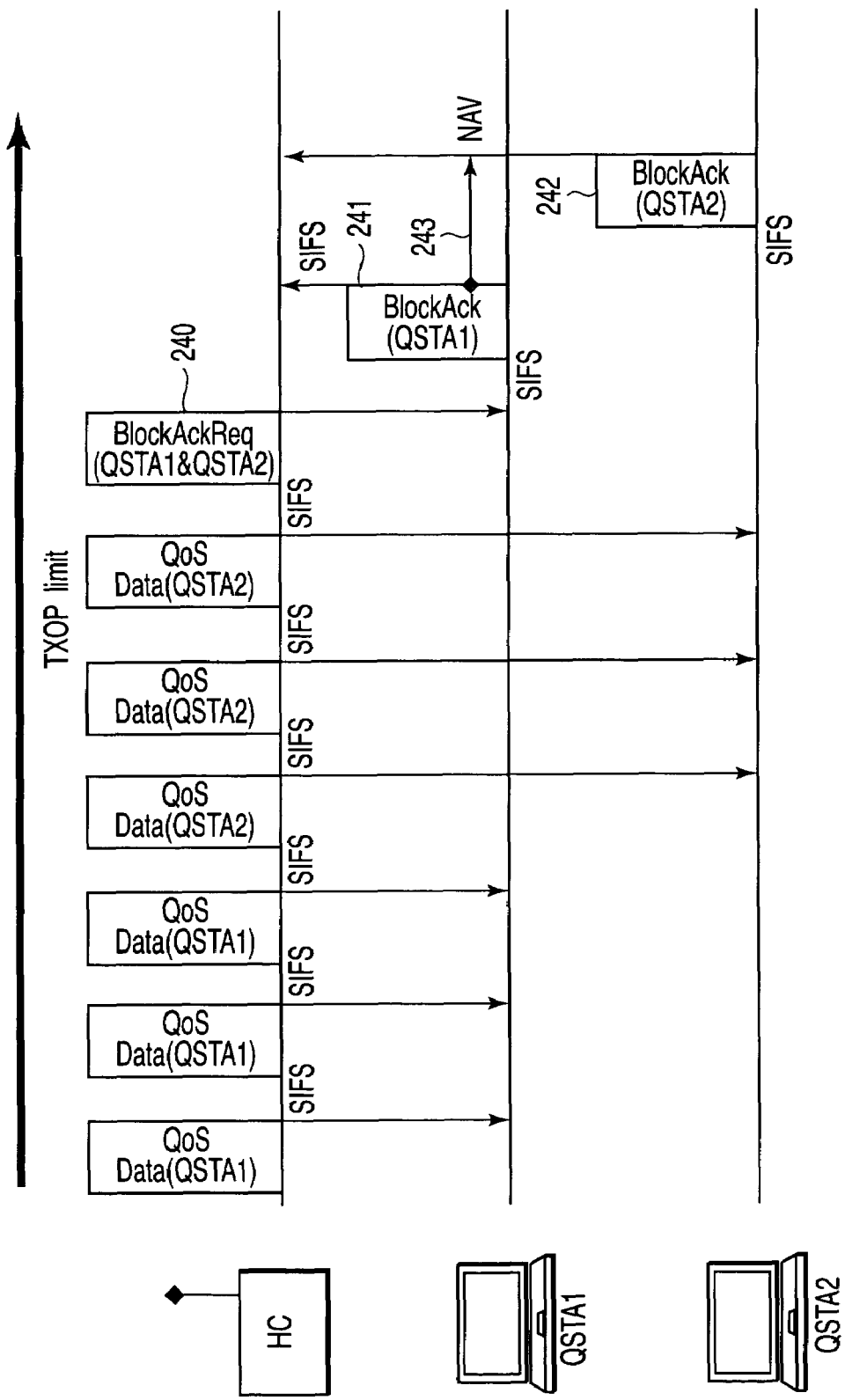
FIG. 24 is a view showing a frame sequence according to the third embodiment of the present invention.

Each terminal that has received the aggregated Block Ack Request checks at what number the destination corresponding to the terminal is aggregated, and transmits a Block Ack with a time lag as in the first and second embodiments. After the receiving terminal transmits a Block Ack, the terminal sets a NAV for a period during which the terminals corresponding to the remaining destinations transmit Block Acks. FIG. 24 shows this sequence. In the case shown in FIG. 24, by transmitting a frame 240 in which Block Ack Requests addressed to a plurality of destinations are aggregated, the SIFS period can be reduced. This makes it possible to improve the channel utilization efficiency. Referring to FIG. 24, Block Acks 241 and 242 are transmitted with a time lag. After transmitting the Block Ack 241, QSTA1 sets a NAV 243 to avoid collision with the Block Ack 242.

Figure 25:
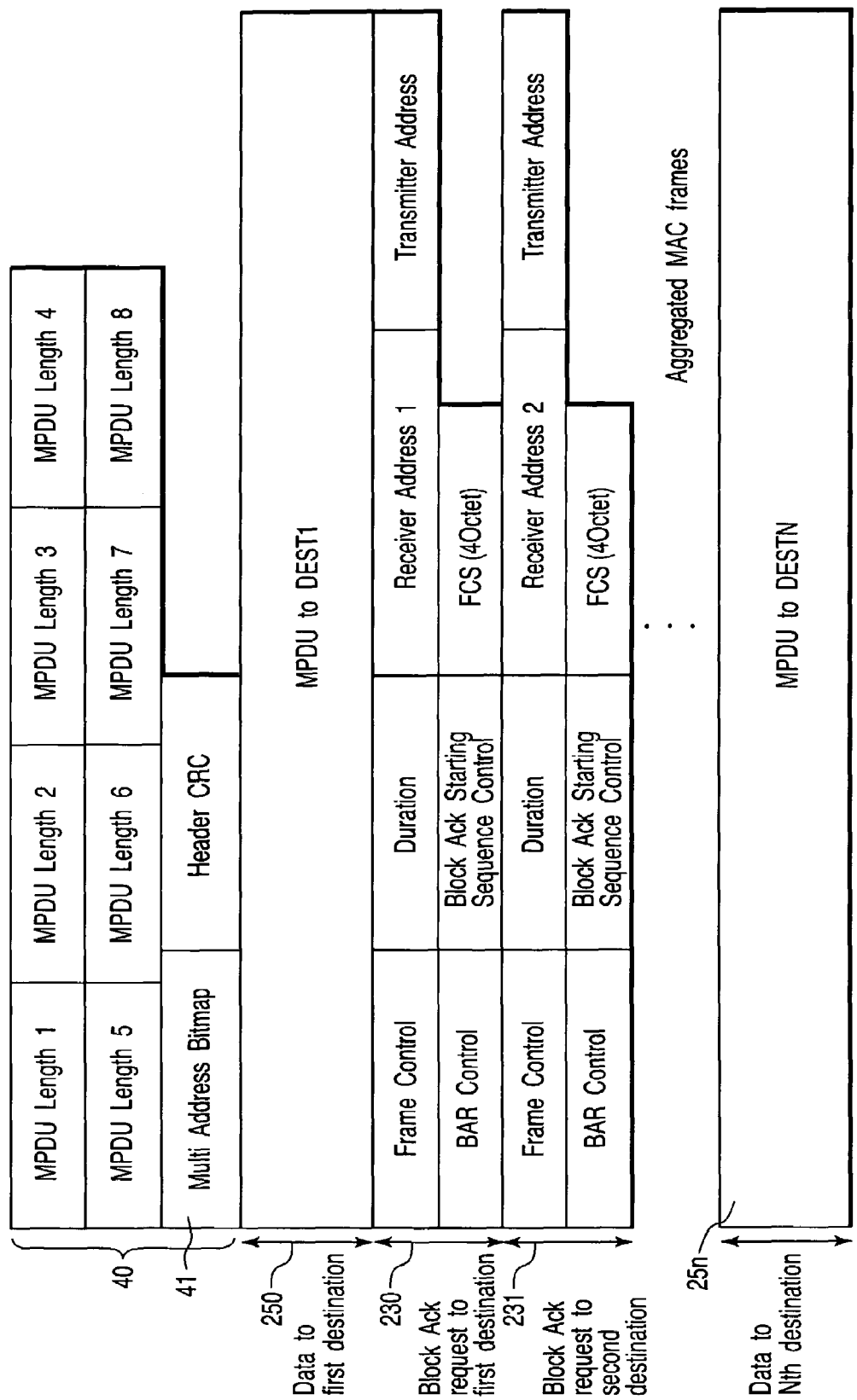
FIG. 25 is a view showing a case wherein both Block Ack Requests and data frames are aggregated according to the third embodiment of the present invention.

In addition, as shown in FIG. 25, data frames 250, . . . , 25n can be aggregated together with the Block Ack Requests 230, 231, . . . , 23n. In this case as well, the frames are aggregated while being delimited for the respective destinations, and the frame size of each frame (data or Block Ack Request) is written in the MPDU Length field. This makes it possible to extract a data frame and properly transmit a Block Ack with a time lag.

Fourth Embodiment

Figure 26:
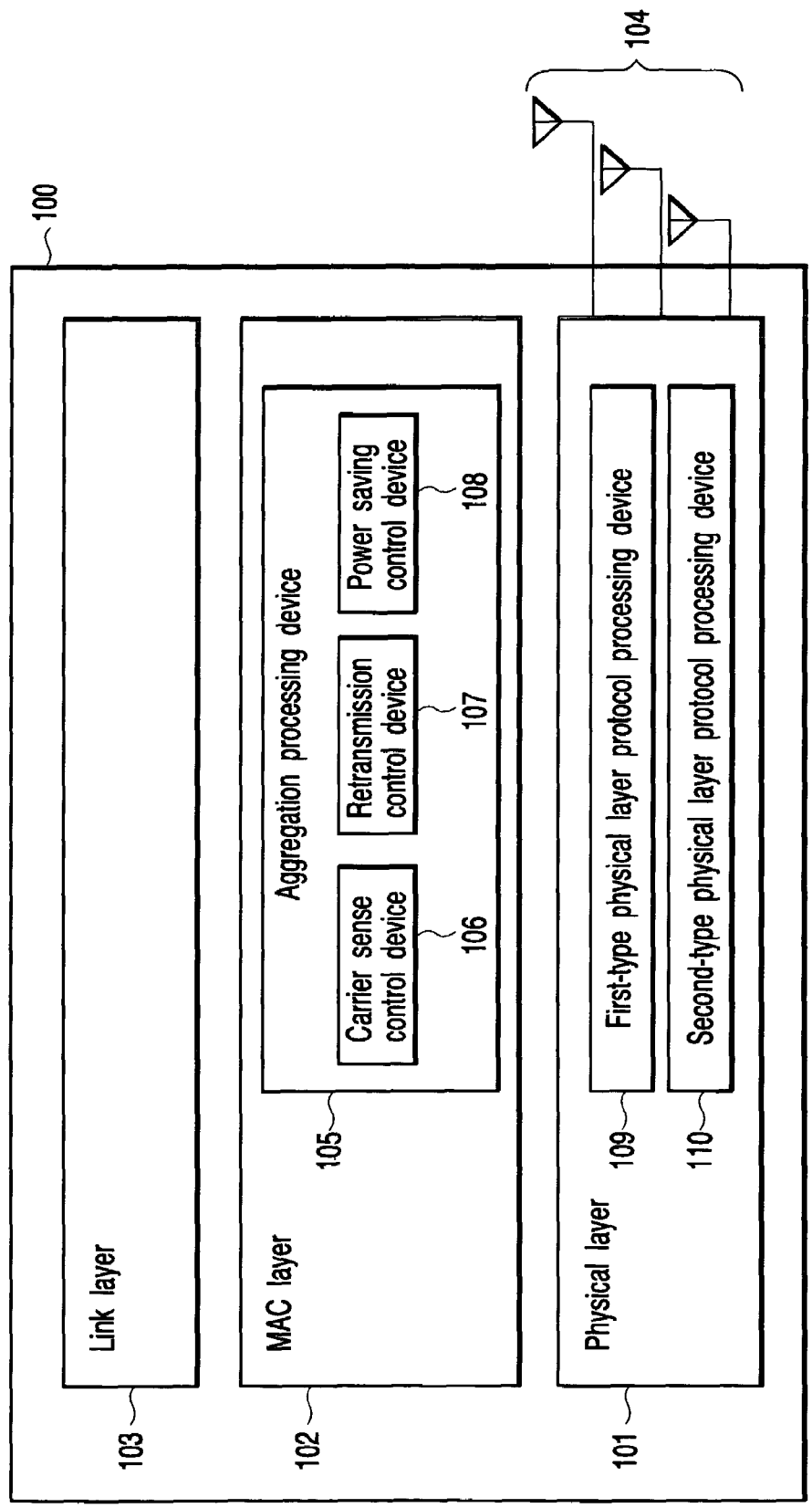
FIG. 26 is a block diagram showing the arrangement of a communication apparatus according to the fourth embodiment of the present invention.

FIG. 26 is a block diagram showing the arrangement of a communication apparatus according to the fourth embodiment. A communication apparatus 100 is an apparatus which communicates with another communication apparatus through a radio link, and includes processing units 101, 102, and 103 respectively corresponding to a physical layer (PHY layer), MAC layer, and link layer. These processing units are implemented as analog or digital electronic circuits or as firmware or the like to be executed by a CPU incorporated in an LSI in accordance with implementation requirements. An antenna 104 is connected to the physical layer processing unit ("processing unit" will be omitted hereinafter) 101. The MAC layer 102 includes an aggregation processing device 105 according to the present invention. The aggregation processing device 105 includes a carrier sense control device 106, retransmission control device 107, and power saving control device 108.

The physical layer 101 is designed to be compatible with two types of physical layer protocols, and includes a first-type physical layer protocol processing device 109 and a second-type physical layer protocol processing device 110 for the respective types of protocol processing. The first-type physical layer protocol processing device 109 and second-type physical layer protocol processing device 110 often share circuits and are not necessarily independent of each other in terms of implementation.

In the fourth embodiment of the present invention, the first-type physical layer protocol is assumed to be a protocol using a so-called MIMO (Multiple Input Multiple Output) technique using a plurality of antennas on each of the transmitting side and the receiving side. The second-type physical layer protocol is assumed to be a protocol defined in IEEE 802.11a. Using the MIMO technique makes it possible to expect an increase in transmission capacity almost proportional to the number of antennas without changing the frequency band. The MIMO technique is therefore a technique directed to further increase the throughput of IEEE 802.11. Note that the link layer 103 has a normal link layer function defined in IEEE 802. The technique to be used to increase the transmission rate is not limited to MIMO. For example, a method of increasing the occupied frequency band may be used or may be combined with MIMO.

Figure 27:
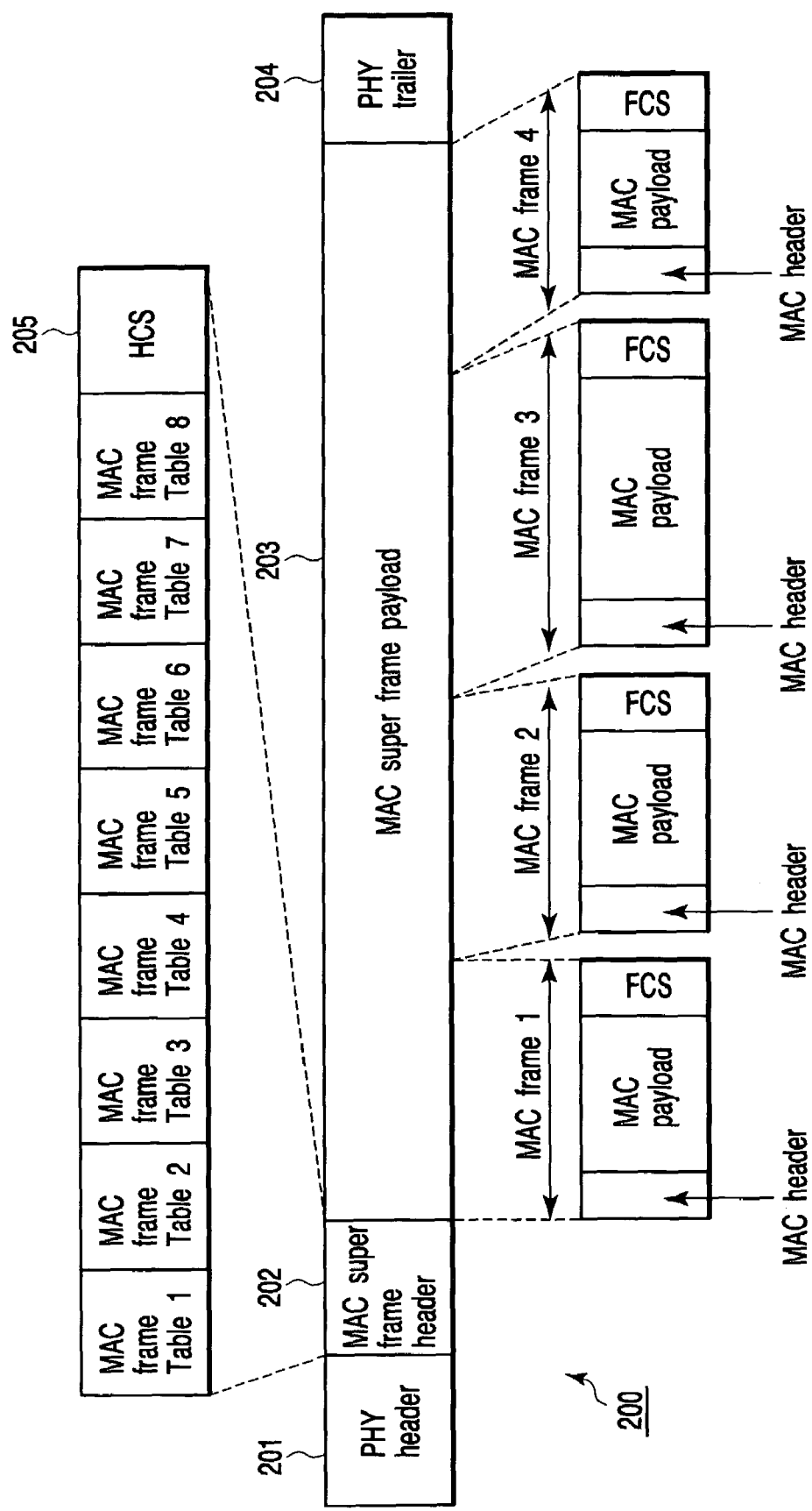
FIG. 27 is a view showing an example of the format of a MAC super frame.

FIG. 27 is a view showing an example of the frame format used by the communication apparatus according to the embodiment of the present invention. A frame format 200 schematically shows a frame structure associated with a PHY layer and MAC layer. More specifically, this frame format is assumed to be one that conforms to IEEE 802.11 or an extended version thereof. Note that the frames defined in IEEE 802.11 are roughly classified into three types, namely control frames, management frames, and data frames. The embodiment of the present invention is assumed to be mainly applied to data frames. This, however, does not mean to exclude the application of this embodiment to control and management frames. As shown in FIG. 27, the frame format 200 is comprised of a PHY header 201, MAC super frame header 202, MAC super frame payload 203, and PHY trailer 204. The MAC super frame header 202 and MAC super frame payload 203 correspond to a PHY payload (to be described later).

The PHY header 201 is processed by the physical layer 101 of the receiving communication apparatus. That is, the physical layer 101 performs detection of a frame head, carrier sense, timing synchronization establishment, automatic gain control (AGC) of an amplifier, tracking a transmitting-side carrier frequency (automatic frequency control), transmission channel estimation, and the like. The physical layer 101 also detects the modulation scheme and coding ratio of the PHY payload following the PHY header 201, a transmission rate, and a data length.

Figure 28:
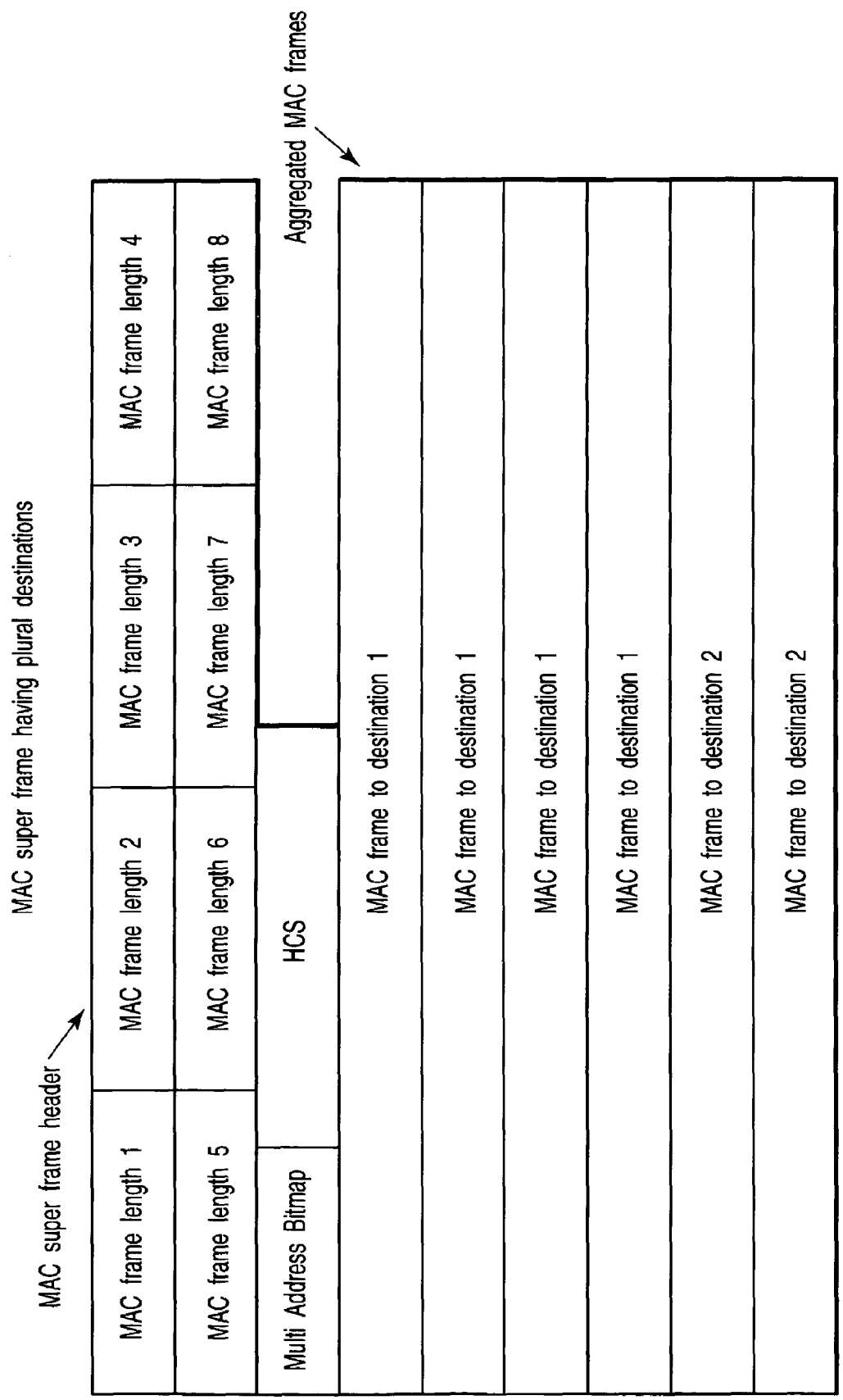
FIG. 28 is a view showing an example of a MAC super frame having a plurality of destinations.

FIG. 27 shows the aggregation of MAC frames addressed to a signal destination. In this embodiment, as in the above embodiments, as shown in FIG. 28, "simulcast" is performed. That is, MAC frames addressed to a plurality of destinations are aggregated into one physical frame, and the frame is transmitted to the plurality of destinations as reception targets.

Figure 29A:
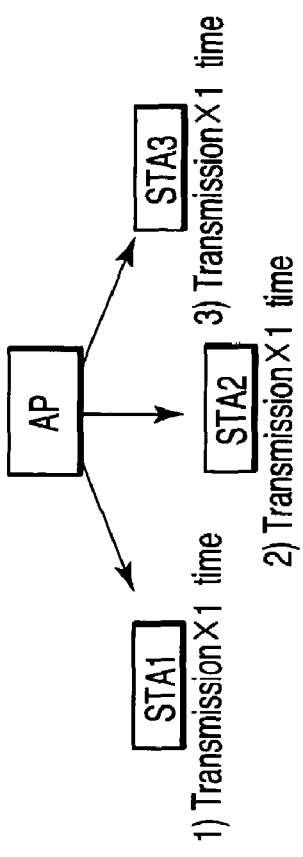
FIGS. 29A and 29B are views showing transmission to a plurality of destinations and reception of Partial Acks with time lags.
Figure 29B:
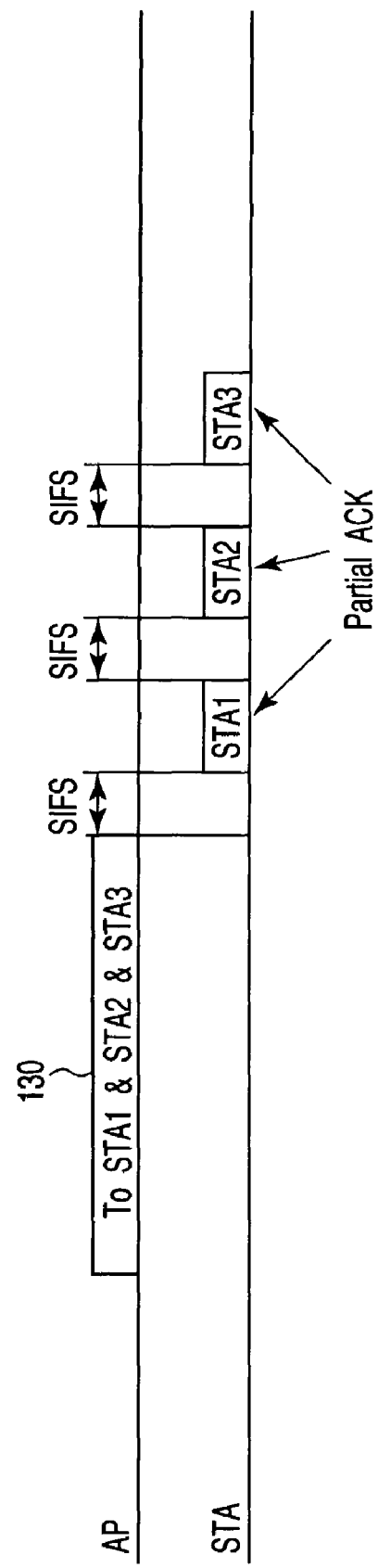

In this case, for example, an AP (Access Point) as a transmission source receives Partial Acks from the respective destination terminals (STAs) with time lags (FIG. 29) on the basis of the Multi Address Bitmap shown in FIG. 28. Such reception of Partial Acks with time lags is also the same as that in the above embodiments.

Figure 30:
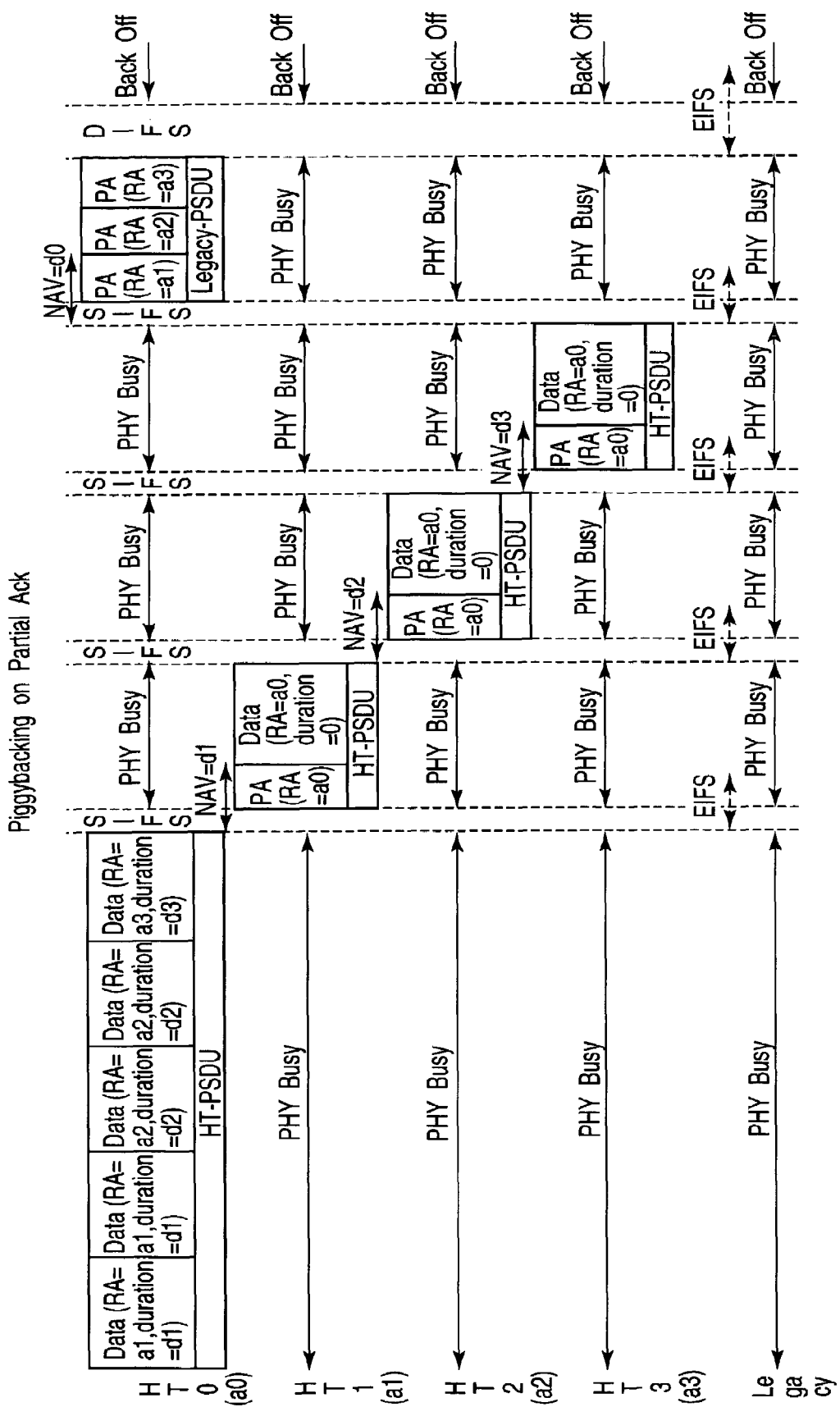
FIG. 30 is a view showing a carrier sense state according to the fourth embodiment of the present invention.

FIG. 30 is a view showing a carrier sense state associated with the fourth embodiment of the present invention. Assume that HT0 (address: a0), which is the first-type communication apparatus shown in FIG. 30 (to be referred to as an HT: High Throughput terminal), has aggregated MAC frames addressed to HT1 (address: a1), HT2 (address: a2), and HT3 (address: a3) and transmitted the frame. The information of periods during which the channel is used (duration values d1, d2, and d3) is written in the MAC header of each MAC frame, and a NAV (Network Allocation Vector) is set on the basis of the values.

Figure 31:
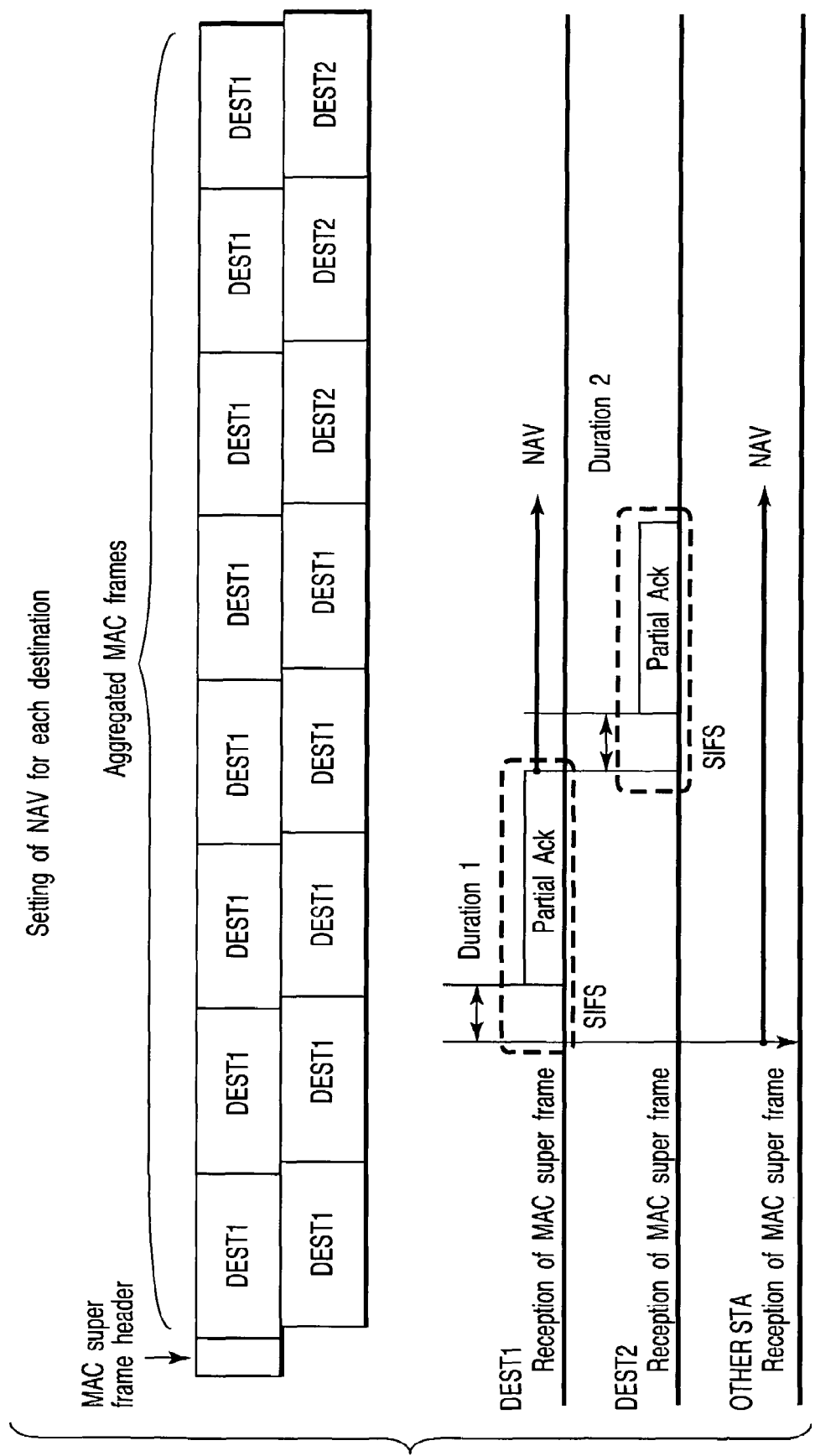
FIG. 31 is a view showing how a NAV is set for each destination.

According to the IEEE 802.11 standard, the value of a NAV set when a unicast data frame is transmitted is equal to the sum of a period of time until an ACK is received from a destination, i.e., an SIFS (Short Inter Frame Space) time, and an ACK transmission time. In this case, as shown in FIG. 31, during the duration period of DEST1, DEST2 sets a NAV, whereas DEST1 sets a NAV only during the duration of period of DEST2 after transmitting a Partial Ack. According to this method, if, for example, a terminal which transmits a Partial Ack with a time lag aggregates an ACK and a data frame into one physical frame and transmits it, the required time exceeds the NAV (the sum of the SIFS period and the ACK transmission time) designated in advance.

Figure 32:
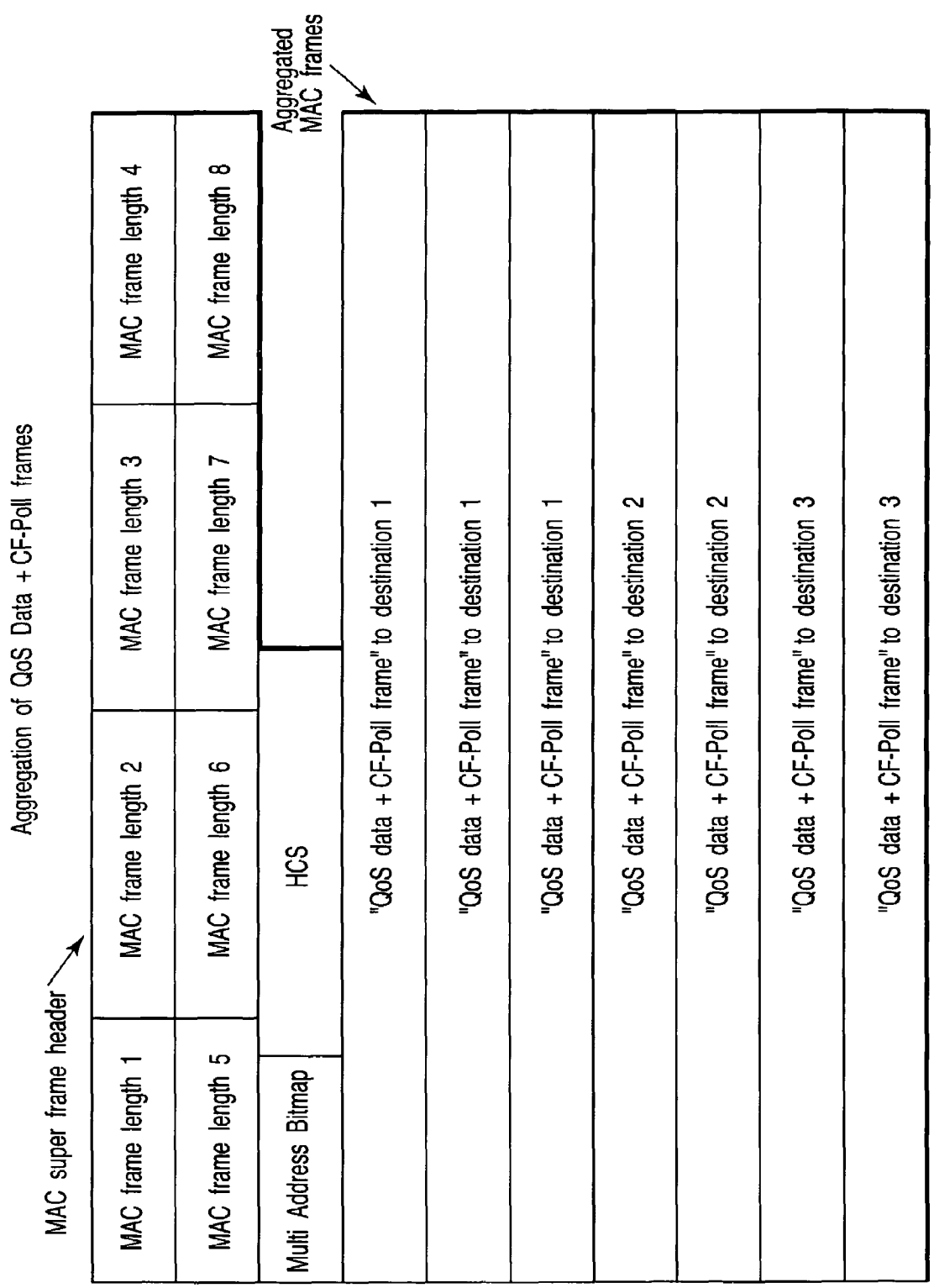
FIG. 32 is a view showing an example of aggregation of QoS data and CF-Poll frames.

According to the IEEE 802.11e standard, a HC can transmit QoS data to a QSTA upon piggybacking a polling frame addressed to the destination on the QoS data. That is, it is determined from the type information and subtype information of a MAC header that the received frame is a (QoS Data+CF-Poll) frame. As shown in FIG. 32, by aggregating the (QoS data+CF-Poll) frame defined in IEEE 802.11e with the MAC super frame, each of HT1, HT2, and HT3 in FIG. 30 can transmit a data frame to HT0 upon aggregating it with an acknowledgement response within the transmission allowable period defined by TXOP.

That is, when each of HT1, HT2, and HT3 in FIG. 30 receives a MAC super frame from HT0, if a MAC frame addressed to itself is a (QoS Data+CF-Poll) frame and the time required for transmission falls within the transmission allowable time (TXOP) designated by CF-Poll, each HT can transmit a data frame to HT0 upon aggregating it with a Partial Ack. In FIG. 30, "Duration" (channel utilization period) of the aggregated MAC frame is the SIFS period+ACK transfer time. Alternatively, the "Duration" can be the SIFS+the channel utilization period (TXOP) of the radio terminal instead of the SIFS period+ACK transfer time. With this operation, while HT1 is transmitting a Partial Ack (+a data frame) to HT0 upon aggregating them into one physical frame, the remaining terminals (HT2, HT3) can avoid collision between frames by setting a NAV). HT0 may sequentially transmit (partial) ACK responses for the MAC data frames aggregated with Partial Acks from HT1, HT2, and HT3 for the respective destinations, or may transmit Partial Ack responses to a plurality of destinations upon aggregating them. Assume that a given terminal receives a MAC super frame obtained by aggregating MAC frames addressed to a plurality of destinations, and the frame address to the terminal contains only a Partial Ack. In this case, as is obvious, the terminal need not set a NAV based on "Duration" or return an ACK response.

Figure 33:
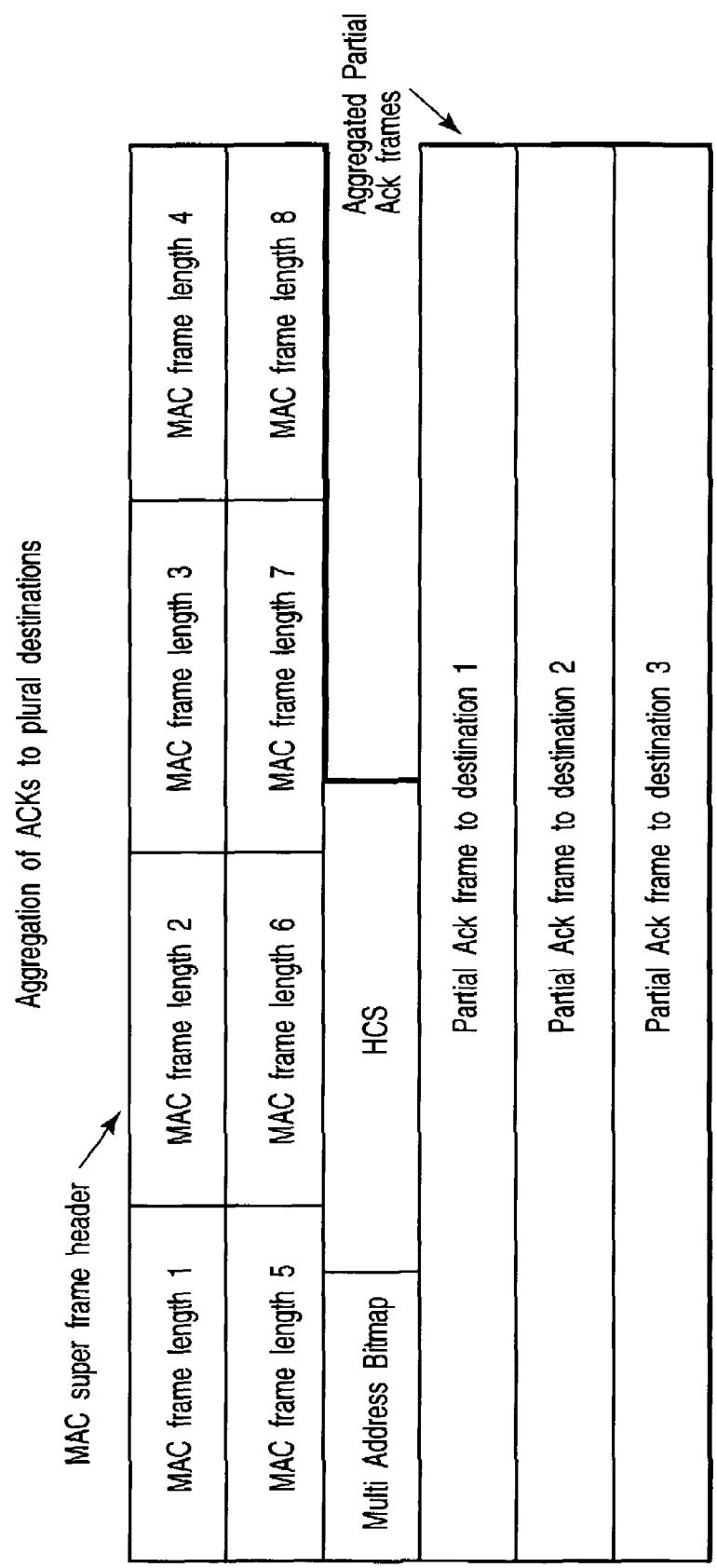
FIG. 33 is a view showing an example of aggregation of Partial Ack frames addressed to a plurality of destinations.

Note that in the case shown in FIG. 30, a Legacy terminal implemented by the second-type physical layer protocol exists in addition to the high throughput terminals (HT0 to HT3) implemented by the first-type physical layer protocol. The Legacy terminal cannot decode a MAC super frame in the format shown in FIG. 33 even if it receives it. Therefore, after the wireless medium shifts from the busy state to the idle state, carrier sense based on EIFS (Extended IFS) is performed. If the idle state continues after this, random backoff occurs.

According to the fourth embodiment of the present invention, if the timing of time-lag Partial Acks can be properly set on the basis of TXOP or the like designated by CF-Poll, the throughput can be increased by piggybacking QoS Data on Partial Ack.

Fifth Embodiment

Figure 34:
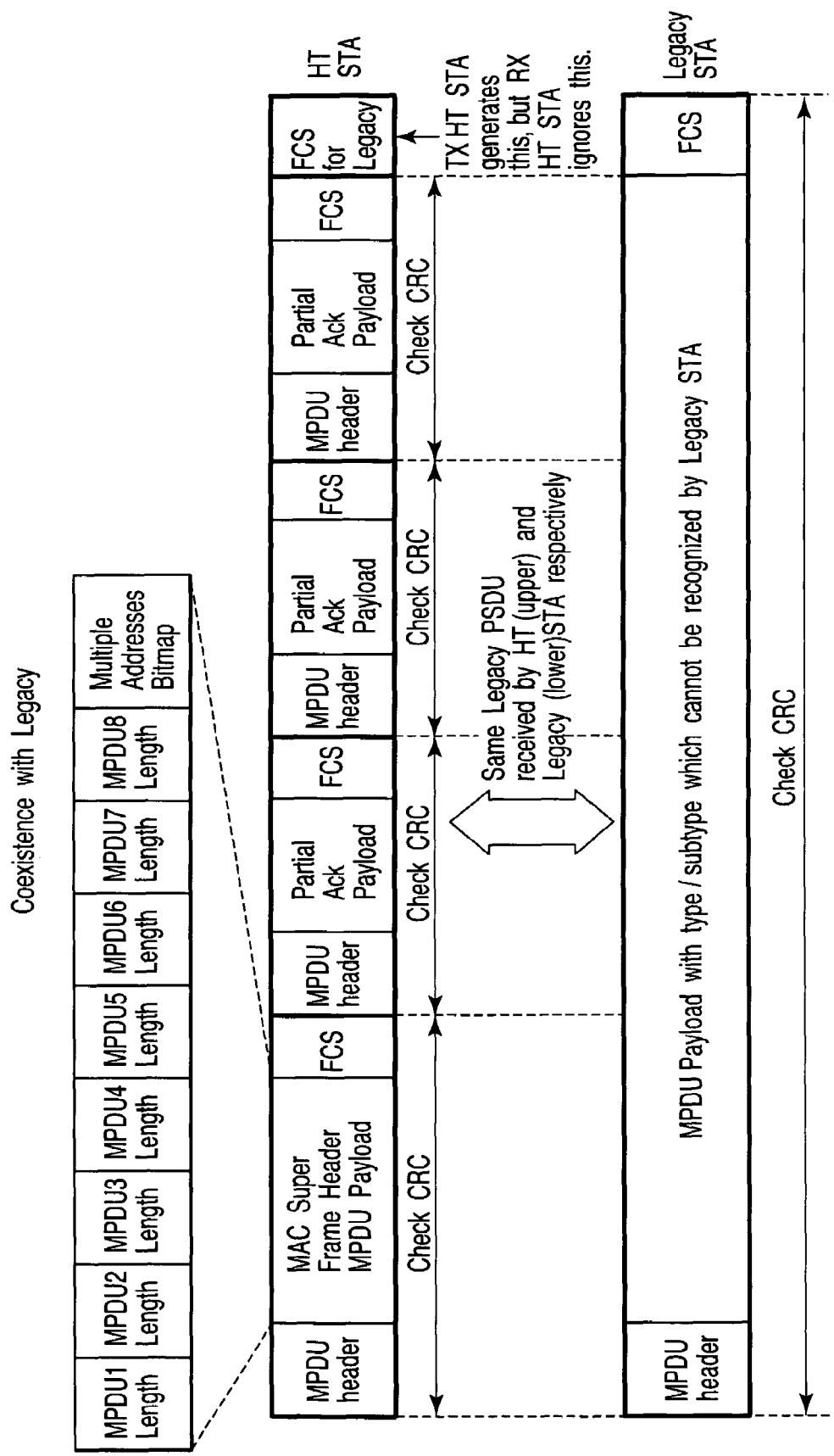
FIG. 34 is a view showing an example of a format which allows a frame check by a Legacy terminal according to the fifth embodiment of the present invention.

As in the case shown in FIG. 30, when a high throughput terminal implemented by the first-type physical layer protocol coexists with a Legacy terminal implemented by the second-type physical layer protocol, the Legacy terminal cannot decode a frame from the high throughput terminal, and performs carrier sense based on EIFS. In general, the EIFS period is longer than the DIFS (Distributed Coordinate Function inter frame Space) period and the frame interval AIFS (Arbitration Inter Frame Space) for each priority which is defined in IEEE 802.11e, and hence media access rights are not evenly distributed. As shown in FIG. 34, therefore, when Partial Acks addressed to a plurality of destinations are to be aggregated, a MAC header which can be understood by the Legacy terminal is added to the head of the MAC super frame, and an FCS is added to the end of the frame so as to perform error calculation for the MAC super frame header and MAC super frame body (Partial Acks addressed to a plurality of destinations).

Figure 35:
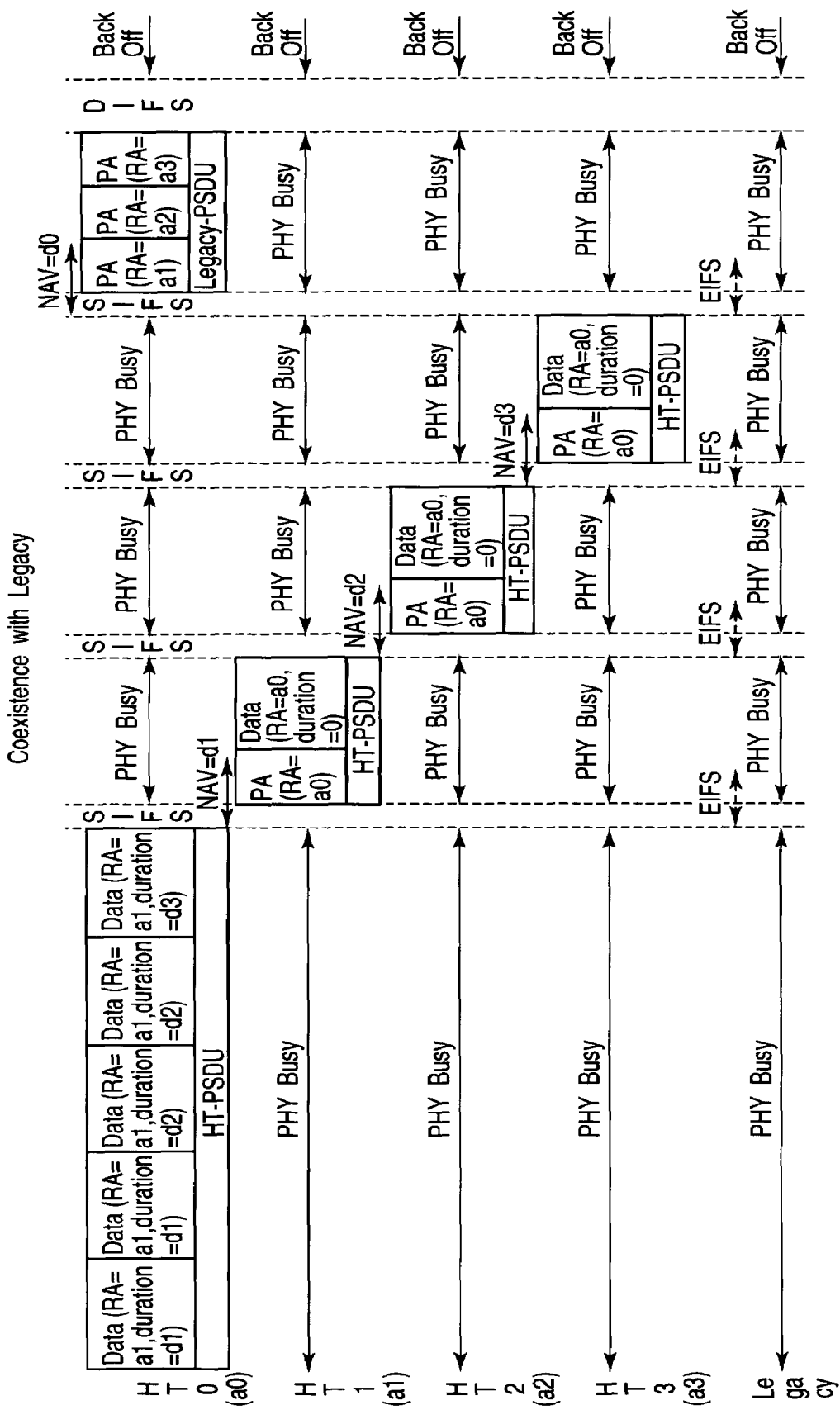
FIG. 35 is a view showing a carrier sense state according to the fifth embodiment of the present invention.

In addition, a MAC super frame obtained by aggregating Partial Acks is transmitted according to the second-type physical layer protocol (Legacy transmission defined in IEEE 802.11a). The Legacy terminal which has received the frame performs carrier sense based on DIFS in the same manner as a high throughput terminal, as shown in FIG. 35, after the channel becomes idle, upon determining proper reception of the frame on the basis of error calculation based on the FCS added to the end of the PSDU (Physical Layer Convergence Protocol service data unit).

Note that since the type and subtype are values which cannot be recognized by the Legacy terminal, the contents following the MAC header at the head of the frame cannot be interpreted by the Legacy terminal. The Legacy terminal can perform carrier sense based on DIFS instead of EIFS as long as the PSDU is correct. By using this embodiment, even if Partial Acks are transmitted to a plurality of destinations after data transmission to a plurality of destinations and the transmission of Partial Acks (including aggregated data) within the transmission period, the high throughput terminal and Legacy terminal can evenly perform media access after DIFS without causing any FCS error in the Legacy terminal.

Sixth Embodiment

In the embodiments designed to aggregate a plurality of MPDUs (MAC Protocol Data Units) into one physical frame, the pieces of length information of a plurality of MPDUs which are aggregated are added to the front portions of the MPDUs, together with one CRC (Cyclic Redundancy Check) for them. The receiving side extracts each MPDU and calculates an FCS (Frame Check Sequence). In contrast to this, according to the sixth embodiment of the present invention, as shown in FIG. 36, information or the like which identifies the length of each MPDU is added to each MPDU.

Figure 36:
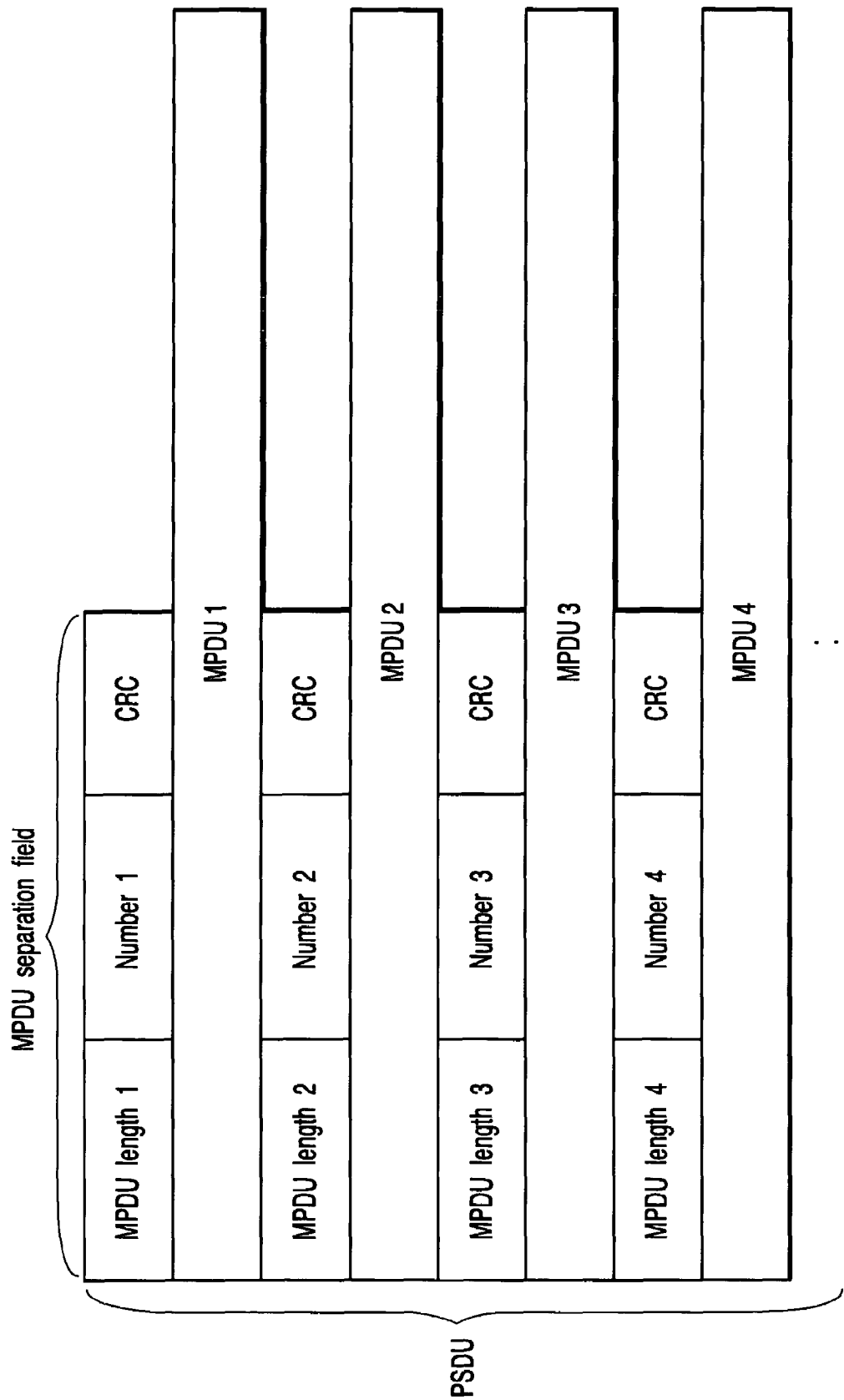
FIG. 36 is a view showing the aggregation of MPDU separations and MPDUs according to the sixth embodiment of the present invention.

As shown in FIG. 36, the "MPDU length" field (element) located at the front portion of each MPDU represents the length of each aggregated MPDU in octets, and the "order" field is used to write a serial number starting from the head of the PSDU. In the following description of the embodiment, such information which includes "MPDU length", "order", and a CRC field for them, and is added to the head of each of the aggregated MPDU will be referred to as "MPDU separation" hereinafter. In the description of the sixth and seventh embodiments, the number of MPDUs to be aggregated is set to eight. However, the number of MPDUs that can be aggregated can be arbitrarily set in accordance with the situation.

In the sixth and seventh embodiments, various kinds of bitmap information can also be added to a frame obtained by aggregating a plurality of MPDUs with different Ack Policies defined in IEEE 802.11e and perform transmission to a plurality of destinations.

Figure 37:
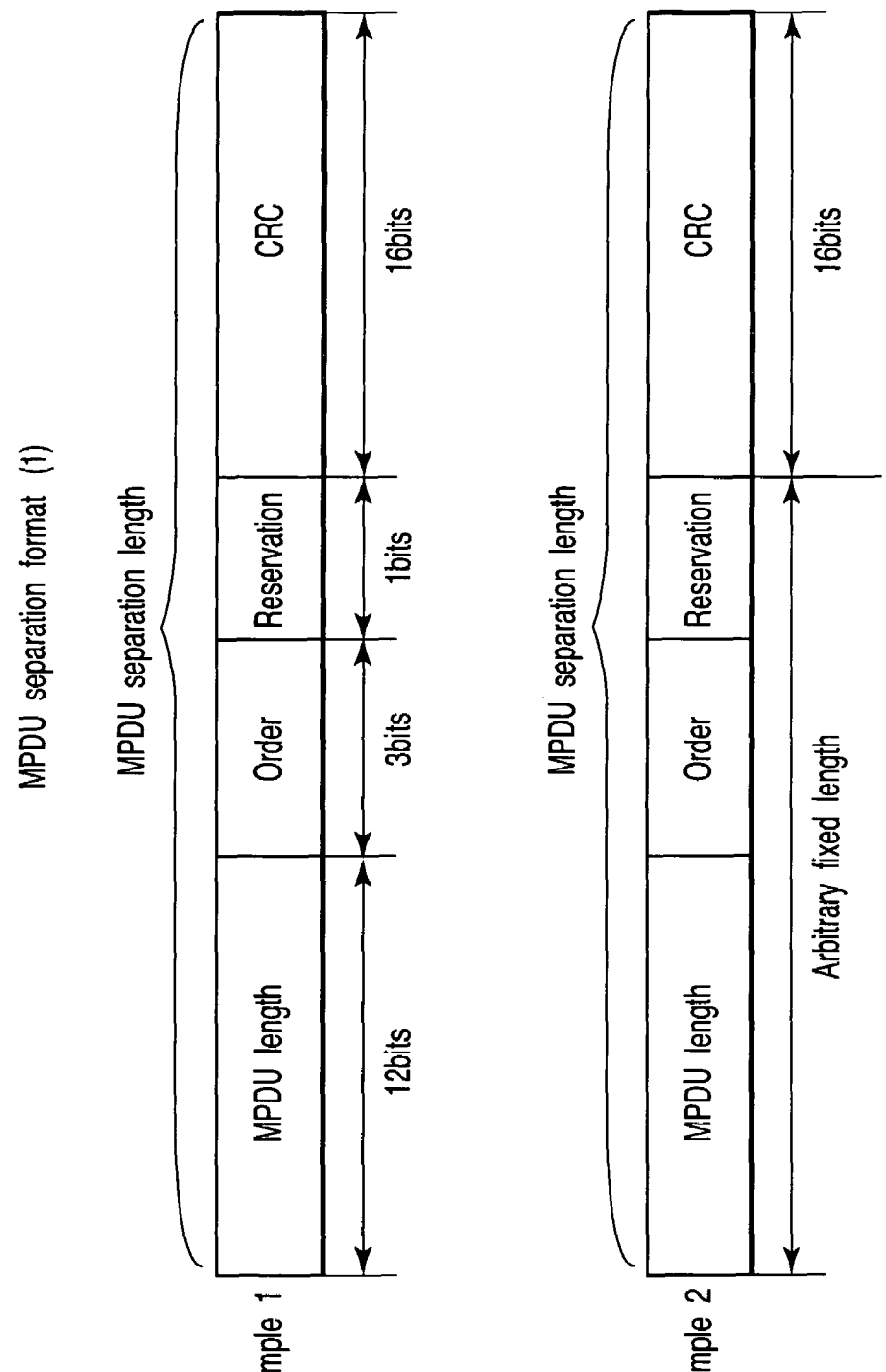
FIG. 37 is a view showing the format of an MPDU separation.
Figure 38:
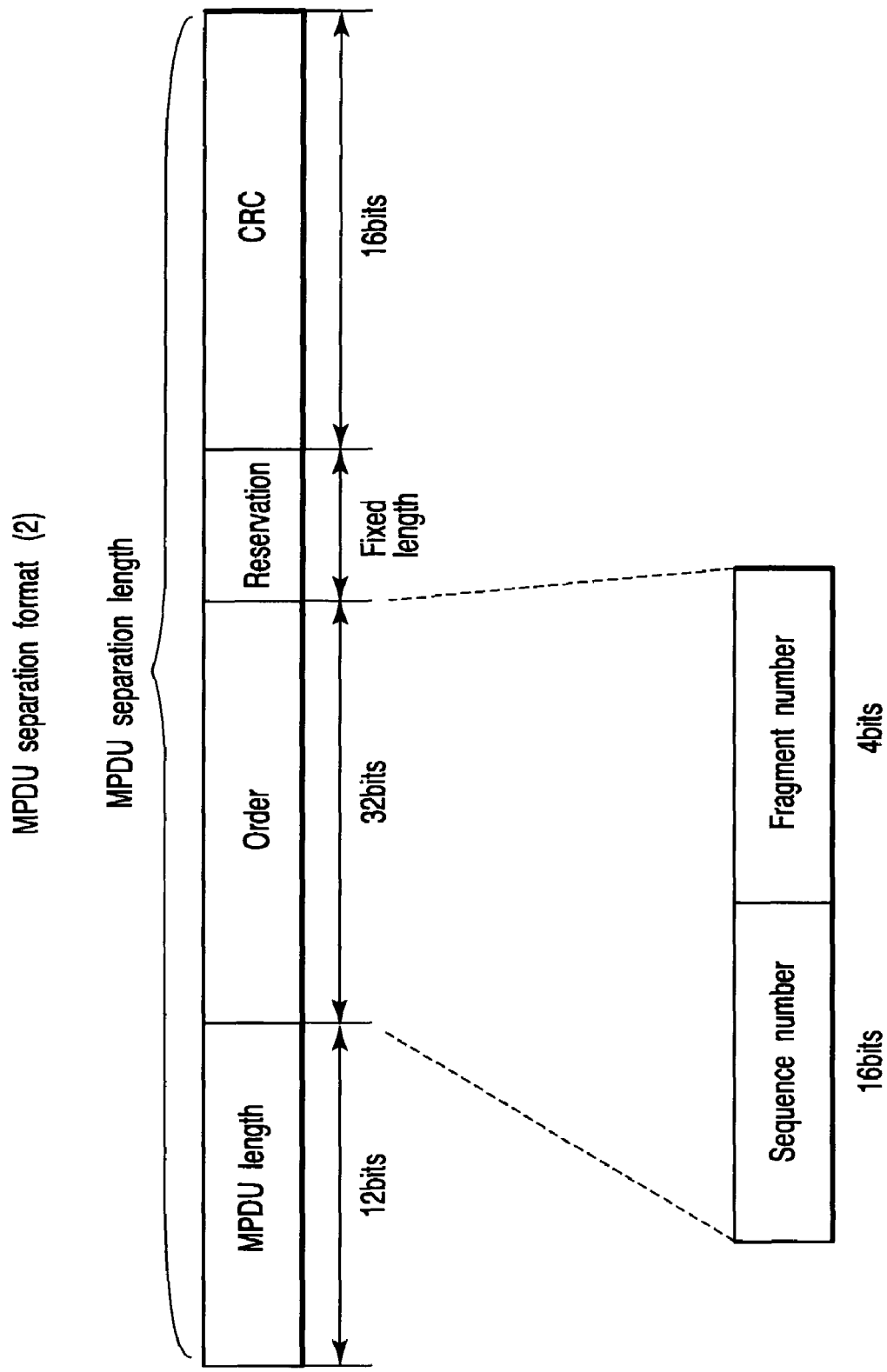
FIG. 38 is a view showing the format of an MPDU separation.

FIGS. 37 and 38 show MPDU separation format examples. Each MPDU separation includes an "MPDU" field indicating the length of the succeeding MPDU, an "order" field indicating the ordinal number of the MPDU separation, and a CRC for the MPDU separation.

Example 1 in FIG. 37 shows a case wherein a 1-bit "reservation" field is present in addition to "MPDU length", "order", and "CRC". Obviously, however, the lengths of these fields are not specifically limited, and each field may take an arbitrary fixed length, as in example 2 in FIG. 37. In examples 1 and 2 in FIG. 37, as the ordinal number of a given MPDU, the number serially counted from the head of the PSDU is assumed to be written in the "order" field. As shown in FIG. 38, however, in the order field, the sequence number of the MPDU following the MPDU separation or a sequence number and fragment number can be designated. Numbers may be serially assigned, from the head of the PSDU, to the MPDUs, such as "0, 1, 2, 3, 4" or "1, 2, 3, 4, 5", as long as the numbers are consecutive. When the numbers in the "order" fields are made to correspond to the sequence numbers of MPDUs (including fragment numbers in some cases), a terminal which is to transmit the aggregated frames writes corresponding values in the MPDU separations while referring to the MAC headers of the respective MPDUs.

In a typical case, a terminal which has received a frame having an MPDU separation field like the one shown in FIG. 36 performs FCS check for each of the aggregated MPDUs, and returns a reception status as a Partial Ack to the transmitting side. The CRC attached to the MPDU separation protects information such as "MPDU length" and "order". If the CRC calculation result is correct, it is determined that the MPDU separation has been successfully received.

Figure 39:
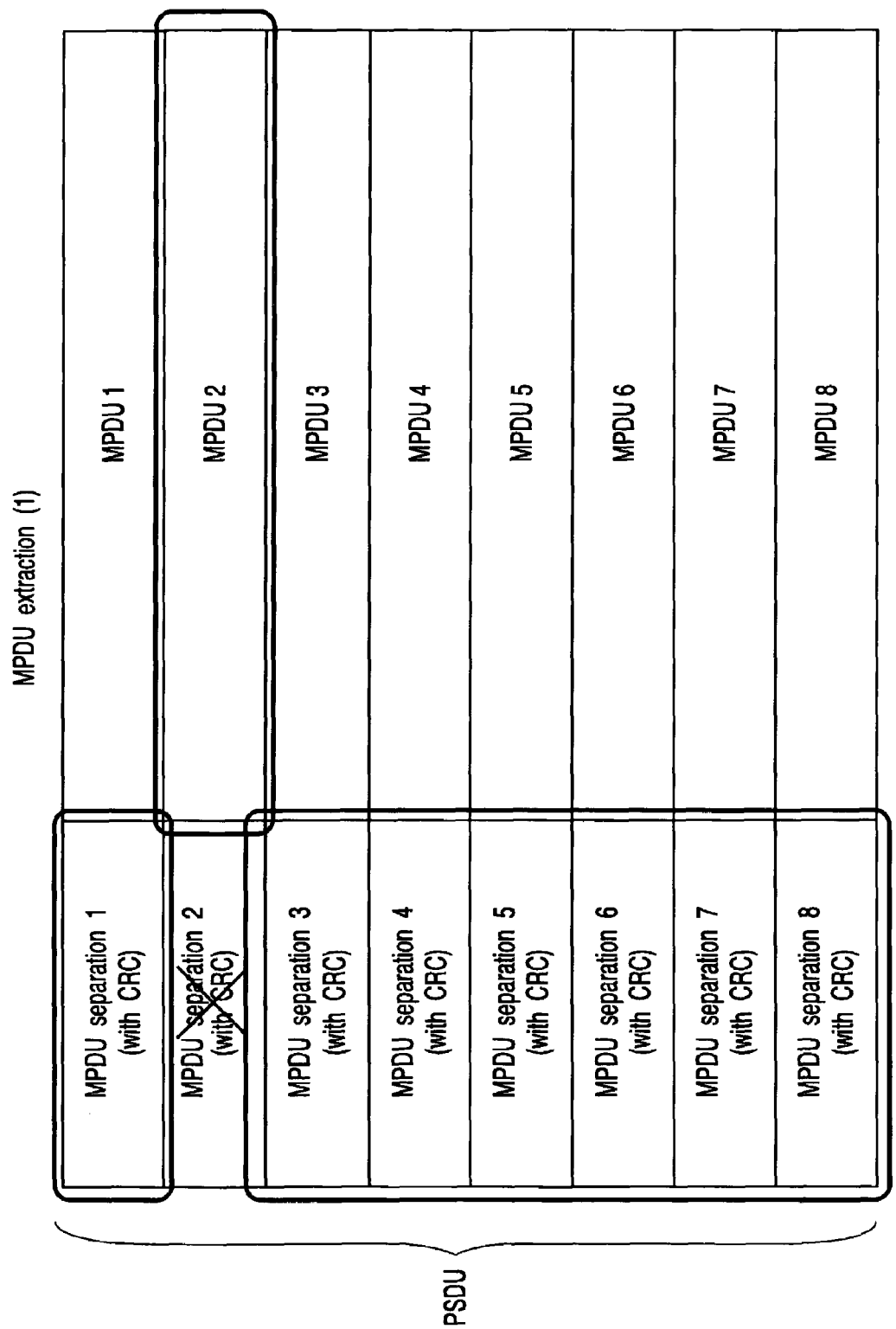
FIG. 39 is a view for explaining the reception status of a PSDU and the extraction of MPDUs.
Figure 40:
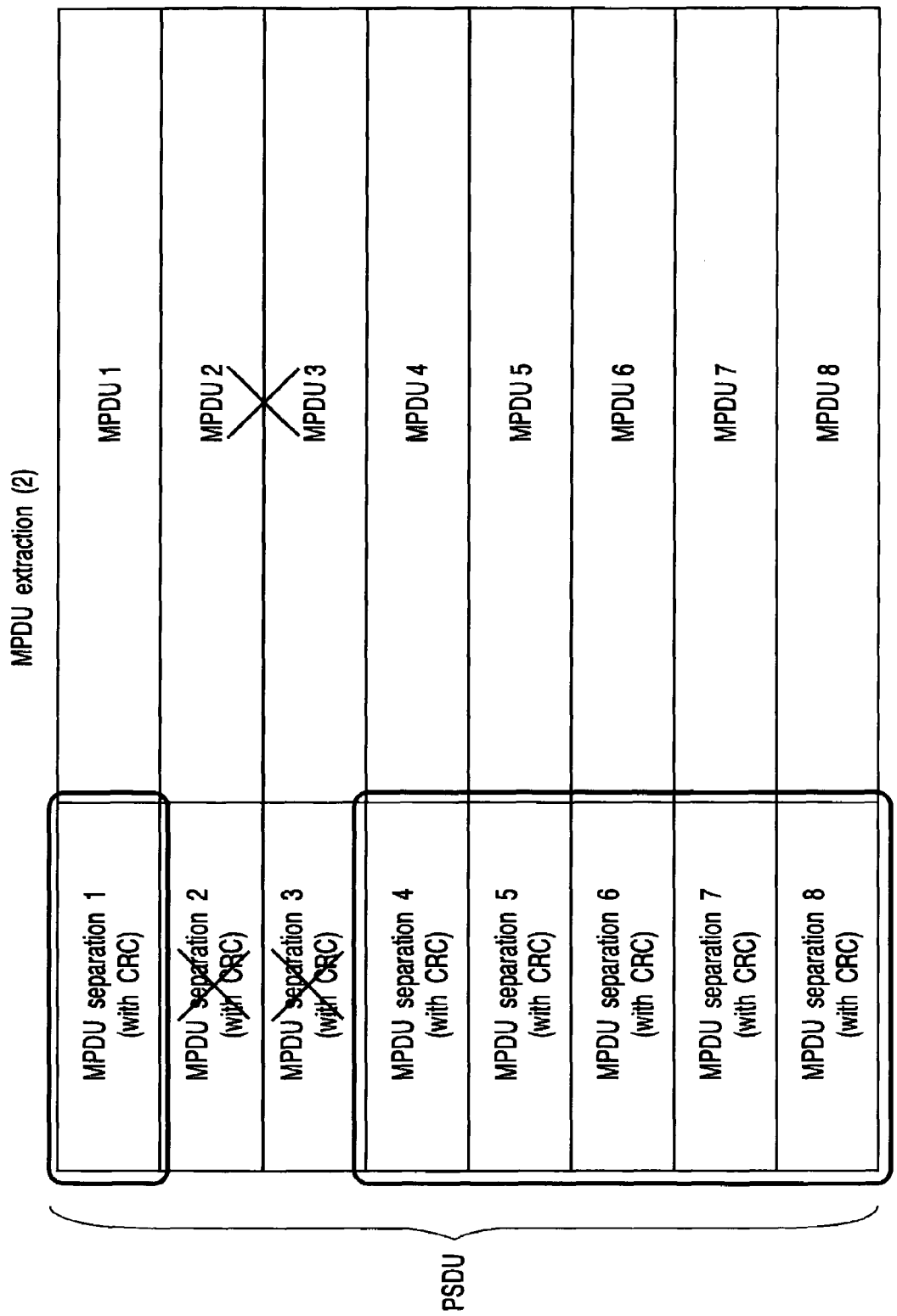
FIG. 40 is a view for explaining the reception status of a PSDU and the extraction of MPDUs.

FIGS. 39 and 40 show an example of the reception status of a terminal which has received a PSDU obtained by aggregating a plurality of MPDUs and adding an MPDU separation to the head of each MPDU. As shown in FIG. 39, if it is determined from the CRC check result that the first MPDU separation has been normally received, it is determined that the information of "MPDU length" written in it is correct. Therefore, the succeeding MPDU (MPDU1 in FIG. 39) can be extracted. Since an FCS is attached to each MPDU, if the FCS calculation of the MPDU is correct, it can be determined that the MPDU has been properly received.

Figure 41:
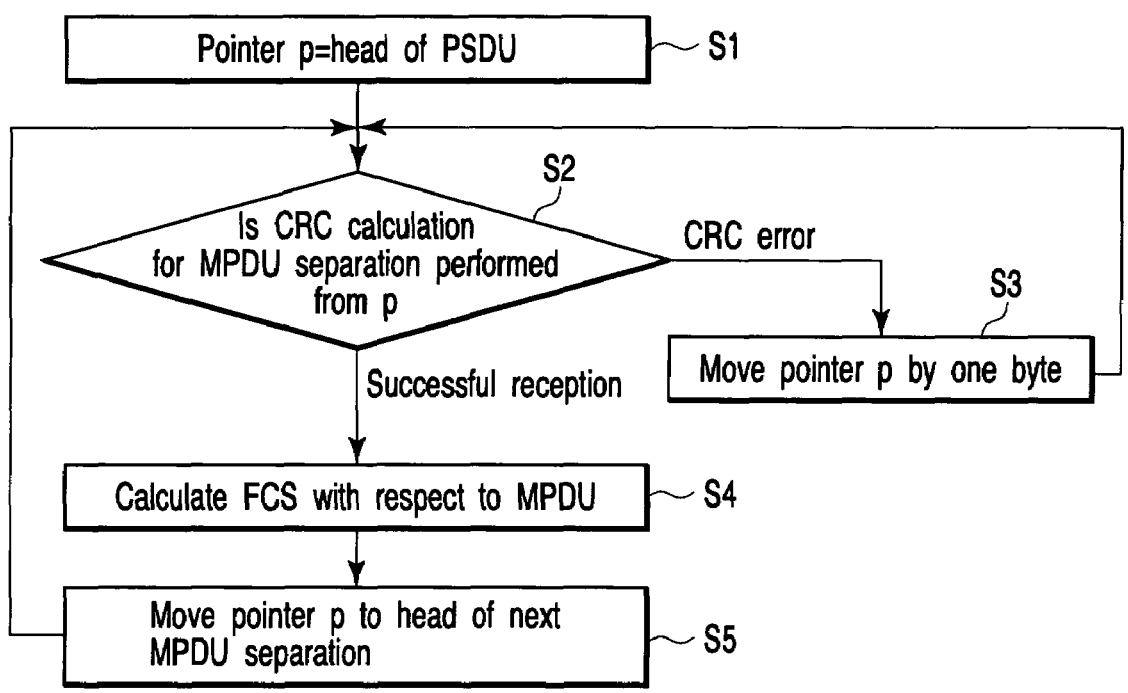
FIG. 41 is a flowchart showing a search procedure for MPDU separations.

If the CRC check result on a given MPDU separation indicates an error as in the case of "MPDU separation 2" in FIG. 39, search processing is continuously performed up to the next MPDU separation. This search processing method will be described with the flowchart of FIG. 41. Assume that a pointer p in the flowchart of FIG. 41 is an identifier indicating a relative position from the head of a PSDU, and is moved toward the end of the PSDU on an octet basis. For example, the pointer p indicates the head of the PSDU at first (step S1), and error calculation for an MPDU separation is performed in consideration of the length of the MPDU separation from the portion indicated by the pointer p (this length includes the CRC field and is recognized between the transmitting and receiving sides) (step S2). If the calculation result indicates that the MPDU separation is correct, the succeeding MPDU is extracted by the length designated by "MPDU length" in the MPDU separation, and FCS calculation for the MPDU is performed (step S4). As described above, if the FCS of the MPDU is correct, it is determined that the MPDU has been properly received. If the CRC of the MPDU separation is wrong, the pointer p is moved toward the end of the PSDU by one octet (step S3). CRC calculation for the MPDU separation is performed again. At this time, the CRC calculation is performed in consideration of the length of the MPDU separation (including the CRC) from the position indicated by the pointer p. If the CRC calculation result on the MPDU separation indicates an error, the pointer p is moved to the end of the PSDU again by one octet, and CRC check on the MPDU separation is performed. If the CRC check on the MPDU separation is successful, the flow exits the search routine for MPDU separations to perform FCS check on the succeeding MPDU. Assume that determination on whether or not the MPDU has been successfully received conforms to the above procedure.

Assume that in the case shown in FIG. 39, "MPDU separation 2" is wrong, and "MPDU separation 3" has been properly received as a result of MPDU separation search. Assume that the length of the MPDU separation is fixed, and the value is recognized between the transmitting and receiving devices.

In this case, it can be determined that the length from the end of "MPDU1" to "MPDU separation 3" which has been properly received coincides with the area occupied by "MPDU separation 2" and "MPDU2". That is, it can be conjectured that the value obtained by subtracting the MPDU separation length (fixed) from the above length is the length of the MPDU. Therefore, checking the FCS for the MPDU makes it possible to check the reception status of the MPDU. That is, the end of the MPDU is regarded as a portion located just before the next normal MPDU separation to be found by scanning, and FCS error calculation is performed. In the case shown in FIG. 39, therefore, even if "MPDU separation 2" is wrong, it is determined that the MPDU has been properly received, as long as estimation of the length of "MPDU2" is correct. Obviously, if the FCS result on "MPDU2" in FIG. 39 indicates an error, it is determined that the MPDU has not been properly received. In addition, assume that serial numbers are assigned to the "order" fields in the MPDU separations. In this case, as shown in FIG. 40, if the numbers of MPDU separations which have been properly received are separated from each other by two or more MPDUs, it is determined that a plurality of MPDUs ("MPDU2" and "MPDU3" in FIG. 40) located between them are wrong.

Figure 42:
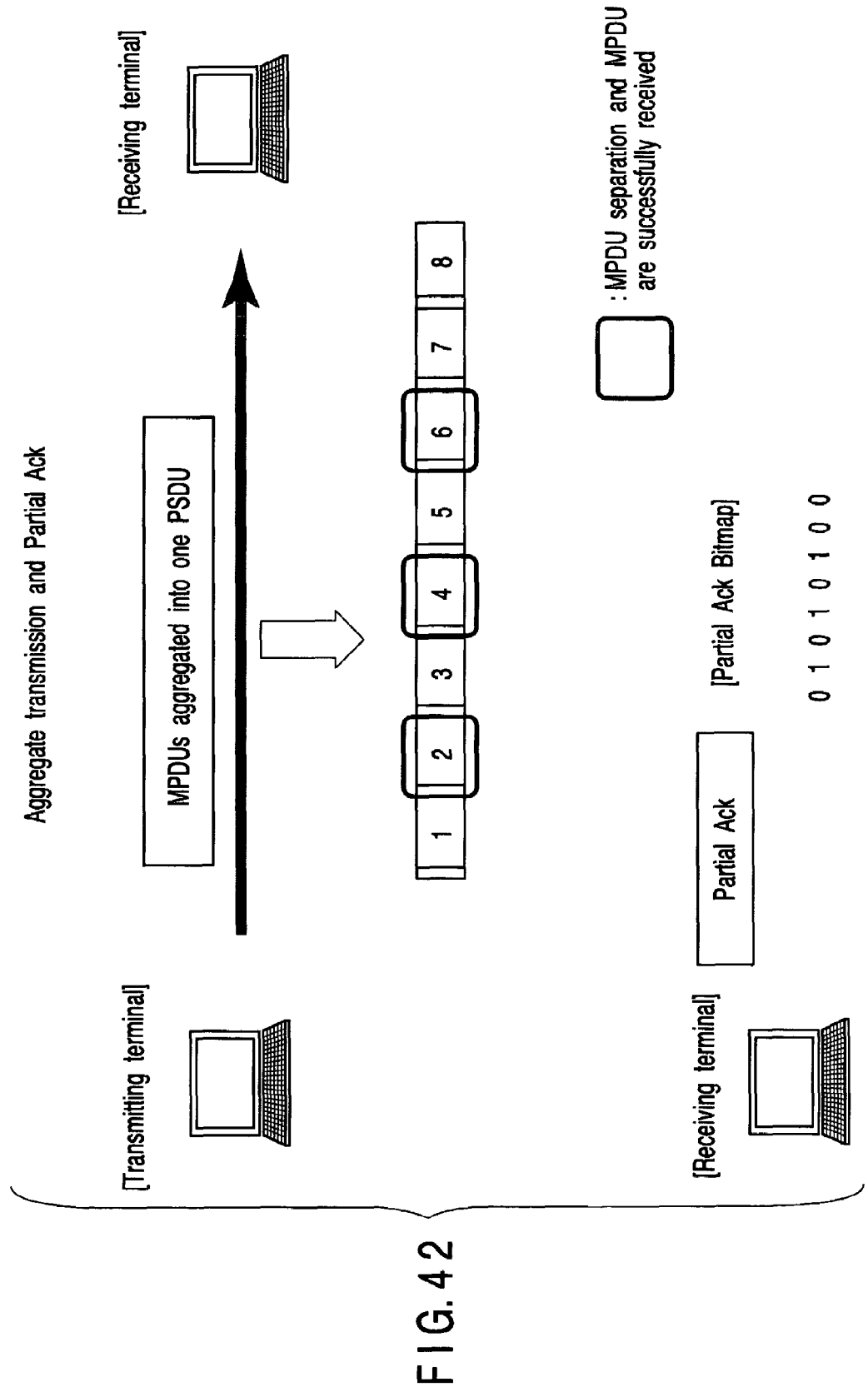
FIG. 42 is a view showing aggregate transmission and Partial Ack.
Figure 53:
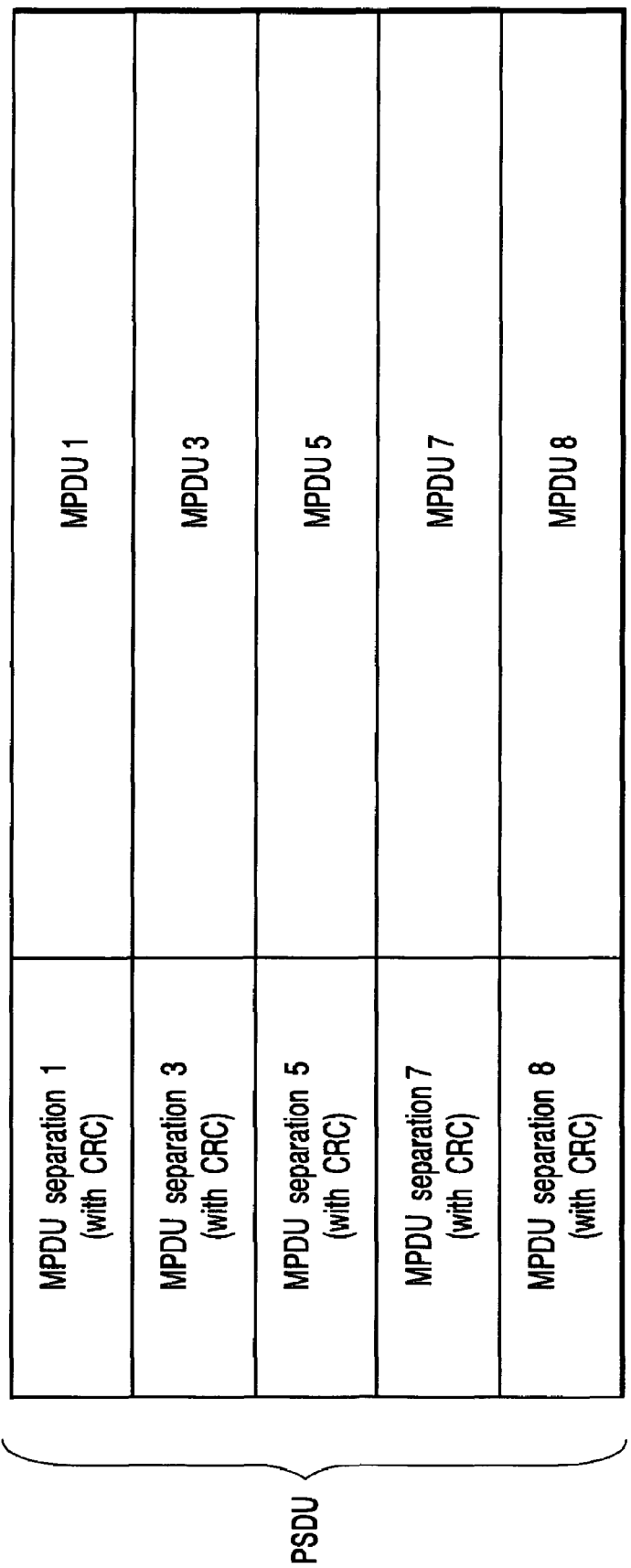
FIG. 53 is a view showing an example of aggregation at the time of retransmission.

Consider the example shown in FIGS. 42 and 43. Assume that MPDUs with sequence numbers "1" to "8" are aggregated into one PSDU and transmitted, and the MPDUs with "2", "4", and "6" of the transmitted MPDUs have been properly received. Since the MPDUs with "2", "4", and "6" need not be retransmitted, the MPDU size following each MPDU separation is set to 0, as shown in FIG. 43. That is, all the MPDU length fields in "MPDU separations "2", "4", and "6"" are designated 0, as shown in FIG. 43. Obviously, in this case, "order" in each MPDU separation may correspond to the sequence number of a corresponding MPDU or a serial number relative to the head of the PSDU. Alternatively, as shown in FIG. 53, with regard to any MPDU which need not be retransmitted, the MPDU separation itself can be omitted to skip "order". The example in FIG. 53 shows that numbers "2", "4", and "6" of the MPDUs which have been properly transmitted are skipped, and the MPDU with the "order" fields designated "1", "3", "5", "7", and "8" are aggregated into one physical frame.

Seventh Embodiment

Figure 44:
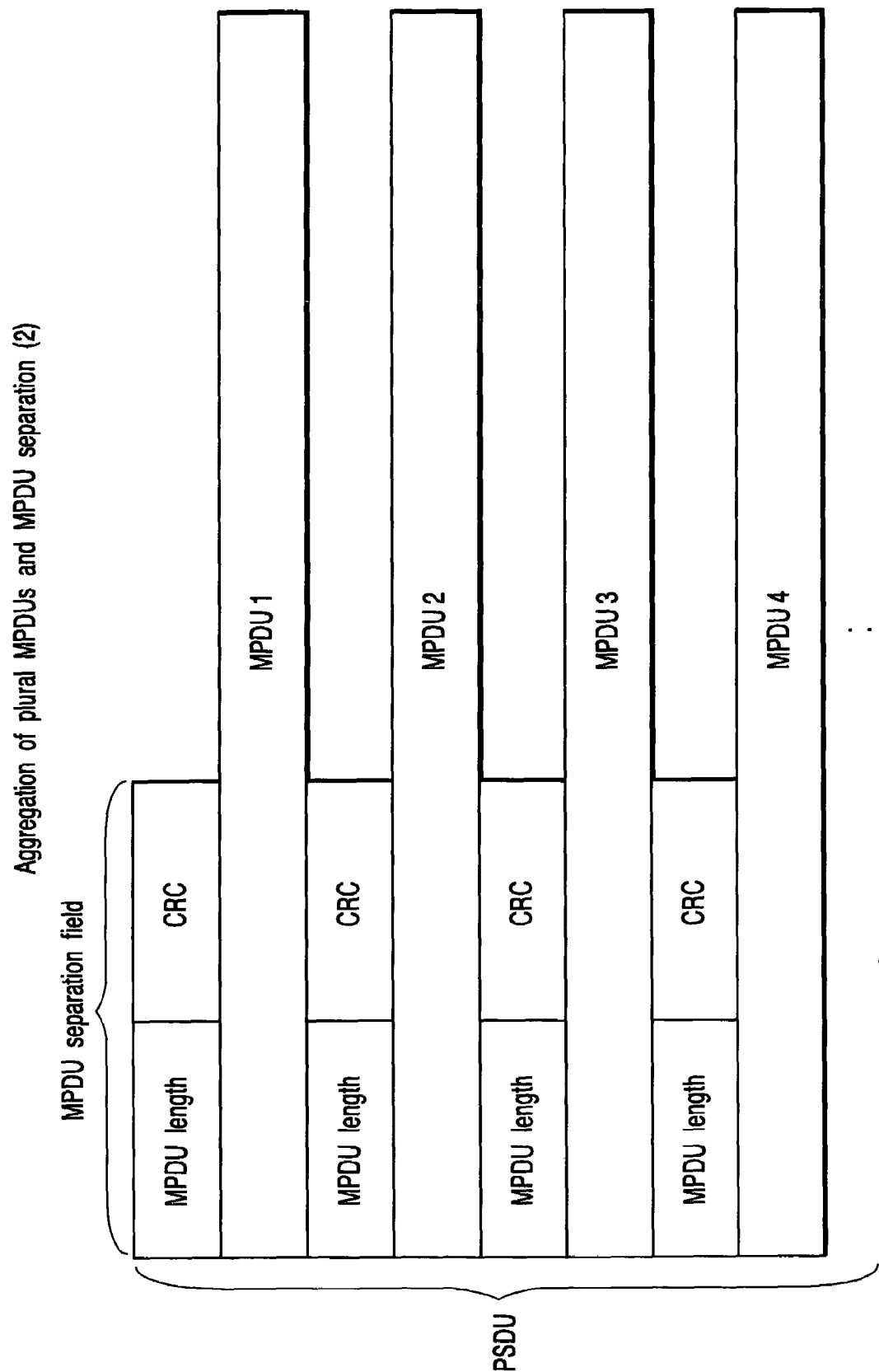
FIG. 44 is a view showing the aggregation of MPDU separations and MPDUs according to the seventh embodiment of the present invention.

In the sixth embodiment described above, each MPDU separation field contains the (sub) field element of "order" (a number starting from the head of the PSDU, the sequence number of the MPDU, or a number corresponding to a fragment number). In contrast, the format of each MPDU separation according to the seventh embodiment of the present invention contains no "order" field, as shown in FIG. 44.

Figure 45:
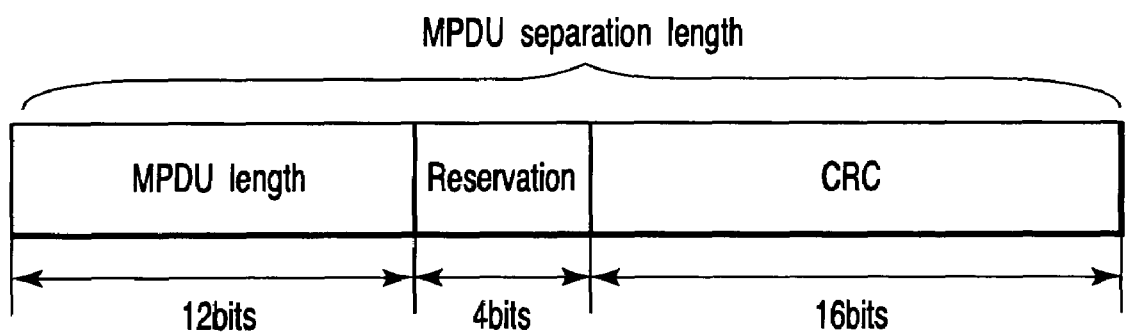
FIG. 45 is a view showing the format of an MPDU separation.

FIG. 45 shows the practical format of an MPDU separation containing no "order" field. As in the sixth embodiment shown in FIGS. 37 and 38, an "MPDU length" field which designates the length of the MPDU following the MPDU separation field in octets and CRC for "MPDU length" and the remaining "reservation" field are written in each MPDU separation.

Figure 46:
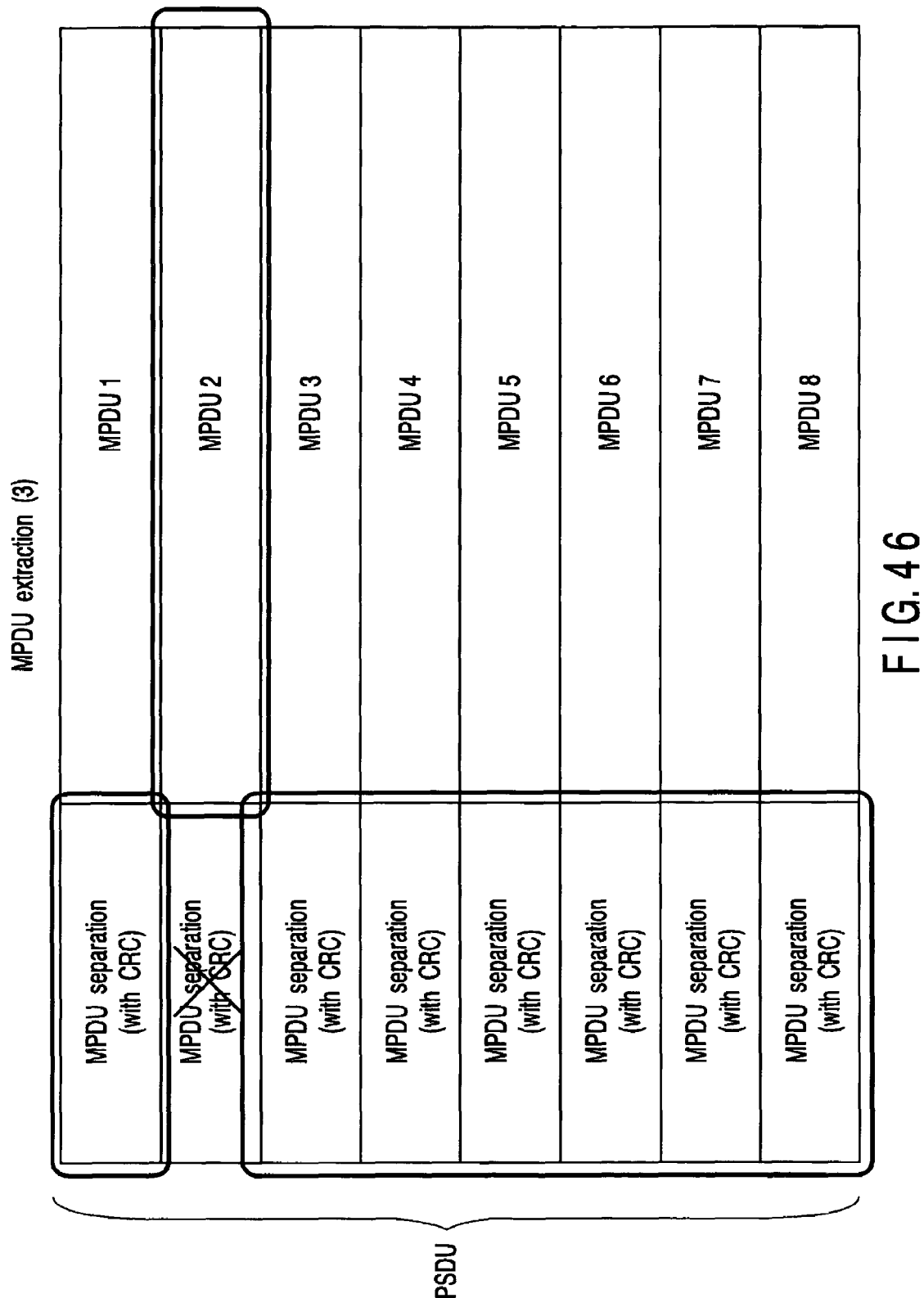
FIG. 46 is a view for explaining the reception status of a PSDU and the extraction of MPDUs.
Figure 48:
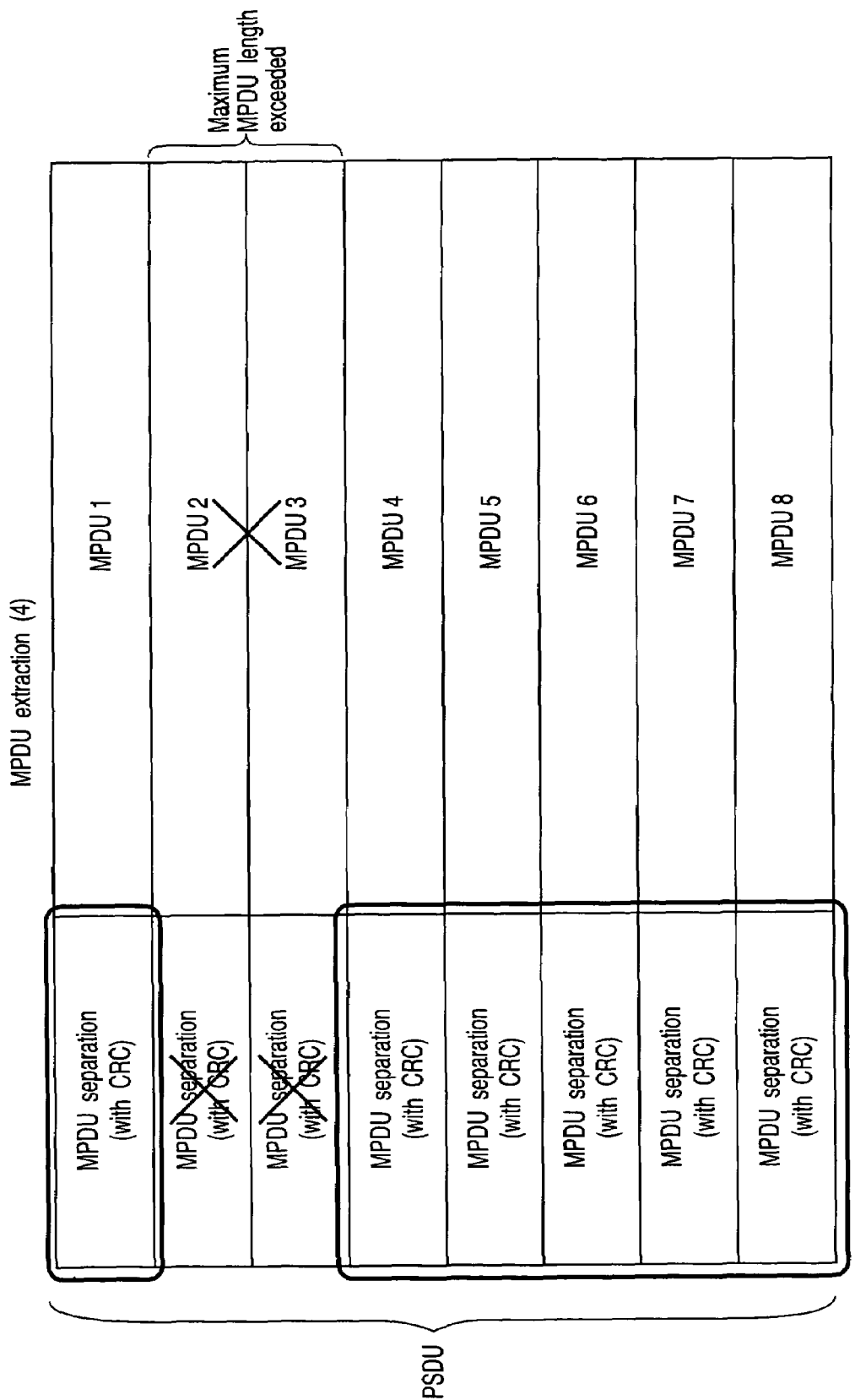
FIG. 48 is a view for explaining the reception status of a PSDU and the extraction of MPDUs.

FIGS. 46 and 48 each show an example of how a PSDU (in which a plurality of MPDUs are aggregated) containing MPDU separations containing no "order" fields is received. Referring to FIG. 46, as in the sixth embodiment, if the CRC calculation result on an MPDU is correct, it can be determined that the information of "MPDU length" in the MPDU separation is correct. Therefore, extracting the succeeding MPDU and checking the FCS makes it possible to determine whether or not the MPDU has been properly received. Referring to FIG. 46, the first "MPDU separation" and "MPDU1" have been properly received. Consider a case wherein the CRC calculation for the second "MPDU separation" indicates an error as shown in FIG. 46. In this case, as described with reference to the sixth embodiment, CRC check is consecutively performed for each octet in accordance with the procedure of the flowchart shown in FIG. 41 to search for the next MPDU which has been properly received. In the example shown in FIG. 46, it is assumed that "MPDU separation" counted third from the head of the PSDU has been properly received. At this time, as in the sixth embodiment, assuming that an MPDU exists between "MPDU1" and "MPDU separation" counted third from the head of the PSDU which have been properly received, FCS check on the MPDU is performed by subtracting the length of the MPDU separation (the fixed length recognized between the transmitting and receiving terminals) from the above length. That is, error calculation is performed by regarding the end of the MPDU as a portion just before the next normal MPDU separation which will be found by scanning. If the FCS is normal, it is determined that the MPDU has been properly received. In the example shown in FIG. 46, even if the "MPDU separation" fields counted first and third from the head of the PSDU have been properly received upon CRC check, and the second "MPDU separation" occupying the area between them is wrong, "MPDU2" has not been properly received by directly executing error calculation on "MPDU2" by FCS. Obviously, if the FCS calculation result on the MPDU indicates an error, a Partial Ack representing that the MPDU has not been properly received is generated.

Figure 47:
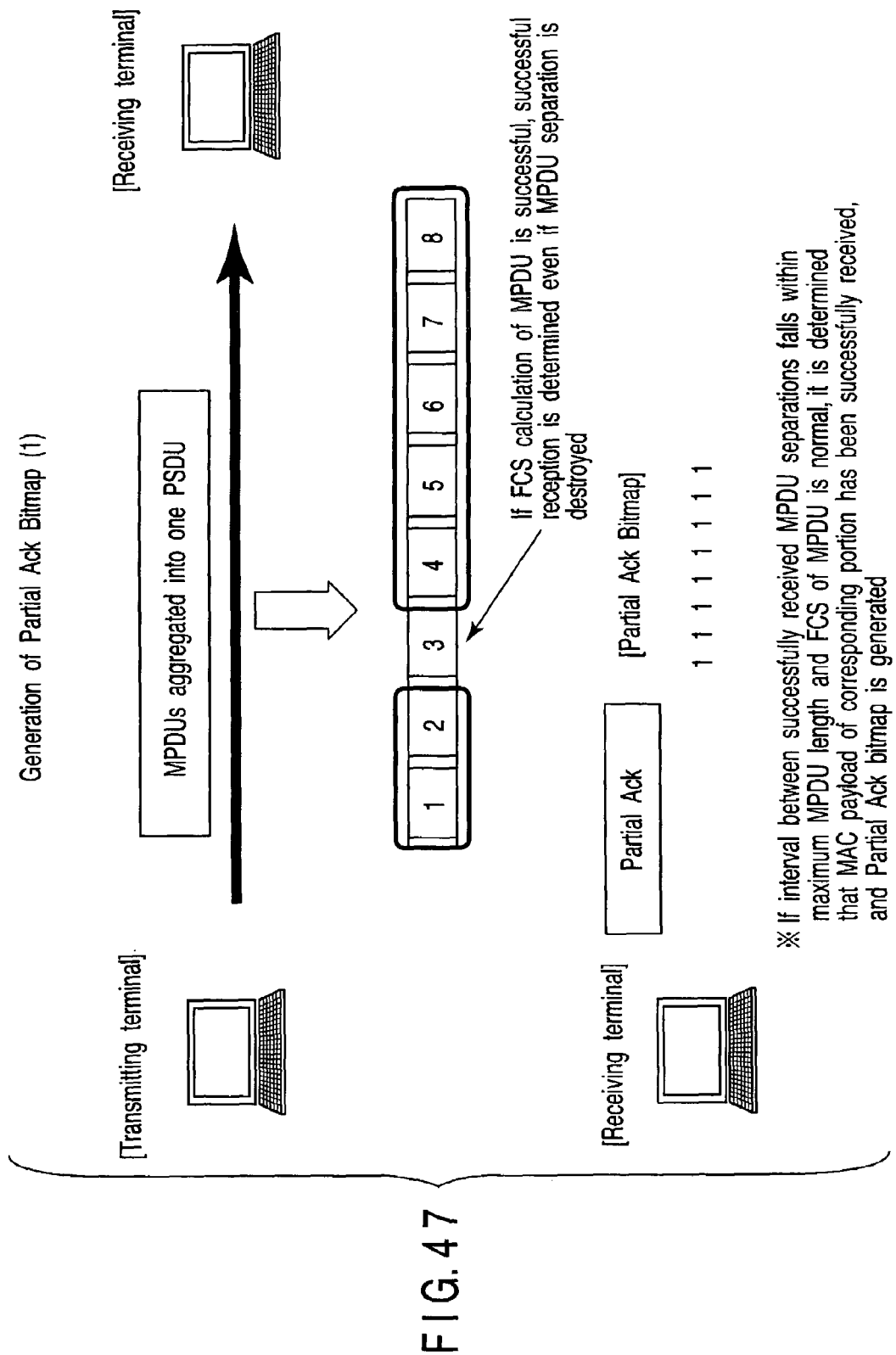
FIG. 47 is a view showing aggregation transmission and Partial Ack.

The example shown in FIG. 47 shows the following. A transmitting terminal transmits a plurality of MPDUs upon aggregating them, as shown in FIG. 46. The receiving side determines from the error calculation results on the respective MPDU separations and the respective MPDUs that an MPDU separation (the MPDU separation counted third from the head of the PSDU in FIG. 47) is wrong. In spite of this determination, it is determined, from the information of the preceding and succeeding MPDU separations which have been properly received, that the MPDU located therebetween is correct (FCS check on the MPDU). At this time, all the bits of a bitmap in the Partial Ack generated on the side which has received the aggregated frame are set to "1" indicating successful reception. Obviously, a bit indicating successful reception can be realized by not only positive logic but also negative logic.

Assume that as shown in FIG. 48, a CRC check result indicates that a given MPDU separation (the second MPDU separation in the example shown in FIG. 48) is wrong, and a search for a normal MPDU separation is to be continuously performed. In this case, when the number of octets by which the pointer is moved exceeds the maximum MPDU length (the maximum size defined in the IEEE 802.11 standard, which one MPDU can take and is designated in octets), it is determined that two or more MPDU separations (and MPDUs) are wrong. The notation "maximum MPDU length exceeded" in FIG. 48 indicates that the maximum MPDU length is exceeded. This also applies to the following description. In this case, when a Partial Ack Bitmap indicating reception statuses is to be generated with respect to Partial Ack frames returned from the receiving terminals, the relative positions of frames which have been successfully received are based on estimation. However, the transmitting side is notified of the reception status by the method shown in FIGS. 49 and 50.

Figure 49:
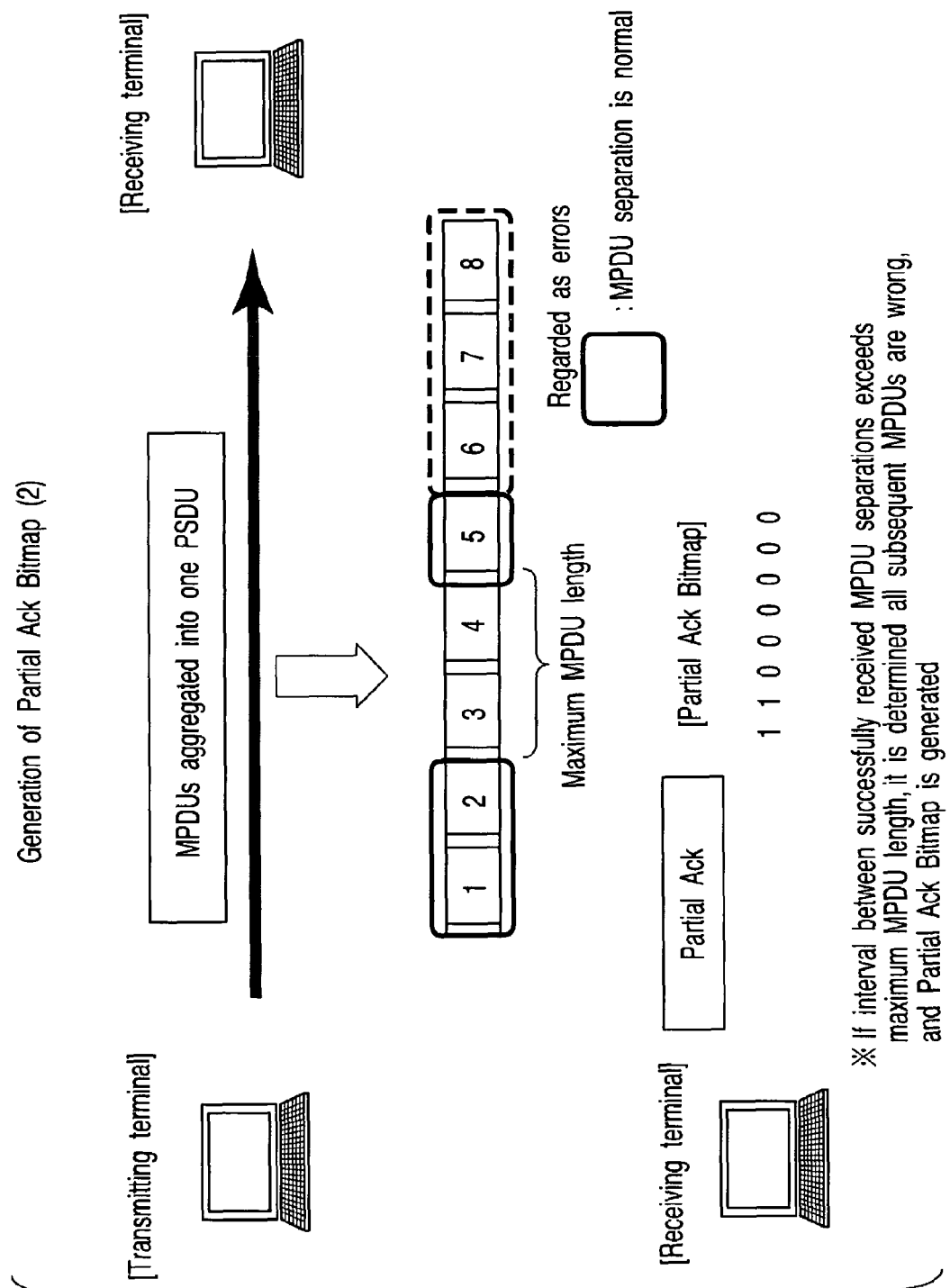
FIG. 49 is a view showing aggregation transmission and Partial Ack.

In the example shown in FIG. 49, a given PSDU (the MPDU separation of the third MPDU is wrong in FIG. 49) is wrong, and as CRC calculation is consecutively performed in octets to search for the next MPDU separation, it is determined that the MPDU separation of the fifth MPDU is normal. In this case, since the movement count (octet count) required for the search exceeds the maximum MPDU length as a result of continuous scanning, it can be determined that two or more MPDU separations (and MPDUs) existing between the two MPDU separations which have been properly received are wrong. In this case, since the lengths of the plurality of MPDUs aggregated into one PSDU are not uniform, it cannot be determined how many MPDU separations (and MPDUs) exist between the two normal MPDU separations. As shown in FIG. 49, therefore, there is conceivable a method of generating a Partial Ack bitmap upon determining that all the MPDUs (i.e., the sixth and subsequent MPDUs) following the fifth MPDU are wrong. In the example shown in FIG. 49, the transmitting side is notified by a Partial Ack that the first and second MPDUs have been properly received, and all the succeeding MPDUs are wrong. As a result, the transmitting side retransmits all the third and subsequent MPDUs. In this case, however, since the receiving side has properly received the "fifth" MPDU by the first transmission, redundant frames are discarded upon redundancy check.

Reception statuses may be set in generating a Partial Ack by the method of regarding all the MPDUs following a properly received MPDU as wrong, as shown in FIG. 49. Alternatively, such reception statuses may be set by a method of retrospectively estimating them from the end of a PSDU, as shown in FIG. 50. In this case, it is assumed that the number of PSDUs existing in one PSDU is fixed, and is recognized between the transmitting and receiving terminals. In the example shown in FIG. 50, assume that it is determined as a result of CRC calculation that the first, fourth, seventh, and eighth MPDU separations from the head of the PSDU have been properly received. In the seventh embodiment, there is no information indicating order. Based on the premise that the number of MPDU separations existing in a PSDU is fixed, it can be determined that two MPDU separations (and MPDUs) exist between the first and fourth MPDU separations, and two MPDU separations (and MPDUs) also exist between the fourth and seventh MPDUs. When the octet count required to make a search between normal MPDU separations exceeds the maximum MPDU length, FCS calculation cannot be done for the MPDUs located between the normal MPDU separations. Therefore, such MPDUs are regarded as wrong. As a consequence, as shown in FIG. 50, the receiving side returns the bitmap of a Partial Ack to the transmitting side upon correctly writing reception statuses for MPDUs corresponding to the positions of MPDU separations, which are calculated on the basis of estimation, (writing information, upon FCS calculation, whether or not each MPDU has been properly received), and writing information indicating reception failure with respect to each portion where the search period exceeds the maximum MPDU length.

Figure 51:
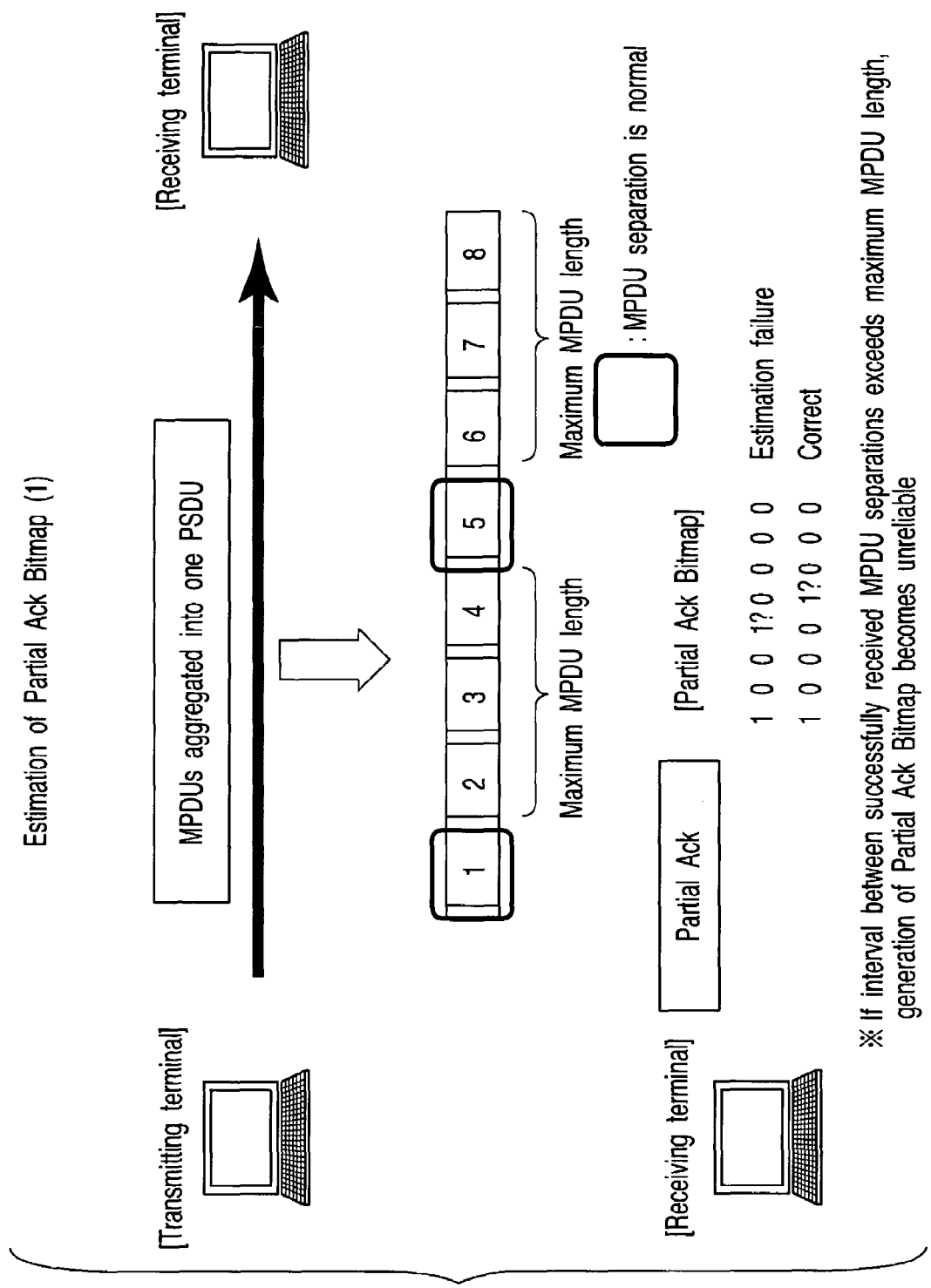
FIG. 51 is a view for explaining the estimation of a Partial Ack Bitmap.

When a Partial Ack is generated on the basis of estimation, the bits indicating the reception statues in the Partial Ack Bitmap may be transmitted wrongly (displaced). In this case, as shown in FIG. 51, even if two MPDU separations in the PSDU are properly detected, and the FCS of each succeeding MPDU is normal, the estimated position of the MPDU relative to the aggregated PSDU may deviate from the correct one. In the example shown in FIG. 51, it is assumed that MPDUs with sequence numbers "1" to "8" are transmitted upon being aggregated, and the first and fifth MPDU separation and MPDUs have been properly received. At this time, the reception statues contained in the Partial Ack generated by the receiving terminal may include a plurality of combinations of reception statuses, as shown in FIG. 51. This is because, if the search length between MPDU separations exceeds the maximum MPDU length, it cannot be determined how many MPDU separations (and MPDUs) exist between two correct MPDU separations. Of the two types of Partial Ack Bitmaps generated in the example shown in FIG. 51, the lower bitmap (10001000) represents the success of estimation. Upon receiving a Partial Ack having this information, the terminal which has transmitted the aggregated frame can properly perform window control and retransmission control. In this case, if a Partial Ack with a reception status in an offset state (the upper bitmap: 10010000) is returned, the transmitting side determines that the frame with sequence number "4" has been properly received (in reality, has not been properly received), and set the frame with sequence number "5" as a retransmission target (the frame with "5" has properly been received).

FIG. 52 shows frame control in such retransmission operations. In the case of the lower operation in which estimation has succeeded at the time of the generation of a Partial Ack, a new MPDU with "9" is aggregated by using the MPDUs with "2", "3", "4", "6", "7", and "8" for retransmission and window control. In the case of the upper operation, on the receiving side, the MPDU with "5" which has been properly received is regarded as a retransmission target. Even in the case of the upper operation, when a frame obtained by aggregating a plurality of MPDUs is retransmitted, since a Partial Ack (a reception status for an aggregate frame received at that time is returned) from the receiving side or redundancy check is used, if the receiving side abandons the MPDU with sequence number "4", no influence is imposed on the subsequent frame sequence. A Partial Ack is a means for notifying the transmitting side of a reception status for each MPDU when a frame obtained by aggregating a plurality of MPDUs is received. Partial Ack Bitmap is the reception status of each MPDU in relative position. Therefore, no problems arise in window control on the transmitting side, and there is no chance that retransmission is repeated endlessly. The influence of the operation only appears in the form of the omission of about one MPDU.

In the seventh embodiment, when all MPDUs aggregated into a PSDU are made to have a uniform fixed length, at the time of setting a traffic stream defined in IEEE 802.11e, by using a method of setting the size of each MPDU that can be transmitted to a fixed length or padding a proper number of bits, the relative position of each MPDU can be determined more accurately.

Eighth Embodiment

Figure 54:
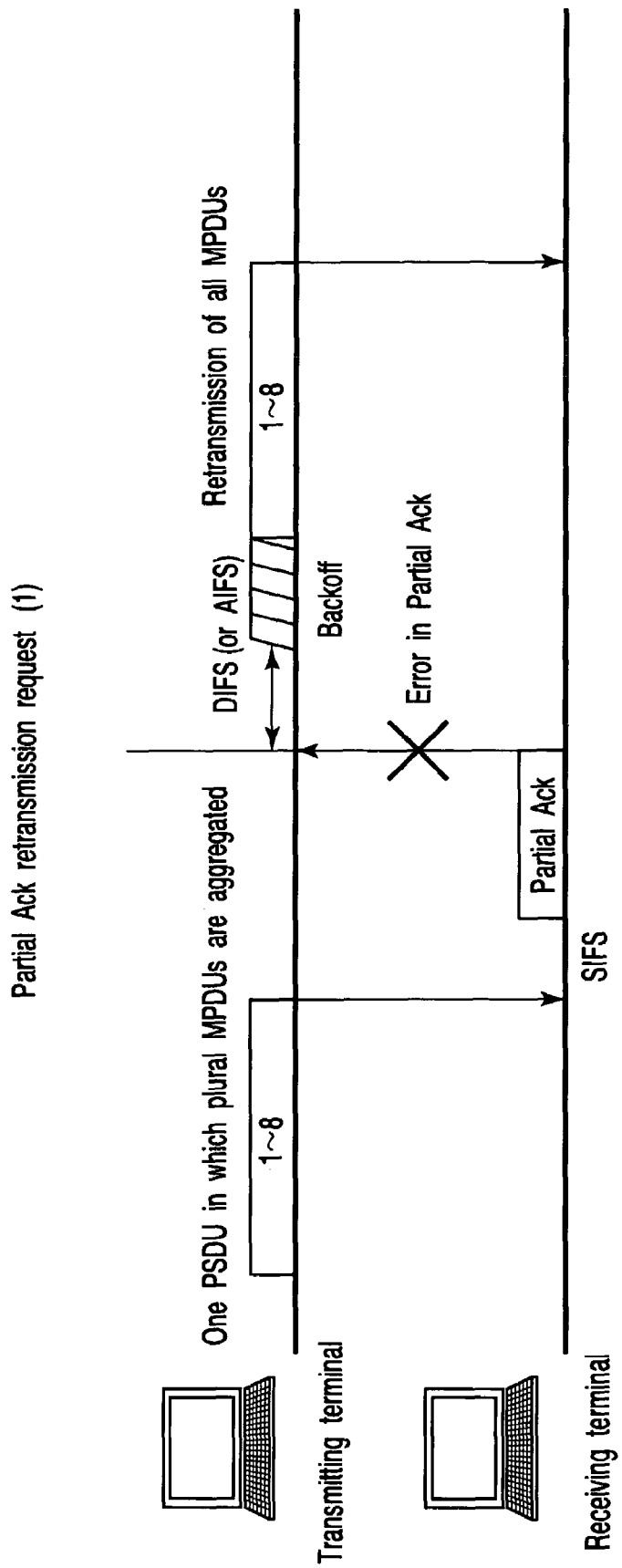
FIG. 54 is a view for explaining a Partial Ack retransmission request according to the eighth embodiment of the present invention.

Consider a case wherein a given transmitting terminal transmits a plurality of MPDUs upon aggregating them into one PSDU, as shown in FIG. 54. A terminal which has received the aggregated frame checks the reception status of each MPDU to generate a Partial Ack Bitmap, and then returns it to the transmitting side after the lapse of an SIFS period. If, however, as shown in FIG. 54, the Partial Ack is subjected to an error and is not properly received on the transmitting side, all the MPDUs need to be retransmitted after IFS for a DIFS (Distributed Coordination Function Inter Frame Space) period of an AIFS (Arbitration Inter Frame Space) and random backoff are performed, which is a frame interval for each priority defined in IEEE 802.11e.

In the eighth embodiment of the present invention, therefore, as shown in FIG. 55, when a terminal which has transmitted a plurality of MPDUs upon aggregating them into one PSDU detects a physical frame defined in IEEE 802.11 after the lapse of the SIFS period, and finds an error in the PSDU upon FCS check, the terminal transmits a Partial Ack retransmission request frame to the destination after the lapse of the PIFS or SIFS period. The PIFS or SIFS period is set to prevent interruption of frame transmission from other terminals. Obviously, this embodiment is not limited to any one of these periods. Some kind of negotiation may be made for such frame intervals between the transmitting and receiving terminals, or the above operation may be performed on the premise that a certain consensus has already been reached among all terminals.

Figure 56:
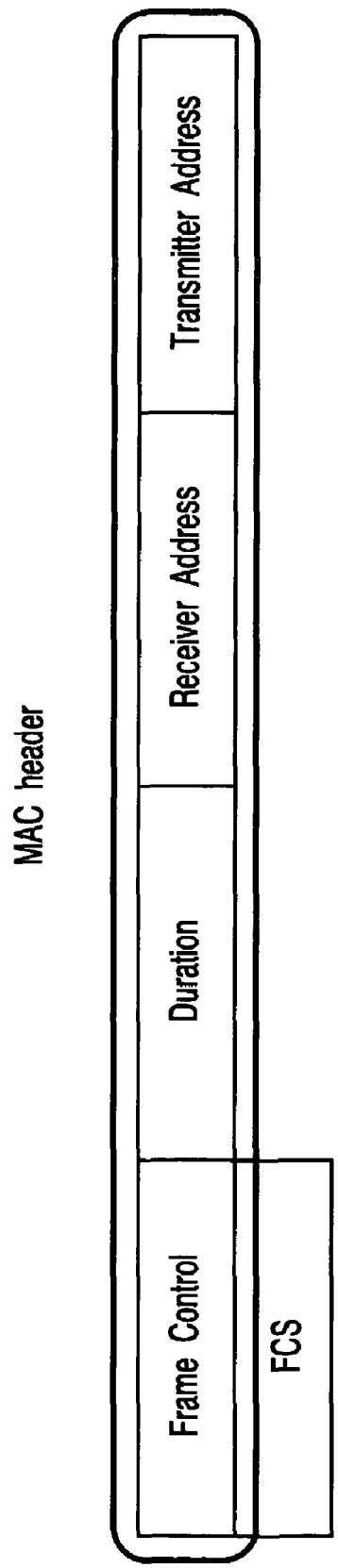
FIG. 56 is a view showing the frame format of a Partial Ack retransmission request.

A terminal which has received a Partial Ack retransmission request had already transmitted a Partial Ack before (i.e., just before the reception) the PIFS or SIFS period. If the terminal which has transmitted the Partial Ack retransmission request corresponds to the terminal to which the Partial Ack had been transmitted, the receiving terminal transmits the same contents as those of the Partial Ack which has been transmitted just before the reception to the Partial Ack retransmission requesting terminal. It is therefore preferable for the terminal which has received an aggregated PSDU to hold a reception status for a predetermined period of time (at least the PIFS period). FIG. 56 shows the frame format of a Partial Ack retransmission request. The receiving side identifies a Partial Ack retransmission request frame according to the type information and subtype information of a MAC header defined in IEEE 802.11. Alternatively, instead of defining a new frame as shown in FIG. 56, the transmitting and receiving terminals may set a rule such that when the transmitting side transmits a PSDU in which all pieces of MPDU length information (in MPDU separations and a MAC super frame header) are designated 0 (in this case, MPDUs themselves are not aggregated), and the receiving side retransmits the immediately transmitted Partial Ack upon determining that all the MPDU lengths in the PSDU are set to 0. If a new frame is to be defined as shown in FIG. 56, this embodiment may use a scheme of aggregating a plurality of Partial Ack retransmission request frames addressed to a plurality of destinations and transmitting/receiving Partial Acks (for retransmission) with time lags as in the first and second embodiments.

According to the eighth embodiment of the present invention, there is no need to retransmit all MPDUs on the transmitting side, thus allowing more efficient retransmission control. Obviously, such control can be used together with QoS control defined in IEEE 802.11e and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
   a generation device configured to generate a frame,
   the frame comprising
   a first separation field, the first separation field including at least a first MAC protocol data unit (MPDU) length field and a first cyclic redundancy check (CRC) field, the first MPDU length field including first length information of a first MPDU, the first CRC field being for protecting at least the first length information,
   the first MPDU following the first separation field,
   a second separation field following the first MPDU, the second separation field including at least a second MPDU length field and a second CRC field, the second MPDU length field including second length information set to a value of zero to indicate no second MPDU directly follows the second separation field, the second CRC field being for protecting at least the second length information,
   a third separation field following the second separation field, the third separation field including at least a third MPDU length field and a third CRC field, the third MPDU length field including third length information of a third MPDU, the third CRC field being for protecting at least the third length information,
   the third MPDU following the third separation field,
   wherein the frame is to be transmitted to a destination communication apparatus.

* * * * *